(12) United States Patent
Rawls-Meehan

(10) Patent No.: US 8,020,230 B2
(45) Date of Patent: *Sep. 20, 2011

(54) FOAM SPRING MATTRESS WITH SUBSTANTIALLY HORIZONTAL STRAPS

(75) Inventor: Martin B Rawls-Meehan, Lexington, MA (US)

(73) Assignee: Hsiu Chen Liao, Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/876,753

(22) Filed: Oct. 22, 2007

(65) Prior Publication Data

US 2009/0018858 A1    Jan. 15, 2009

Related U.S. Application Data

(63) Continuation of application No. 11/847,068, filed on Aug. 29, 2007.

(60) Provisional application No. 60/823,891, filed on Aug. 29, 2006.

(51) Int. Cl.
A47C 27/00    (2006.01)

(52) U.S. Cl. .................. 5/740; 5/719; 5/655.9; 5/953

(58) Field of Classification Search ........... 5/740, 655.9, 5/953, 719, 720, 655.8, 247, 255; 267/145, 267/153
See application file for complete search history.

(56) References Cited

U.S. PATENT DOCUMENTS

| | | | |
|---|---|---|---|
| 698,529 A * | 4/1902 | Marshall | ............................ 5/720 |
| 2,604,642 A | 7/1952 | Marco | |
| 3,017,642 A | 1/1962 | Rosenberg et al. | |
| 3,885,259 A | 5/1975 | Cheong | |
| 4,070,719 A | 1/1978 | Morgan | |
| 4,194,255 A | 3/1980 | Poppe | |
| 4,360,197 A | 11/1982 | Palmer | |
| 4,426,076 A | 1/1984 | Palmer | |
| 4,578,834 A * | 4/1986 | Stumpf | ............................ 5/720 |
| 4,667,357 A | 5/1987 | Fortune | |
| 4,679,266 A | 7/1987 | Kraft | |
| 4,901,387 A | 2/1990 | Luke | |
| 5,014,967 A | 5/1991 | Wolf et al. | |
| 5,079,790 A | 1/1992 | Pouch | |
| 5,107,558 A | 4/1992 | Luck | |
| 5,210,890 A | 5/1993 | Hagglund | |
| 5,231,717 A | 8/1993 | Scott et al. | |
| 5,325,552 A | 7/1994 | Fong et al. | |

(Continued)

FOREIGN PATENT DOCUMENTS

DE    19521910 C1    9/1996

(Continued)

OTHER PUBLICATIONS

Gershman, Maurice, M.D. "Self-Adhering Nylon Tapes." Journal of A.M.A. (vol. 168, No. 7) Oct. 18, 1958.*

(Continued)

*Primary Examiner* — Robert G Santos
(74) *Attorney, Agent, or Firm* — Strategic Patents, P.C.

(57) ABSTRACT

An aspect of the present invention relates to a method and system of receiving information of a user's support facility comfort requirements; using a software application to determine a proper support facility firmness configuration to match the user's requirement; selecting foam springs with the proper user required firmness as determined by the software application; and configuring the selected foam springs within the support facility to match the user's firmness requirements.

11 Claims, 35 Drawing Sheets

U.S. PATENT DOCUMENTS

| | | | |
|---|---|---|---|
| 5,353,455 | A | 10/1994 | Loving et al. |
| 5,391,581 | A | 2/1995 | Tsurugai et al. |
| 5,836,027 | A | 11/1998 | Leventhal et al. |
| 5,960,496 | A | 10/1999 | Boyd |
| 5,970,547 | A * | 10/1999 | Cavazos .......................... 5/690 |
| 6,036,271 | A | 3/2000 | Wilkinson et al. |
| 6,055,689 | A | 5/2000 | Cavazos |
| 6,061,856 | A | 5/2000 | Hoffmann |
| 6,154,690 | A | 11/2000 | Coleman |
| 6,260,350 | B1 | 7/2001 | Horii et al. |
| 6,286,167 | B1 * | 9/2001 | Stolpmann ...................... 5/737 |
| 6,318,416 | B1 | 11/2001 | Grueninger |
| 6,347,423 | B1 * | 2/2002 | Stumpf .............................. 5/720 |
| 6,434,771 | B1 | 8/2002 | Nishito |
| 6,581,229 | B2 | 6/2003 | Bernstein |
| 6,585,328 | B1 | 7/2003 | Oexman et al. |
| 6,591,438 | B1 * | 7/2003 | Edling ............................. 5/720 |
| 6,704,962 | B2 | 3/2004 | Choi |
| 6,721,980 | B1 | 4/2004 | Price et al. |
| 6,745,420 | B2 | 6/2004 | Giori et al. |
| 6,922,862 | B1 | 8/2005 | Thompson |
| 7,000,277 | B2 | 2/2006 | Torres Cervera |
| 7,048,263 | B2 * | 5/2006 | Ahlqvist ......................... 267/91 |
| 7,120,956 | B1 * | 10/2006 | Liao ................................. 5/719 |
| 7,178,187 | B2 | 2/2007 | Barman et al. |
| 7,194,777 | B2 * | 3/2007 | Edling et al. ..................... 5/720 |
| 7,222,379 | B2 | 5/2007 | DiGirolamo |
| 7,325,267 | B2 | 2/2008 | Slettaøyen |
| 7,428,764 | B2 | 9/2008 | Clark |
| 7,496,981 | B2 | 3/2009 | Alonso et al. |
| 7,571,504 | B2 | 8/2009 | Kuo |
| D606,794 | S | 12/2009 | Steppat et al. |
| 7,624,462 | B2 * | 12/2009 | Cao et al. ........................ 5/655.9 |
| 7,685,663 | B2 * | 3/2010 | Rawls-Meehan ................. 5/719 |
| 7,748,065 | B2 * | 7/2010 | Edling ............................. 5/720 |
| 7,757,322 | B2 * | 7/2010 | An ................................... 5/722 |
| 7,841,031 | B2 | 11/2010 | Rawls-meehan |
| 7,854,031 | B2 | 12/2010 | Rawls-Meehan |
| 7,860,723 | B2 | 12/2010 | Rawls-Meehan |
| 7,930,783 | B2 * | 4/2011 | Rawls-Meehan ................. 5/722 |
| 7,954,189 | B2 | 6/2011 | Rawls-Meehan |
| 2002/0013743 | A1 | 1/2002 | Shoffner et al. |
| 2002/0113346 | A1 | 8/2002 | Constantinescu |
| 2002/0124320 | A1 | 9/2002 | Washburn et al. |
| 2003/0009831 | A1 | 1/2003 | Giori et al. |
| 2003/0101517 | A1 | 6/2003 | Choi |
| 2004/0025258 | A1 | 2/2004 | Van Der Wurf et al. |
| 2004/0077921 | A1 | 4/2004 | Becker et al. |
| 2004/0133987 | A1 | 7/2004 | Reeder et al. |
| 2004/0215416 | A1 | 10/2004 | Hinshaw et al. |
| 2005/0108827 | A1 | 5/2005 | Cervera |
| 2005/0115003 | A1 | 6/2005 | Torbet et al. |
| 2005/0172468 | A1 | 8/2005 | Poppe |
| 2005/0223667 | A1 | 10/2005 | McCann et al. |
| 2006/0248652 | A1 | 11/2006 | Alonso Cucurull |
| 2006/0263758 | A1 | 11/2006 | Crutchfield, Jr. et al. |
| 2006/0272098 | A1 | 12/2006 | Hochschild |
| 2006/0290039 | A1 * | 12/2006 | Cao et al. ....................... 267/153 |
| 2007/0021965 | A1 | 1/2007 | Boyd |
| 2007/0086947 | A1 | 4/2007 | Boyd |
| 2007/0204407 | A1 | 9/2007 | Lee |
| 2007/0238935 | A1 | 10/2007 | Boyd |
| 2008/0093784 | A1 * | 4/2008 | Rawls-Meehan ............... 267/80 |
| 2008/0097774 | A1 | 4/2008 | Rawls-Meehan |
| 2008/0097778 | A1 | 4/2008 | Rawls-Meehan |
| 2008/0097779 | A1 | 4/2008 | Rawls-Meehan |
| 2008/0127424 | A1 * | 6/2008 | Rawls-Meehan ................. 5/740 |
| 2008/0162171 | A1 | 7/2008 | Rawls-Meehan |
| 2008/0184492 | A1 | 8/2008 | Sunde |
| 2008/0281611 | A1 | 11/2008 | Rawls-Meehan |
| 2008/0281612 | A1 | 11/2008 | Rawls-Meehan |
| 2008/0281613 | A1 | 11/2008 | Rawls-Meehan et al. |
| 2008/0288272 | A1 | 11/2008 | Rawls-Meehan |
| 2008/0288273 | A1 | 11/2008 | Rawls-Meehan et al. |
| 2009/0018853 | A1 * | 1/2009 | Rawls-Meehan ................. 705/1 |
| 2009/0018854 | A1 * | 1/2009 | Rawls-Meehan ................. 705/1 |
| 2009/0018855 | A1 * | 1/2009 | Rawls-Meehan ................. 705/1 |
| 2009/0018856 | A1 * | 1/2009 | Rawls-Meehan ................. 705/1 |
| 2009/0018857 | A1 * | 1/2009 | Rawls-Meehan ................. 705/1 |
| 2009/0018858 | A1 * | 1/2009 | Rawls-Meehan ................. 705/1 |
| 2009/0024406 | A1 * | 1/2009 | Rawls-Meehan ................. 705/1 |
| 2009/0037205 | A1 * | 2/2009 | Rawls-Meehan ................. 705/1 |
| 2009/0043595 | A1 * | 2/2009 | Rawls-Meehan ................. 705/1 |
| 2009/0064420 | A1 * | 3/2009 | Rawls-Meehan ................. 5/740 |
| 2009/0100603 | A1 * | 4/2009 | Poppe ............................. 5/655.9 |
| 2009/0183314 | A1 * | 7/2009 | DeMoss ........................... 5/716 |
| 2010/0025900 | A1 | 2/2010 | Rawls-Meehan |
| 2010/0090383 | A1 * | 4/2010 | Rawls-Meehan ............ 267/145 |
| 2011/0094041 | A1 | 4/2011 | Rawls-Meehan |

FOREIGN PATENT DOCUMENTS

| | | |
|---|---|---|
| DE | 202005015047 | 3/2006 |
| EP | 0290674 A1 | 11/1988 |
| GB | 476659 | 12/1937 |
| JP | 63-001452 | 1/1988 |
| JP | 2005326982 | 11/2005 |
| KR | 20020043470 | 6/2002 |
| KR | 20020043482 | 6/2002 |
| WO | WO-81/02384 A1 | 9/1981 |
| WO | WO-99/29213 A1 | 6/1999 |
| WO | WO-2008/048743 A3 | 4/2008 |
| WO | WO-2008048743 A2 | 4/2008 |

OTHER PUBLICATIONS

"U.S. Appl. No. 11/876,712, Non-Final Office Action mailed Nov. 13, 2008", 03 pgs.

"U.S. Appl. No. 11/876,741, Non-Final Office Action mailed on Dec. 3, 2008", 9 pgs.

"U.S. Appl. No. 11/876,707, Non-Final Office Action mailed Dec. 8, 2008", 12 pgs.

"U.S. Appl. No. 11/876,755, Non-Final Office Action mailed Aug. 5, 2008", OARN,11pgs.

Kunkel, K. "Spain-Based Mattress Company sets up U.S Division", *The Weekly Newspaper for the Home Furnishings Network*. vol. 79, (Apr. 18, 2005),28.

"U.S. Appl. No. 11/876,700, Non-Final Office Action mailed Aug. 5, 2008", OARN,11pgs.

"U.S. Appl. No. 11/847,068, Non-Final Office Action mailed Aug. 6, 2008", OARN,19 pgs.

"U.S. Appl. No. 11/876,739, Non-Final Office Action mailed Aug. 21, 2008", OARN,14 pgs.

"U.S. Appl. No. 11/876,736, Non-Final Office Action mailed Feb. 24, 2009", 10 pgs.

"U.S. Appl. No. 11/876,722 Non-Final Office Action mailed Mar. 5, 2009", OARN,10 pgs.

"U.S. Appl. No. 11/876,755 Final Office Action mailed Mar. 5, 2009", 17 pgs.

"U.S. Appl. No. 11/876,718 Non-Final Office Action mailed Mar. 6, 2009", 9 pgs.

"U.S. Appl. No. 11/876,739,Final Office Action mailed Mar. 19, 2009", FOAR,17 pgs.

"U.S. Appl. No. 11/876,731, Non-Final Office Action mailed Mar. 30, 2009", 7 pgs.

"U.S. Appl. No. 11/876,728, Non-Final Office Action mailed Mar. 31, 2009", 8 pgs.

"U.S. Appl. No. 11/876,700, Final Office Action mailed Apr. 13, 2009", 19 pgs.

"U.S. Appl. No. 11/876, 740, Non-Final Office Action mailed Apr. 20, 2009", 14 pgs.

"U.S. Appl. No. 11/876,712, Non-Final Office Action mailed May 14, 2009", 9 pgs.

Isa, "International Search Report and Written Opinion", For US Patent Application No. PCT/US07/77137, mailed Sep. 16, 2008, (Jul. 21, 2008).

"U.S. Appl. No. 11/847,068, Final Office Action mailed May 26, 2009", 23 pgs.

"U.S. Appl. No. 11/876,752, Non-Final Office Action mailed Jun. 10, 2009", 8 pgs.

"U.S. Appl. No. 11/876,741, Final Office Action mailed Jun. 29, 2009", 9 pgs.

"U.S. Appl. No. 11/876,755, Non-Final Office Action mailed Jul. 9, 2009", 13 pgs.

"U.S. Appl. No. 11/847,011, Non-Final Office Action mailed Aug. 18, 2008", OARN,22 pgs.
"U.S. Appl. No. 11/847,011, Final Office Action mailed Apr. 28, 2009", 23 pgs.
"U.S. Appl. No. 11/876,700, Non-Final Office Action mailed Sep. 1, 2009", 11.
"U.S. Appl. No. 11/876,748, Non Final Office Action mailed Sep. 3, 2009", 10.
U.S. Appl. No. 11/876,751, "U.S. Appl. No. 11/876,751 Non-Final Office Action mailed Sep. 3, 2009", 12 pgs.
"U.S. Appl. No. 11/876,718, Final Office Action mailed Oct. 6, 2009", 14.
"U.S. Appl. No. 11/876,707, Final Office Action mailed Oct. 7, 2009", 15.
"U.S. Appl. No. 11/876,752, Notice of Allowance mailed Nov. 18, 2009", 6 Pgs.
"U.S. Appl. No. 11/847,011, Non Final Office Action mailed Nov. 24, 2009", 24.
"U.S. Appl. No. 11/876,712, Final Office Action mailed Nov. 25, 2009", 13.
"U.S. Appl. No. 10/985,834, Notice of Allowance mailed Nov. 23, 2009", 7 Pgs.
"U.S. Appl. No. 11/876,728, Final Office Action mailed Dec. 10, 2009", 11 pgs.
"U.S. Appl. No. 11/847,068, Non-Final Office Action mailed Dec. 28, 2009", , 23 pgs.
"U.S. Appl. No. 11/876,707, Non-Final Office Action mailed Jan. 25, 2010", , 13.
"U.S. Appl. No. 11/876,712, Non-Final Office Action mailed Mar. 18, 2010", , 12.
"U.S. Appl. No. 11/876,718, Non-Final Office Action mailed Feb. 19, 2010", , 10 Pgs.
"U.S. Appl. No. 11/876,722, Non-Final Office Action mailed Dec. 24, 2009", , 12 Pgs.
"U.S. Appl. No. 11/876,728, Non-Final Office Action mailed Mar. 25, 2010".
"U.S. Appl. No. 11/876,736, Final Office Action mailed Dec. 24, 2009", , 14 Pgs.
"U.S. Appl. No. 11/876,739, Non-Final Office Action mailed Dec. 15, 2009", , 16 pgs.
"U.S. Appl. No. 11/876,741, Non-Final Office Action mailed Dec. 29, 2009", , 11 Pgs.
"U.S. Appl. No. 11/876,745, Non-Final Office Action mailed Mar. 31, 2010", , 16.
"U.S. Appl. No. 11/876,752, Notice of Allowance mailed Mar. 5, 2010", , 7.
"U.S. Appl. No. 11/876,755, Non-Final Office Action mailed Feb. 3, 2010", , 13.
"U.S. Appl. No. 11/876,700, Final Office Action mailed Mar. 17, 2010", ,16.
"U.S. Appl. No. 11/876,740, Final Office Action mailed Feb. 3, 2010", , 17.
"U.S. Appl. No. 11/847,068, Final Office Action mailed Aug. 18, 2010", , 28 Pgs.
"U.S. Appl. No. 11/876,686, Non-Final Office Action mailed Jul. 21, 2010", , 19 pgs.
"U.S. Appl. No. 11/876,715, Non-Final Office Action mailed Jul. 8, 2010", , 19 pgs.
"U.S. Appl. No. 11/876,739, Non-Final Office Action mailed Jul. 7, 2010", , 23.
"U.S. Appl. No. 11/876,741, Final Office Action mailed Jul. 21, 2010" , , 15.
"U.S. Appl. No. 11/876,748, Notice of Allowance mailed Jul. 28, 2010", , 11 pgs.
"U.S. Appl. No. 11/876,751, Notice of Allowance mailed Jul. 19, 2010", , 12.
"U.S. Appl. No. 11/876,752, Non-Final Office Action mailed Aug. 16, 2010", , 7 pgs.
"U.S. Appl. No. 11/847,011,Non-Final Office Action mailed Aug. 17, 2010", , 36.
"U.S. Appl. No. 11/876,718, Final Office Action mailed Aug. 31, 2010", , 14 pgs.
"U.S. Appl. No. 10/985,834, Non-Final Office Action mailed Jun. 15, 2010", , 10.
"U.S. Appl. No. 11/876,740, Notice of Allowance mailed Jun. 7, 2010", , 7.
"U.S. Appl. No. 11/876,736, Non-Final Office Action mailed May 12, 2010", , 17 pages.
"U.S. Appl. No. 11/876,712, Non-Final Office Action mailed Dec. 8, 2010", , 12.
"U.S. Appl. No. 11/876,715, FOA, Dec. 21, 2010", Dec. 21, 2010, all.
"U.S. Appl. No. 11/876,728, Final Office Action mailed Dec. 8, 2010", , 12.
"U.S. Appl. No. 11/876,728, Notice of Allowance mailed Feb. 22, 2011", , 8.
"U.S. Appl. No. 11/876,751, Notice of Allowance mailed Jan. 28, 2011", , 7.
"U.S. Appl. No. 12/912,929, Non-Final Office Action mailed Feb. 15, 2011", , 14.
"U.S. Appl. No. 11/876,686, Final Office Action mailed Dec. 22, 2010", , 11.
"U.S. Appl. No. 11/876,736, Final Office Action mailed Feb. 2, 2011", , 24.
"U.S. Appl. No. 11/876,739, Final Office Action mailed Jan. 20, 2011", , 29.
"U.S. Appl. No. 11/876,745, Final Office Action mailed Dec. 15, 2010", , 10.
"U.S. Appl. No. 11/876,728", Dec. 8, 2010 , all.
"U.S. Appl. No. 11/876,700, Non-Final Office Action mailed Oct. 5, 2010", , 17.
"U.S. Appl. No. 11/876,707, Final Office Action mailed Oct. 13, 2010", , 16 pgs.
"U.S. Appl. No. 11/876,718, Non-Final Office Action mailed Nov. 4, 2010", , 9 Pgs.
"U.S. Appl. No. 11/876,740, Notice of Allowance mailed Oct. 5, 2010" , , 11.
"U.S. Appl. No. 11/876,755, Final Office Action mailed Oct. 10, 2010", , 20 pgs.
"U.S. Appl. No. 11/876,755, Non-Final Office Action mailed Nov. 24, 2010", , 16.
"U.S. Appl. No. 11/876,722, Final Office Action mailed Oct. 13, 2010", , 19 pgs.
"U.S. Appl. No. 11/876,715, Non-Final Office Action mailed Apr. 29, 2011", 14.
"U.S. Appl. No. 11/876,722, Non-Final Office Action mailed May 2, 2011", 16.
"U.S. Appl. No. 12/912,929, Notice of Allowance mailed May 10, 2011", 10.
"U.S. Appl. No. 11/876,712, Final Office Action mailed May 13, 2011", 14.
"U.S. Appl. No. 11/876,718, Final Office Action mailed Apr. 18, 2011", 12.
"U.S. Appl. No. 11/876,755, Final Office Action mailed May 16, 2011", 19.

* cited by examiner

REVERIE.COM

ADDRESS

SEARCH　　FAVORITES

Height: ___ ft ___ in
Weight: ___ lbs
Age: ___ years
Sleeping style:
　Do you prefer to fall asleep on your
　　back　front　left　right
　Do you find you wake most often on your
　　back　front　left　right
Do you experience back pain?　Yes　No
What parts of your body feel best when you wake?
What parts of your body feel worst when you wake?

Inventory list based on questionnaire responses

1. #1 Size medium double/full mattress ○
2. #4 80kg/m3 density barrels ⊖
3. #2 95kg/m3 density barrels ⊜
4. #18 110kg/m3 density barrels ⦵
5. Barrel installation map shown below

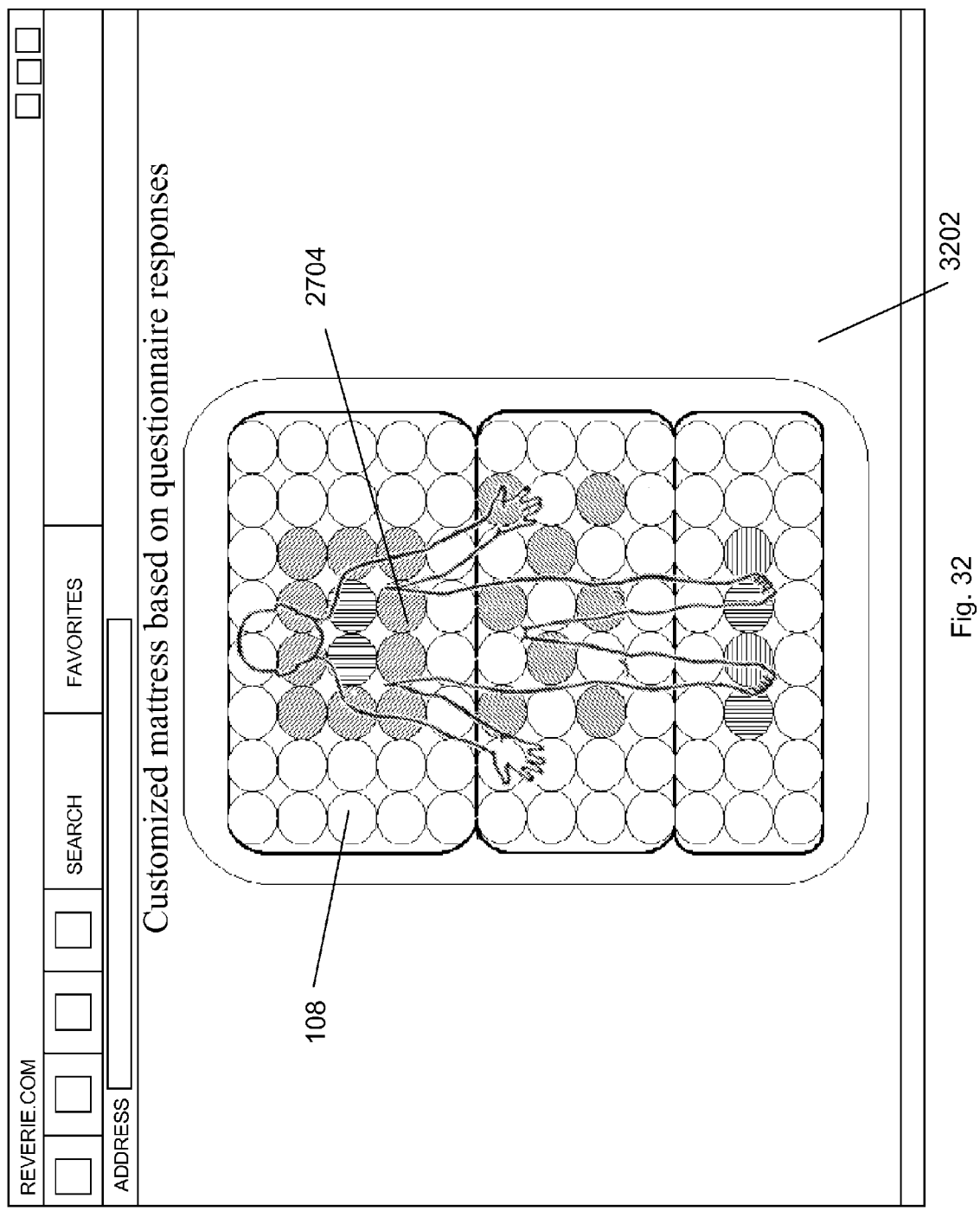

FOAM SPRING MATTRESS WITH SUBSTANTIALLY HORIZONTAL STRAPS

CROSS-REFERENCE TO RELATED APPLICATIONS

This application claims the benefit of the following provisional application, which is hereby incorporated by reference in its entirety: U.S. Provisional App. No. 60/823,891, filed Aug. 29, 2006.

BACKGROUND

1. Field

This invention relates to a method and system of providing a mattress and more particularly, to a mattress using a plurality of foam springs to provide comfort and support to the user of the bed.

2. Background

Consumers, manufacturers, and distributors may each individually or as groups have many different opinions of the type of a bed and bed firmness that may provide for a comfortable resting or sleeping condition. There are many different types of beds and firmnesses to choose from when deciding on a bed to purchase. In an attempt to provide users with comfortable beds, bed manufacturers may use metal springs, foam layers, solid foam blocks, water, air, or other means to provide various types of firmness to a user. These different types of bedding materials may be used individually or in combination. Beds may be available in various firmnesses using a combination of springs, foams and materials in various combinations may provide for firmer or less firm support to the user. However, even though great effort has been dedicated to making a mattress that provides good support and comfort, the present solutions are inadequate and a need exists for an improved mattress.

SUMMARY

An aspect of the present invention relates to providing a mattress wherein the mattress has foam barrels or springs on its interior to provide support and comfort to a user. In embodiments, the foam barrels within a mattress may be provided with varying degrees of firmness. For example, one region of the mattress may be populated with barrels that are more firm or resilient with respect to other barrels within the mattress. In embodiments, foam barrels of varying firmness may be placed within a given region of the mattress. It is envisioned, for example, that one side of the mattress may be set to a 'firm' user setting by using more resilient foam barrels on the 'firm side and another side of the bed may be set to a 'soft' user setting by using barrels that are less resilient in the 'soft' side. Regions of the mattress may be similarly adjusted. For example, the areas in the region of a person's lower back may be set to be more firm or less firm by populating the lower back region with appropriate foam barrels. Other such regions of the mattress could be targeted for firmness adjustment (e.g. regions around the head, neck, upper back, midback, lower back, torso, gluteus, upper leg, mid-leg, lower leg, etc.).

Another aspect of the present invention involves providing adjustable firmness mattresses through the use of varied firmness foam barrels. Embodiments involve providing user interfaces to allow a person to select firmness settings and manufacturing techniques for setting the mattresses firmness per the user requests. In embodiments, the barrels may be positionable by a manufacturer, distributor, delivery/set-up personnel, the user or other person.

Another aspect of the present invention involves establishing categories of mattress firmness types and then providing the firmness types through the use of foam barrels. For example, a firmness type may be any one of the following: single firmness, dual firmness zones or sides, multi-firmness regions and the like. Each firmness type may be established to suit a particular population segment (e.g. firm on side one and soft on side two) and mattresses may be manufactured per the firmness types using the foam barrels such that a product offering of typical mattress types can be made. In embodiments "zoning" or "pattern" configurations for large "groups" of users are determined and mattresses are made using foam barrels according to the configurations and they are mass produced. A user may determine which type of zoned or patterned mattress best suits their particular needs. In embodiments, planning systems are provided to help users determine, via software or some other method, what pattern best suits their comfort needs.

A mattress disclosed herein may include a plurality of foam barrels, possibly of variable firmness, resting in webbing or other alignment systems, wherein the foam barrels are covered by fabric on all sides forming a foam encasement or outer covering of the mattress. In one embodiment, the webbing may not be connected to the encasement or other device along the sides; it may be permitted to 'float' within the outer encasement. In embodiments, the barrels would be laminated or otherwise attached to a foam layer underneath, on the side(s) and/or above to keep them in place.

A mattress disclosed herein may include metal innersprings and a plurality of foam barrels of variable firmness connected to each other in a pattern.

A mattress disclosed herein may include a layer that includes a series of latex barrels; and metal innersprings above or below such layer.

A method and system disclosed herein may include taking a plurality of foam support facilities, the foam support facilities each having a measurable attribute of firmness; and configuring the plurality of foam support facilities to provide a zone of firmness.

The zone of firmness may satisfy comfort requirements for common conditions of discomfort. The common condition of discomfort may be a back condition, a neck condition, a knee condition, a sleep disorder, a disease, arthritis, surgery, injury or other such injury or condition.

A method and system disclosed herein may include providing a plurality of foam springs of at least one firmness; providing a containment facility with a pattern of openings therein configured to receive the foam springs; and maintaining the orientation of the plurality of foam springs within a bed facility using the containment facility.

The bed facility may be a mattress. The containment facility may not be attached to the bed facility. The containment facility may be attached to the bed facility. The containment facility may be a webbing disposed in a mattress.

A method and system disclosed herein may include providing a plurality of foam springs of at least one firmness; providing a plurality of metal springs of at least one firmness; and orienting a combined configuration of the foam springs and the metal springs into a bed facility using a containment facility. The foam springs and metal springs may be oriented side by side within the containment facility, the foam springs may be positioned above the metal springs within the containment facility, the foam springs may be positioned below the metal springs within the containment facility, or the like.

A method and system disclosed herein may include providing at least one foam spring with a desired foam spring firmness; determining the foam spring firmness requirements for a user; and configuring a plurality of the foam springs within a support facility to match the user's firmness requirements.

The support facility may be a mattress, a pillow, a chair, a couch and an object on which a being can sit or recline, or both. The firmness requirements may be determined by user input. The foam springs with different firmness values may be used to match the user-desired firmness. The foam spring firmness may be measured by indentation load deflection (ILD) value, by indentation force deflection (IFD), or the like. The firmness may also be measured or described by the density of the foam, in pounds per cubic foot, kilograms per cubic meter, or some other relevant standard. Although the density may not be a direct measurement of firmness, it may have a direct relationship to firmness. For example, a 110 kg/m3 density barrel may be firmer than a 95 kg/m3 barrel and the 95 kg/m3 barrel may be firmer than a 80 kg/m3 density barrel, and the like.

The foam springs may be reconfigurable to meet the users changing firmness requirements.

A method and system disclosed herein may include providing at least one foam spring with a desired foam spring firmness; determining the foam spring firmness requirements for a user; and configuring a plurality of the form springs within a support facility to match the user's firmness requirements, wherein there is more than one foam spring firmness within the support facility.

The support facility may be a mattress, a pillow, a chair, a couch and an object on which a being can sit or recline, or both. The firmness requirements may be determined by user input. The foam springs with different firmness values may be used to match the user-desired firmness. The foam spring firmness may be measured by indentation load deflection (ILD) value, by indentation force deflection (IFD), or the like. The foam springs may be reconfigurable to meet the users changing firmness requirements.

A method and system disclosed herein may include receiving information of a user's support facility comfort requirements; using a software application to determine a proper support facility firmness configuration to match the user's requirement; selecting foam springs with the proper user required firmness as determined by the software application; and configuring the selected foam springs within the support facility to match the user's firmness requirements.

The support facility may be a mattress, a pillow, a chair, a couch and an object on which a being can at least one of sit and recline. The foam spring firmness may be measured by indentation load deflection (ILD) value, by indentation force deflection (IFD), or the like.

A method and system disclosed herein may include providing at least one foam spring; determining a health requirement for a user; associating beneficial health materials with the foam spring; and configuring a plurality of the form springs with the beneficial health materials within a support facility to match the user's additional health requirements.

The support facility may be a mattress, a pillow, a chair, a couch and an object on which a being can at least one of sit and recline.

A method and system disclosed herein may include providing at least one foam spring; determining a health requirement for a user; associating beneficial health materials with the foam spring; and configuring a plurality of the form springs with the beneficial health materials within a mattress to match the user's additional health requirements.

A method and system disclosed herein may include providing at least one foam spring; determining a health requirement for a user; associating beneficial health materials with the foam spring; and configuring a plurality of the foam springs with the beneficial health materials within a bed facility to match the user's additional health requirements.

In the mattresses, methods and systems disclosed herein, the beneficial health material may be activated carbon, tourmaline, a magnet, or the like. There may be a plurality of magnets. The plurality of magnets may be orientated to provide a desired health benefit. The beneficial health material may be mixed into the foam spring, added to the foam spring as a separate device, used as a coating on the foam spring, inserted into an annulus of the foam spring, provided in a ring around the perimeter of the foam spring, or the like. The foam springs containing beneficial health materials may be orientated within the facility to provide the desired health benefit.

A method and system disclosed herein may include providing at least one foam spring with a desired foam spring firmness; determining the changing foam spring firmness requirements for a user; and allowing reconfiguration of a plurality of the form springs within a support facility to match the user's changing firmness requirements.

The user's changing requirements may be a result of the user's improved health condition, a result of the user's worse health condition, or the like. The user may reconfigure the plurality of foam springs within the support facility. An enterprise may reconfigure the plurality of foam springs within the support facility. The reconfiguration may be enabled at a retail store, enabled at a home of a user, or the like. A mattress provided with a zipper to allow access to the foam springs. The foam springs may be contained in a webbing that allows hand removal and replacement of the foam springs. A manufacturer may reconfigure the plurality of foam springs within the support facility.

A method and system disclosed herein may include providing at least one pneumatic spring; determining the pneumatic spring firmness requirements for a user using a computer device interface; and configuring the pressure of the pneumatic spring within a support facility to match the user's firmness requirements.

The support facility may be selected a mattress, a pillow, a chair, a couch and an object on which a being can sit or recline, or do both. The firmness requirements may be determined by user input. The pneumatic spring pressures may be reconfigurable to meet the users changing firmness requirements.

A method and system disclosed herein may include providing at least one hydraulic spring; determining the hydraulic spring firmness requirements for a user using a computer device interface; and configuring the pressure of the hydraulic spring within a support facility to match the user's firmness requirements.

The support facility may be selected a mattress, a pillow, a chair, a couch and an object on which a being can sit, recline or do both. The firmness requirements may be determined by user input. The hydraulic spring pressures may be reconfigurable to meet the users changing firmness requirements.

A method and system disclosed herein may include providing at least one foam spring with a desired foam spring firmness; determining the foam spring firmness requirements for a user; and configuring a plurality of the foam springs within a support facility to match the user's firmness requirements.

The support facility may be selected from a list including a mattress, a pillow, a chair, a couch and an object on which a being can at least one of sit and recline.

The firmness requirements may be determined by user input. Foam springs with different firmness values may be used to match the user-desired firmness. The foam springs may be configured into at least one firmness zone. More than one firmness zone may be associated within the support facility. The more than one firmness zone may be configured as determined by the user's firmness requirements. The foam springs may be configured into a single firmness. The foam spring firmness may be measured by indentation load deflection (ILD) value, by indentation force deflection (IFD), or the like.

The user's firmness requirements may be determined by a questionnaire, by an interview, by the user input to a software application, or the like. The foam springs may be reconfigurable to meet the users changing firmness requirements.

A method and system disclosed herein may include providing at least one foam spring with a desired foam spring firmness; determining the foam spring firmness requirements for a user; and configuring a plurality of the form springs within a support facility to match the user's firmness requirements, wherein there is more than one foam spring firmness within the support facility.

The support facility may be selected from a list including a mattress, a pillow, a chair, a couch and an object on which a being can at least one of sit and recline.

The firmness requirements may be determined by user input. Foam springs with different firmness values may be used to match the user-desired firmness. The foam spring firmness may be measured by indentation load deflection (ILD) value, by indentation force deflection (IFD), or the like. The user's firmness requirements are determined by a questionnaire, by an interview, by the user input to a software application, or the like. The foam springs may be reconfigurable to meet the users changing firmness requirements.

A method and system disclosed herein may include providing at least one foam spring with a desired foam spring firmness; determining the changing foam spring firmness requirements for a user; and allowing reconfiguration of a plurality of the form springs within a support facility to match the user's changing firmness requirements.

The user's changing requirements may be a result of the user's improved health condition, a result of the user's worse health condition, or the like.

The user's changing requirements may be determined by a questionnaire, by an interview, by the user input to a software application, or the like.

The user may reconfigure the plurality of foam springs within the support facility. An enterprise may reconfigure the plurality of foam springs within the support facility. Reconfiguration may be enabled at a retail store, enabled at a home of a user, or the like.

A mattress may be provided with a zipper to allow access to the foam springs. Foam springs may be contained in a webbing that allows hand removal and replacement of the foam springs.

A manufacturer may reconfigure the plurality of foam springs within the support facility.

A method and system disclosed herein includes providing at least one foam spring with a desired foam spring firmness; determining the foam spring firmness requirements for a user; and configuring a plurality of the foam springs within a support facility to match the user's firmness requirements.

The support facility may be selected from a list including a mattress, a pillow, a chair, a couch and an object on which a being can at least one of sit and recline.

The firmness requirements may be determined by user input.

Foam springs with different firmness values may be used to match the user-desired firmness. The foam springs may be configured into at least one firmness zone. More than one firmness zone may be associated within the support facility. The more than one firmness zone may be configured as determined by the user's firmness requirements. The foam springs may be configured into a single firmness.

The foam spring firmness may be measured by indentation load deflection (ILD) value. The foam spring firmness may be measured by indentation force deflection (IFD).

The user's firmness requirements may be determined by a questionnaire. The user's firmness requirements may be determined by an interview. The user's firmness requirements may be determined by the user input to a software application.

The foam springs may be reconfigurable to meet the users changing firmness requirements.

A method and system disclosed herein includes providing at least one foam spring with a desired foam spring firmness; determining the foam spring firmness requirements for a user; and configuring a plurality of the form springs within a support facility to match the user's firmness requirements, wherein there is more than one foam spring firmness within the support facility.

The support facility may be selected from a list including a mattress, a pillow, a chair, a couch and an object on which a being can at least one of sit and recline.

The firmness requirements may be determined by user input. Foam springs with different firmness values may be used to match the user-desired firmness.

The foam spring firmness may be measured by indentation load deflection (ILD) value. The foam spring firmness may be measured by indentation force deflection (IFD).

The user's firmness requirements may be determined by a questionnaire. The user's firmness requirements may be determined by an interview. The user's firmness requirements may be determined by the user input to a software application.

The foam springs may be reconfigurable to meet the users changing firmness requirements.

A method and system disclosed herein includes providing at least one foam spring with a desired foam spring firmness; determining a changing foam spring firmness requirements for a user; and allowing reconfiguration of a plurality of the form springs within a support facility to match the user's changing firmness requirements.

The user's changing requirements may be a result of the user's improved health condition. The user's changing requirements may be a result of the user's worse health condition.

The user's changing requirements may be determined by a questionnaire. The user's changing requirements may be determined by an interview. The user's changing requirements may be determined by the user input to a software application.

The user may reconfigure the plurality of foam springs within the support facility. An enterprise may reconfigure the plurality of foam springs within the support facility.

Reconfiguration may be enabled at a retail store. Reconfiguration may be enabled at a home of a user.

A mattress may be provided with a zipper to allow access to the foam springs.

Foam springs may be contained in a webbing that allows hand removal and replacement of the foam springs.

A manufacturer may reconfigure the plurality of foam springs within the support facility.

A method and system disclosed herein includes receiving information of a user's support facility comfort requirements; using a software application to determine a proper support facility firmness configuration to match the user's requirement; selecting foam springs with the proper user required firmness as determined by the software application; and configuring the selected foam springs within the support facility to match the user's firmness requirements.

The support facility may be selected from a list including a mattress, a pillow, a chair, a couch and an object on which a being can at least one of sit and recline.

The software application may be a standalone application. The user's information may be stored as part of the standalone application.

The software application may be a web-based application. The user's information may be stored in as part of the web based application.

The software application may be a server-based application. The user's information is stored in as part of the server-based application.

The software application may receive input to determine the user's firmness requirements. The input may be a paper questionnaire. The input may be a computer questionnaire. The input may be an indication on a chart of the body. The input may be a set of preset questions. The input may be interactive with an answer to a first question determining a second question. The software application may determine at least one configuration of foam springs to match the user's firmness requirements.

An enterprise may configure the foam spring configuration using the software application. A manufacturer may configure the foam spring configuration using the software application. The user may configure the foam spring configuration using the software application. The foam spring configuration may be performed at the user's location. The user's input may be stored.

The software application foam spring configuration may be modifiable. The foam spring configuration may be modified by the user. The foam spring configuration may be modified by an enterprise. The foam spring configuration may be modified by a manufacturer.

The foam spring firmness may be measured by indentation load deflection (ILD) value. The foam spring firmness may be measured by indentation force deflection (IFD).

While certain embodiments refer to a barrel made of latex, it should be understood that, while certain embodiments may involve latex, the present invention is not limited to latex. Latex is used to provide an example of one type of suitable material and one skilled in the art would understand that there are other suitable barrel materials. While certain embodiments refer to webbings/interconnections between and among the barrels, it should be understood that the present invention envisions many alternative alignment, positioning, and/or support systems for the barrels.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF FIGURES

The systems and methods described herein may be understood by reference to the following figures:

FIG. 30 shows an input screen for a foam spring orientation software application.

FIG. 32 shows an output screen for a foam spring orientation software application.

DETAILED DESCRIPTION OF FIGURES

A user may have an overall bed comfort requirement for their overall body, but may also have requirements for localized body comfort. The user may have a unique situation that may require various comfort levels within a bed. For example, the user may desire a general medium firmness for the bed but may have additional requirements of firmer support in the users back area to provide additional back support for total body comfort.

A bed that may have interchangeable foam springs may allow the user to interchange different foam spring firmnesses to provide firmness differences that may compensate for local body areas requiring different support than the overall bed. To aid in the placement of the various foam spring firmnesses there may be facilities to hold the foam springs in the required locations and a method of determining where to place the various foam springs to provide the users desired comfort. There may be a plurality of methods to place the different foam spring firmness into the bed that may include trial iteration, a questionnaire, a software application, or the like. The plurality of foam spring placement methods may be performed by the user alone or may be done in combination with a bed enterprise, service enterprise, manufacturer, or the like.

One of the goals of the customizable firmness bed may be to provide the user with an apparatus and method of creating a bed with different local firmnesses that may compensate for different comfort requirements the user may have. The user may require less firmness in one location of the bed while also requiring firmer support in other locations of the bed. As described below, methods and systems are described that may allow the placement of individual firmness foam springs in a bed to provide total comfort requirements to a user.

Another goal may be to provide a method of determining where to place the various firmness foam springs within the bed to meet the users requirements. As described below, the user may provide input for the type or foam spring and foam spring firmness that may be required and a foam spring orientation may be determined using the users input.

Figure 1:
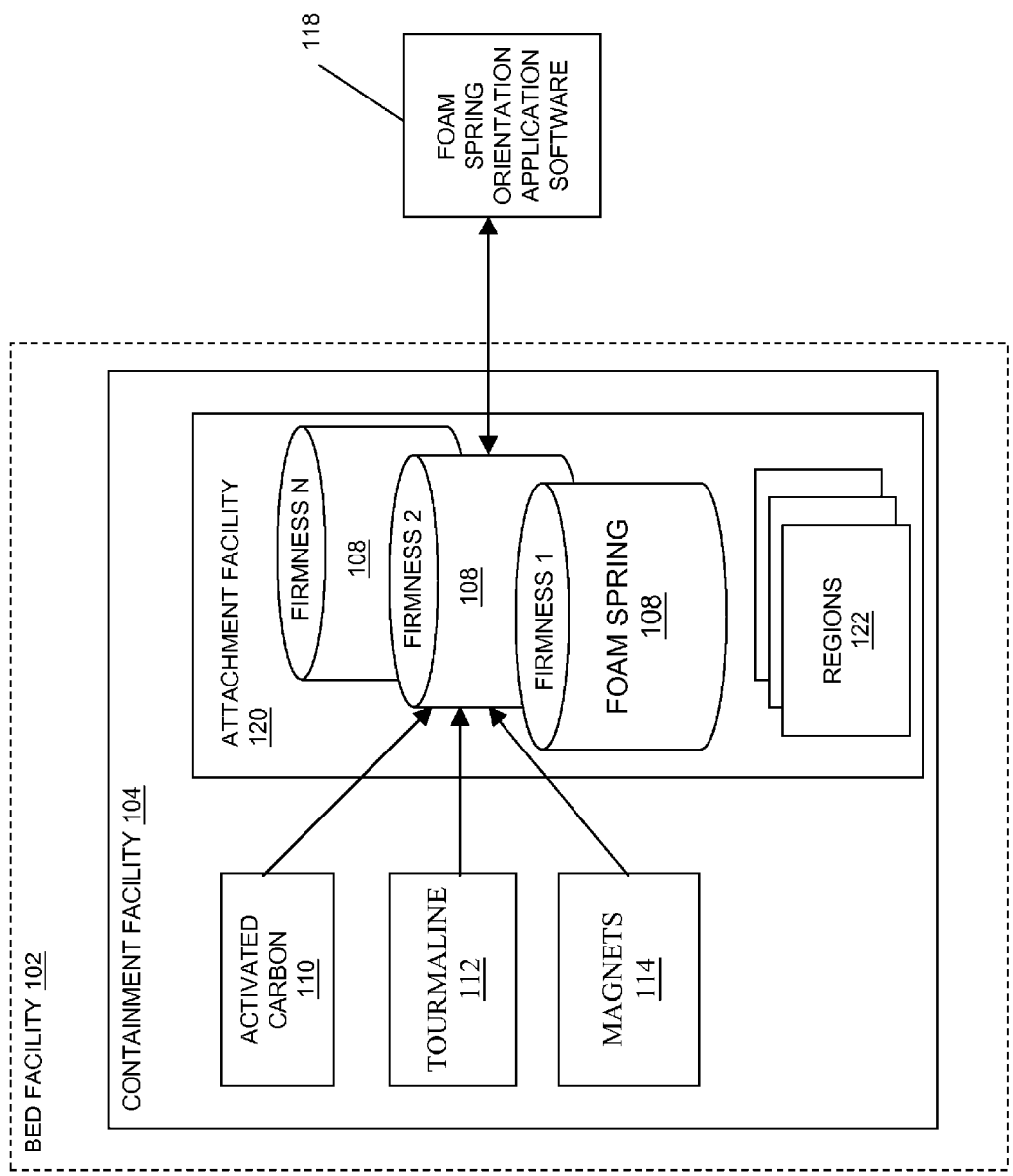
FIG. 1 shows a block diagram of the bed facility and related components.
Figure 2:
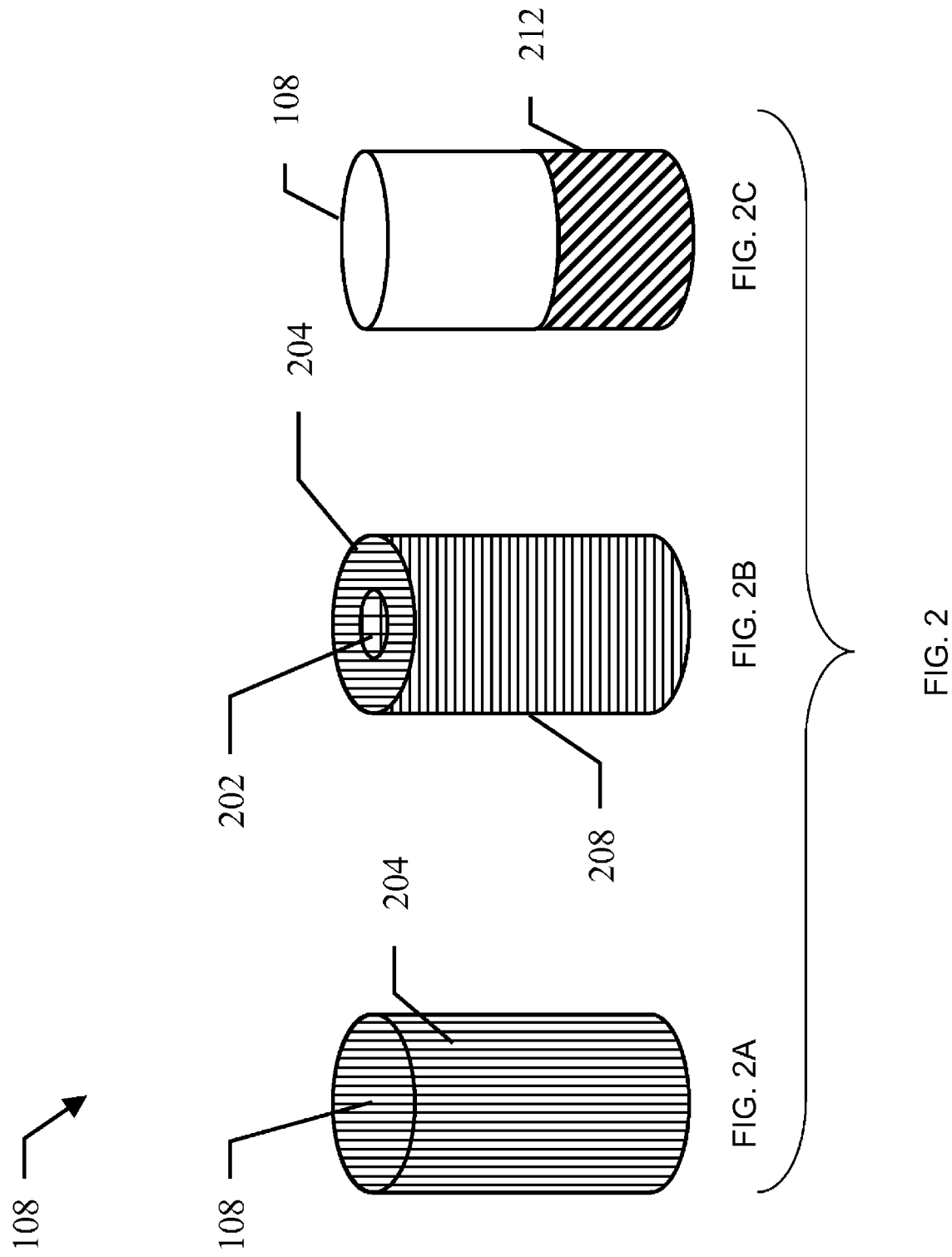
FIG. 2 shows three embodiments of foam spring configurations.

Referring now to FIG. 1, a block diagram of a bed facility 102 and associated components is shown. In embodiments, the bed facility 102 may include a containment facility 104, attachment facility 120, regions 122 of foam springs, and a plurality of foam springs 108. The foam springs 108 may also include materials that may provide health benefits to the user such as activated carbon 110, tourmaline 112, and magnets 114. Additionally, there may be a foam spring orientation application 118 to aid in the placement position of the plurality of foam springs 108. In an embodiment, the containment facility 104 may have the shape of a bed mattress with a bottom, top, and sides and may provide the shape in which the foam springs 108 may be placed. In an embodiment, the foam springs may be oriented into different regions 122 where the different regions may contain different firmness foam springs 108. The attachment facility 120, as will be described below, may provide openings in which the foam springs 108 may be placed. The attachment facility 120 openings may provide a pattern of openings to allow foam springs of various firmness to be placed within the containment facility 104. As shown in FIG. 1, the plurality of foam springs 108 may include firmness 1, firmness 2, through firmness N to provide various firmnesses within the bed facility 102. The foam spring orientation application 118 may be used by the user, sales enterprise, manufacturer, or the like to determine where the plurality of foam springs 108 should be placed to meet the users comfort requirements.

A bed facility 102 may be any type of bed that may provide a comfortable position for a user to rest, sleep, sit, convalesce, or the like. The bed facility 102 may include a standard bed, an adjustable bed, or the like. The bed facility 102 may be in any shape or size that may include a crib bed, twin bed, full size bed, queen size bed, king size bed, or the like. In an embodiment, the bed facility 102 may typically include a mattress, box spring, support frame, and the like. In an embodiment, the mattress may include a material top layer (e.g. foam or material), material bottom layer, springs, foam layers, and the like.

In an embodiment, a standard non-adjustable bed may be any bed that maintains a single rigid position that may not be capable of changing its shape or position. Additionally, the non-adjustable bed may be any rigid shape that may have a non-flat configuration.

In an embodiment, an adjustable bed may be a type of bed that is capable of adjusting at least one aspect of the bed shape such as a head section, a foot section, leg section, a torso section, or the like. In an embodiment, there may be a control interface that a user may use to adjust the position of at least one aspect of the bed.

In an embodiment, the foam springs 108 may be any type of soft foam that may include latex foam, urethane foam, visco-elastic foam, polyurethane foam, or the like. In an embodiment, the foam springs 108 may be used for bedding, pillows, chairs, couches, or the like. In an embodiment, the foam springs 108 may be considered a foam support for the bed facility 102.

In an embodiment, the foam springs 108 may be made of the solid foam material but may additionally have interior openings, exterior openings, interior and exterior opening, or the like. The openings may not be important to the firmness of the foam spring 108 but may be useful for manufacturability of the foam spring, providing space for added foam spring movement, contain health related materials, and the like.

In an embodiment, a mattress outer case may be a part of the bed facility 102 mattress that provides the volume space to place the foam springs 108. In an embodiment, the mattress outer case may be the mattress, a separate bed structure from the mattress, or the like. The mattress outer case may have a shape that is substantially the same as the bed facility 102. In an embodiment, the foam spring 108 may have a height that may equal to the height of the mattress outer case, may be a portion of the height of the mattress outer case, may have a height greater than the mattress outer case, or the like. In an embodiment, the cross section of the foam spring 108 may have any shape that may include a round shape, a square shape, a hexagon shape, an octagon shape, a star shape, an oval shape, or the like. In an embodiment, a plurality of foam springs 108 may be contained within the mattress outer case. The plurality of foam springs 108 may be all the same shape, a combination of shapes, or the like. In some cases, the foam spring 108 shapes may be combined to provide for spaces between the foam springs 108 that may allow the foam springs 108 to have freedom of motion. For example, the plurality of foam springs 108 may be all circle shaped or a combination of circle and oval shaped foam springs 108 to provide spaces between the foam springs 108 to allow motion areas for the foam springs 108. In other cases, it may be desired for the foam springs 108 shapes to be selected where the foam springs 108 are in close contact with each other to allow each of the foam springs 108 to support the adjacent foam springs 108. For example, the plurality of foam springs 108 may be all square foam springs 108 that contact adjacent foam springs 108 on all four sides; this may provide support to the foam spring 108 and all the adjacent foam springs.

In an embodiment, the plurality of foam springs 108 contained within the mattress outer case may have a plurality of different firmnesses. In an embodiment, the foam spring 108 firmness may be defined by an indentation load deflection (ILD) value, indentation force deflection (IFD) value, foam density, or the like. IFD, and in a similar manner ILD, is defined as the amount of force, in pounds, required to indent a fifty square inch, round surface into a foam material a certain percentage of the foam material total thickness. IFD may be specified as the number of pounds at a specific deflection percentage for specific height foam. For example, the IFD for a certain foam may be defined as 25 pounds/50 in$^2$ at a 25% deflection on a four inch thick piece. In an embodiment, the IFD may be influenced by the thickness of the foam material, the size of the material, and the like. For some types of materials, such as latex foam, the ILD value may correlate with the density of the material used. For others, the ILD may be less dependent, or even independent, of the density of the material used.

The firmness may also be measured or described by the density of the foam, in pounds per cubic foot, kilograms per cubic meter, or some other relevant standard. Although the density may not be a direct measurement of firmness, it may have a direct relationship to firmness. For example, a 110 kg/m3 density barrel may be firmer than a 95 kg/m3 barrel and the 95 kg/m3 barrel may be firmer than a 80 kg/m3 density barrel, and the like.

In an embodiment, the plurality of foam springs 108 may be configured within the mattress outer case to provide localized variable firmnesses for the bed facility 102. In an embodiment, the firmness of a bed facility 102 may be varied to provide comfort for a user that may be experiencing discomfort as a result of an accident, arthritis, surgery, chronic conditions, a neck condition, a knee condition, a sleep disorder, a disease, or the like. In some cases, the discomfort experienced by the user may not be static but may be part of a changing condition that may have the user experiencing more or less discomfort over time.

In many cases the discomfort the user may experience may be a local discomfort such as lower back pain, hip pain, neck pain, shoulder pain, and the like where it may be advantageous to have different firmness in these areas to provide an improved resting comfort in the local position. For example, the user may experience lower back pain and the plurality of foam springs 108, with a certain firmness, may be configured to provide less firm or firmer support in the lower back area to help provide a comfortable resting position.

In an embodiment, the user's discomfort may change over time, and the plurality of foam springs 108 may be modified to compensate for the changing user condition. For example, if the user is suffering from lower back pain, the initial foam spring 108 configuration may provide firmer support in the area of the lower back to position the back for improved healing. Over time, the user's lower back may improve and the foam springs 108 firmness in the area of the lower back may be modified by gradually providing less firm support until the form spring 108 firmness is the same as the remainder of the bed facility 102.

In an embodiment, when considering the location to place the various foam spring 108 firmnesses, the user's physical characteristics (e.g. height, weight, body shape, gender) may be considered for the proper placement and firmness of the foam spring 108. For example, the placement for the foam springs 108 for a user's lower back may be influenced by the user's height, typical sleeping position, size of the bed, shape of the bed, location the user sleeps on the bed (e.g. towards the head or foot of the bed), and the like.

It may be understood that the foam spring 108 configuration may be varied to account for more than one user condition of discomfort. For example, a user may have more than one body location that is effected by arthritis. The plurality of foam springs 108 may be configured to provide comfortable resting conditions to any or all of the body locations that the user desires discomfort relief. As these conditions may improve or worsen over time, the user may be able to change the foam spring 108 configuration, change the firmness of the foam spring 108 in certain bed facility 102 locations, or the like. As another example, a user may be experiencing discomfort from a chronic condition (e.g. arthritis) and a short-term condition (e.g. surgery). As the short term condition improves, the foam springs 108 in the short-term location may be changed as needed to provide the user with the desired comfort. In a similar manner, as the chronic condition may change with time, the foam springs 108 may be changed in these locations to provide the best comfort position for the user.

In another embodiment, the springs used within the bed facility 102 may be pneumatic or hydraulic springs that may be have adjustable firmness settings. A bed facility 102 may have a pattern of pneumatic or hydraulic springs that may be orientated using a containment facility 104. In an embodiment, the user may be able to adjust the individual firmnesses of the pneumatic or hydraulic springs to meet the comfort requirements of the user. In an embodiment, there may be a computer device interface where the user may be able to indicate the required firmness for certain locations of the bed facility 102. In an embodiment, the computer device may be a desktop computer, laptop computer, server, webserver, personal digital assistant (PDA), smartphone, handheld computer, or the like. The computer devices may include connections to a network for accessing other computer devices that may store or manage bed facility 102 information. In an embodiment, the networks may include a WAN, LAN, Internet, intranet, peer-to-peer, or other network connecting computer devices. In an embodiment, the computer device and networks may be wired or wirelessly connected. In an embodiment, using the network, the user may be able to access computer devices on the network to receive spring firmness settings. For example, the user may access the Internet from the computer device and may download a particular set of spring firmness settings that may match a desired comfort requirement. In an embodiment, the computer device interface may show a grid substantially the same as the orientation of the pneumatic or hydraulic springs where the user may be able to indicate the firmness of the individual springs, groups of springs, zones of springs, areas of springs, the entire bed facility 102, or the like. In an embodiment, the user may work with the computer device interface using a keyboard, mouse, joystick, touch screen, or other input device. In an embodiment, based on the user's indications, the computer device interface may control the pressure of the individual pneumatic or hydraulic springs to provide the desired comfort. In an embodiment, there may be preset firmness configurations that may be selected on the computer device interface; the preset configurations may be user set, historical settings saved by the computer device, preset at the manufacturer, preset at the bed facility 102 enterprise, or the like. In an embodiment, the user may change the firmness configuration as often as the user requires.

In addition to varying the foam spring 108 firmness in a bed facility 102, the foam spring may also contain additional health benefit materials that may provide an improved healing environment. In an embodiment, the additional health benefit materials may include activated carbon, tourmaline, magnets, and the like. In an embodiment, the additional health benefit materials may be used individually or in combination within the foam spring 108, the bed facility 102, or the like.

Activated carbon 110 is a material that has an exceptionally high surface area that includes a large amount of micro porosity. Sufficient activation for useful applications may come from the high surface area but further chemical treatment may used to enhance the absorbing properties of the activated carbon. Activated carbon attracts and holds certain chemicals therefore reducing dust, odors, contaminates, and the like from the area around the activated carbon. The contaminants may be attracted to and held (adsorbed) on the surface of the carbon particles. The characteristics of the carbon material such as particle size, pore size, surface area, surface chemistry, density, and hardness may influence the efficiency of adsorption.

In an embodiment, as part of the foam spring 108 manufacturing process, the activated carbon 110 may be mixed with the foam spring 108 material to provide an effective mixing of the activated carbon 110 into the foam spring 108. In an embodiment, the amount of activated carbon 110 in the foam spring 108 may be dependent on the environment of the bed facility, user requirements, or the like. For example, a user that requires a low dust environment may use foam springs 108 with increased activated carbon content.

In an embodiment, foam springs 108 that contain activated carbon 110 may be all of the foam springs 108 within the bed facility 102, may be a portion of the foam springs 108 within the bed facility 102, may be placed in zones in the bed facility 102 or the like.

In another embodiment, the activated carbon 110 may be added to the foam spring 108 as a separate filtering device. For example, the foam spring 108 may have an opening, a pocket, a recess, a holding area, or the like where activated carbon 110 may be added. In an embodiment, the foam spring 108 manufacturer, bed facility 102 enterprise, user, or the like may add the separate activated carbon 110 filtering device to the foam spring 108. In this embodiment, the activated carbon 110 may be replaceable to provide a continual level of air filtration. In this embodiment, the amount of activated carbon 110 that is used with the bed facility 102 may be varied to provide a level of air filtration to the users requirements.

Tourmaline 112 is a natural material that is a source of negative ions and far infrared rays. Tourmaline 112 is believed to be useful for improve circulation, to relieve stress, to improve mental alertness, and to strengthen immune system function.

In an embodiment, as part of the foam spring 108 manufacturing process, the tourmaline 112 may be mixed with the foam spring 108 material to provide an effective mixing of the tourmaline into the foam spring 108. In an embodiment, the amount of tourmaline 112 may be adjusted for a user's requirements.

In an embodiment, foam springs 108 that contain tourmaline may be all of the foam springs 108 within the bed facility 102, may be a portion of the foam springs 108 within the bed facility 102, may be placed in zones in the bed facility 102 or the like.

In another embodiment, the tourmaline 112 may be added to the foam spring 108 as a separate device. For example, the foam spring 108 may have an opening, a pocket, a recess, a holding area, or the like where tourmaline 112 may be added. In an embodiment, the foam spring 108 manufacturer, bed facility 102 enterprise, user, or the like may add the separate tourmaline 112 device to the foam spring 108. In this embodiment, the amount of tourmaline 112 that is used with the bed facility 102 may be varied to provide a health benefit level to the users requirements.

Magnets 114 are believed to be helpful for increased blood circulation, reducing inflammation, increased recovery speed from injuries, and the like. In an Embodiment, as part of the foam spring 108 manufacturing process, the magnets 114, magnetic material, or the like (magnets) may be mixed with the foam spring 108 material to provide an effective mixing of the magnets 114 into the foam spring 108. In an embodiment, the amount of magnets 114 in the foam spring 108 may be dependent on the user requirements.

In an embodiment, foam springs 108 that contain magnets 114 may be all of the foam springs 108 within the bed facility 102, may be a portion of the foam springs 108 within the bed facility 102, may be placed in zones in the bed facility 102 or the like.

In another embodiment, the magnets 114 may be added to the foam spring 108 as a separate device. For example, the foam spring 108 may have an opening, a pocket, a recess, a holding area, or the like where magnets 114 may be added. In an embodiment, the foam spring manufacturer, bed facility 102 enterprise, user, or the like may add the separate magnet 114 device to the foam spring 108. In this embodiment, the number or amount of magnets 114 that are used with the bed facility 102 may be varied to provide the health benefits to the user's requirements.

In an embodiment, the pattern of magnet placement within the foam spring 108, within the bed facility 102, a combination of placement within the foam spring 108 and bed facility 102, or the like may be important to the magnet health benefits received by the user. In an embodiment, a magnet orientation application may be used to determine the placement of the magnets within the foam spring 108, bed facility 102, and the like. In an embodiment, the magnets may be placed to provide an increased magnet influence to provide health benefits in certain user body locations. In an embodiment, the magnet orientation application may determine the location of magnets within each individual foam spring 108. A user may answer questions that are input to the magnet orientation application; the questions may be completed interactively with the computer device. In an embodiment, the magnet orientation application may provide magnet orientation within the foam spring 108, the bed facility 102, magnet foam spring 108 within the bed facility 102, and the like.

In an embodiment, the foam spring 108 may have an attachment facility 120 on the outer surface of the foam spring 108 to provide a connection to a containment facility 104; the containment facility 104 may be used to maintain the orientation of the plurality of foam springs 108 within the mattress outer case. In an embodiment, the foam spring 108 attachment facility 120 may be a geometric shape, a mechanical attachment device, a direct attachment device, or the like. In an embodiment, the geometric shape may be additional shaped foam material that extends out from the outer surface of the foam spring 108, may be a recess in the outer surface of the outer surface of the foam spring 108, may be a combination of extended shape and recess of the outer surface of the foam spring 108, or the like that may be used to connect the foam spring 108 to the containment facility 104.

In an embodiment, the mechanical attachment may be a buckle, a snap, a clip, glue, and the like that may allow the foam springs to be joined directly together, used to connect to the containment facility 104, or the like.

In an embodiment, the direct attachment device may be Velcro, tape, double stick tape, glue, elastic, or the like that may allow the foam springs to be joined directly together, connected to the containment facility 104, or the like.

In an embodiment, the foam springs 108 may be connected together using the attachment device without the use of the containment facility 104. In this manner, the foam springs 108 may maintain orientation by being connected to at least one adjacent foam spring 108.

In an embodiment, the individual foam springs 108 may be encased within a cylinder of fabric where the fabric cylinder may provide the attachment device. In an embodiment, at least two fabric encased foam springs 108 may be connected together in an orientation of foam spring 108 firmnesses. In an embodiment, the fabric encased foam springs 108 may be oriented using the same firmness foam springs 108, different firmness foam springs 108, or the like. In an embodiment, the individual fabric encased foam springs 108 may be connected using at least one of glue, Velcro, tape, fabric bonding, snaps, clips, string, webbing, or the like.

As an alternative fabric wrapping configuration, the foam springs may be only partially encased in the fabric wrapping, such as 30%-40%. Similar to the fully fabric enclosed foam springs, the partially encased foam springs may be connected using glue, Velcro, tape, fabric bonding, snaps, clips, string, webbing, or the like. In an embodiment, the partially encased foam springs may allow the changing or moving of the foam springs within the partial encasement and therefore may allow for firmness changes to be made within the mattress.

In an embodiment, the fabric encased foam springs 108 may be orientated and interconnected as a line of foam springs, as a circle of foam springs 108, as a square of foam springs 108, as a rectangle of foam springs 108, or the like. In an embodiment, at least one interconnected fabric encased foam springs 108 may be configured into a bed facility 102. For example, the bed facility 102 may include a rectangular interconnected fabric encased foam springs 108 at the head and foot zones while the shoulders and hip zones use circle interconnected fabric encased foam springs 108.

In an embodiment, the more than one interconnected fabric encased foam springs 108 within a bed facility 108 may be all the same firmness, different firmnesses, or the like. In an embodiment, the firmness of the interconnected fabric encased foam springs 108 may be configured in the bed facility to meet the comfort requirements of the user.

In an embodiment, there may be a machine to encase the foam into the fabric cylinder. In an embodiment, the foam springs 108 and fabric or fabric cylinders may be loaded into the machine. The machine may take an individual foam spring 108 and wrapped it with the fabric or the fabric cylinder. In an embodiment, the machine may use fabric and shape the fabric into the cylinder shape as part of the assembly process. In an embodiment, once the foam spring 108 is wrapped within the fabric cylinder, the machine may stage the completed fabric wrapped foam springs 108 for connecting into interconnected fabric encased foam springs 108. In an embodiment, the machine may be capable of connecting the individual fabric encased foam springs 108 into any orientation to assemble the interconnected fabric encased foam springs 108 that may include a line of foam springs, a circle of foam springs 108, a square of foam springs 108, a rectangle of foam springs 108, or the like.

In an embodiment, the foam spring 108 attachment facility 120 may be used to provide connection to adjacent foam springs 108, connection to the containment facility 104, or the like to assure the maintaining plurality of foam springs 108 orientation within the mattress outer case. As previously discussed, the plurality of foam springs 108 may have certain orientations that may provide various foam spring 108 firmnesses to provide relief for user discomfort. In an embodiment, a method and system of foam spring 108 containment may be used to assure that the preferred orientation of the plurality of foam springs 108 does not change, move, realign, or the like over time and use of the bed facility 102. In an embodiment, the foam springs 108 may directly connect together using mechanical attachment, direct attachment, or the like. In an embodiment, the containment facility 104 may be used to connect to the foam springs 104 using the geometric shape, the mechanical attachment device, the direct attachment device, or the like.

In an embodiment, the containment facility may be a patterned holding device that may provide positioning for the foam springs 108 within the mattress outer case. The pattern may provide the orientation of the foam springs 108 within the mattress outer case and therefore may provide the locations where various firmness foam spring 108 may be located. In an embodiment, the foam springs 108 may be placed only in the containment facility 104, placed without the containment facility 104, placed as a combination of in the containment facility 104 and without the containment facility 104, or the like. In an embodiment, the foam springs 108 that may be placed without the containment facility 104 may directly connect to adjacent foam springs 108, may not directly connect to adjacent foam springs 108, or the like. In an embodiment, the containment facility 104 may have the same shape as the mattress outer case, mattress, bed facility 102, or the like.

In an embodiment, the containment facility 104 may contain a preset pattern, an adjustable pattern, a plurality of patterns, or the like. In an embodiment, more than one containment facility 104 may be used within a mattress outer case. The individual containment facilities 104 may contain different patterns, may have different sized openings for different sized foam springs 108, or the like. In an embodiment, more than one containment facility 104 may be connected together to form a larger containment facility. For example, a first containment facility 104 may have a square pattern for the foam springs 108 and a second containment facility 104 may have a hexagon pattern for the foam springs 108. The square patterned containment facility 104 may be useful for a user's back area while the hexagon patterned containment facility 104 may be useful in a user's shoulders and hips. In an embodiment, the more than one containment facilities 104 may be connected together to form a larger containment facility 104, may be independent from each other, may be a combination of connected and independent containment facilities 104, or the like. In an embodiment, the more than one containment facility 104 may be combined to provide localized support to meet a user's requirement for discomfort relief. For example, within a mattress outer case, square containment facilities 104 may be used at a users head, back, and leg locations while the hexagon containment facilities may be used for the user's shoulders and hips. This configuration capability may provide for improved targeting of certain firmness foam springs 108 to a users requirement.

Figure 4:
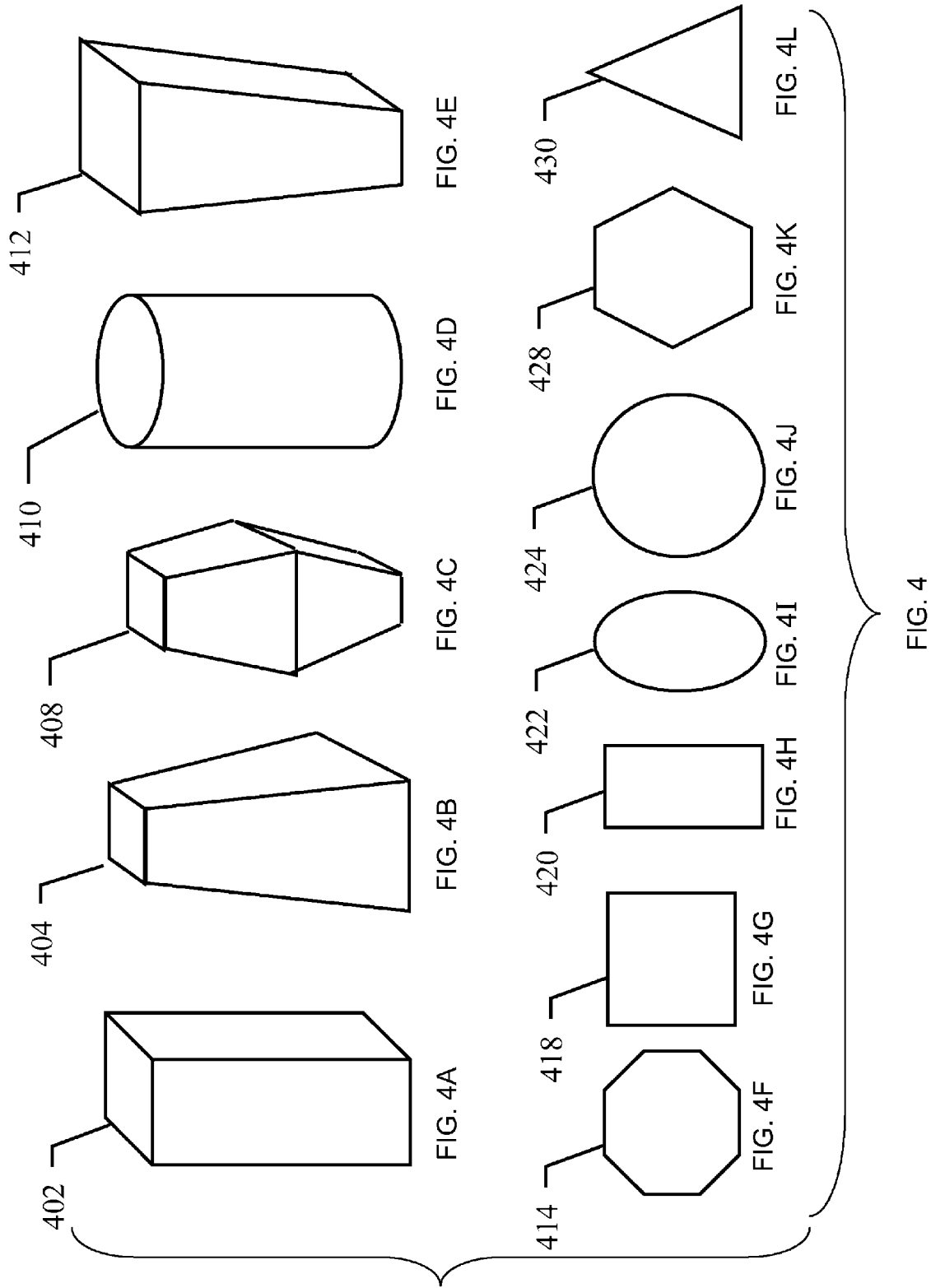
FIGS. 4A-4H and 4J-4M show different shapes embodiments of a foam spring.
Figure 5:
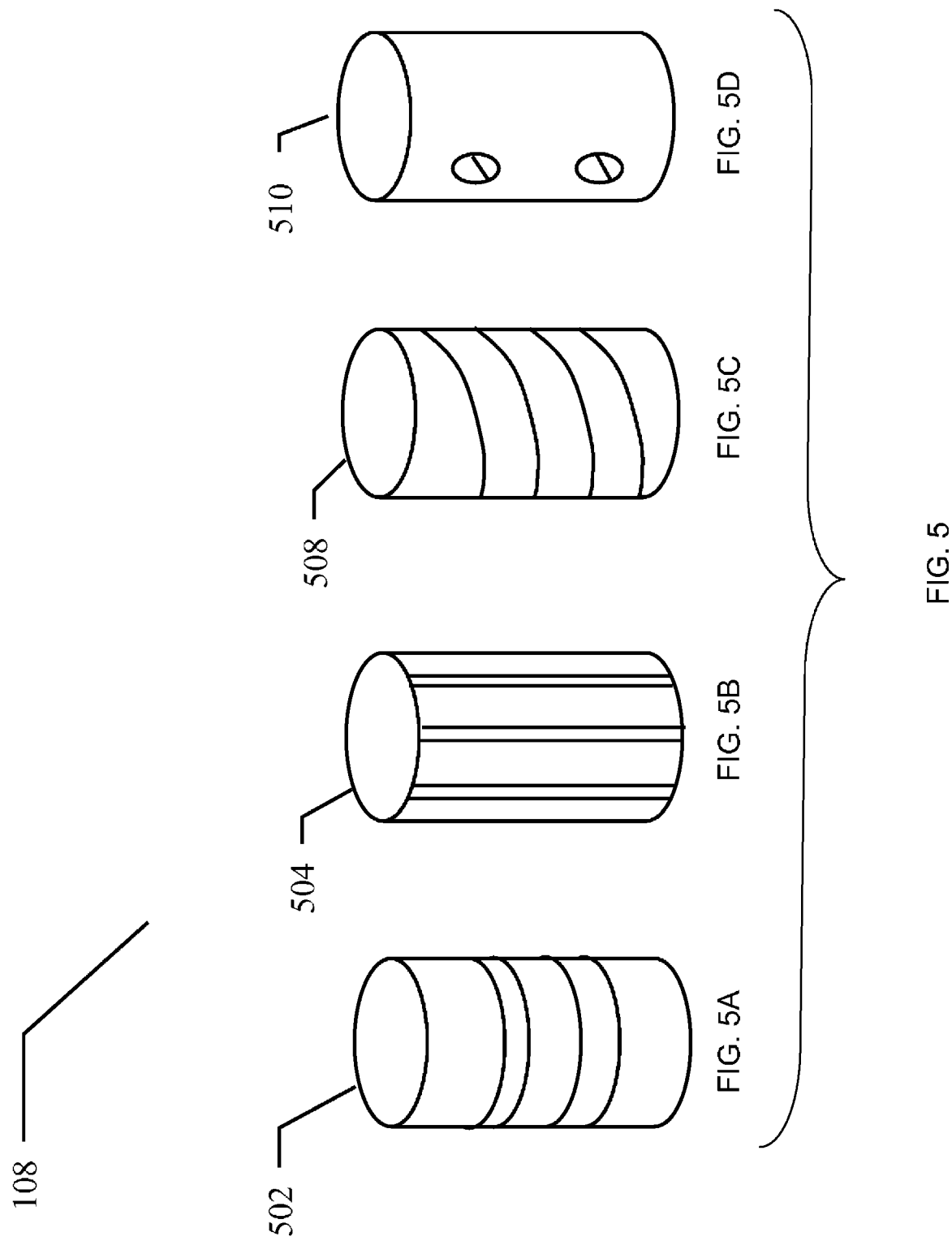
FIGS. 5A-5D show different embodiments of exterior and interior shapes for a foam spring.
Figure 6:
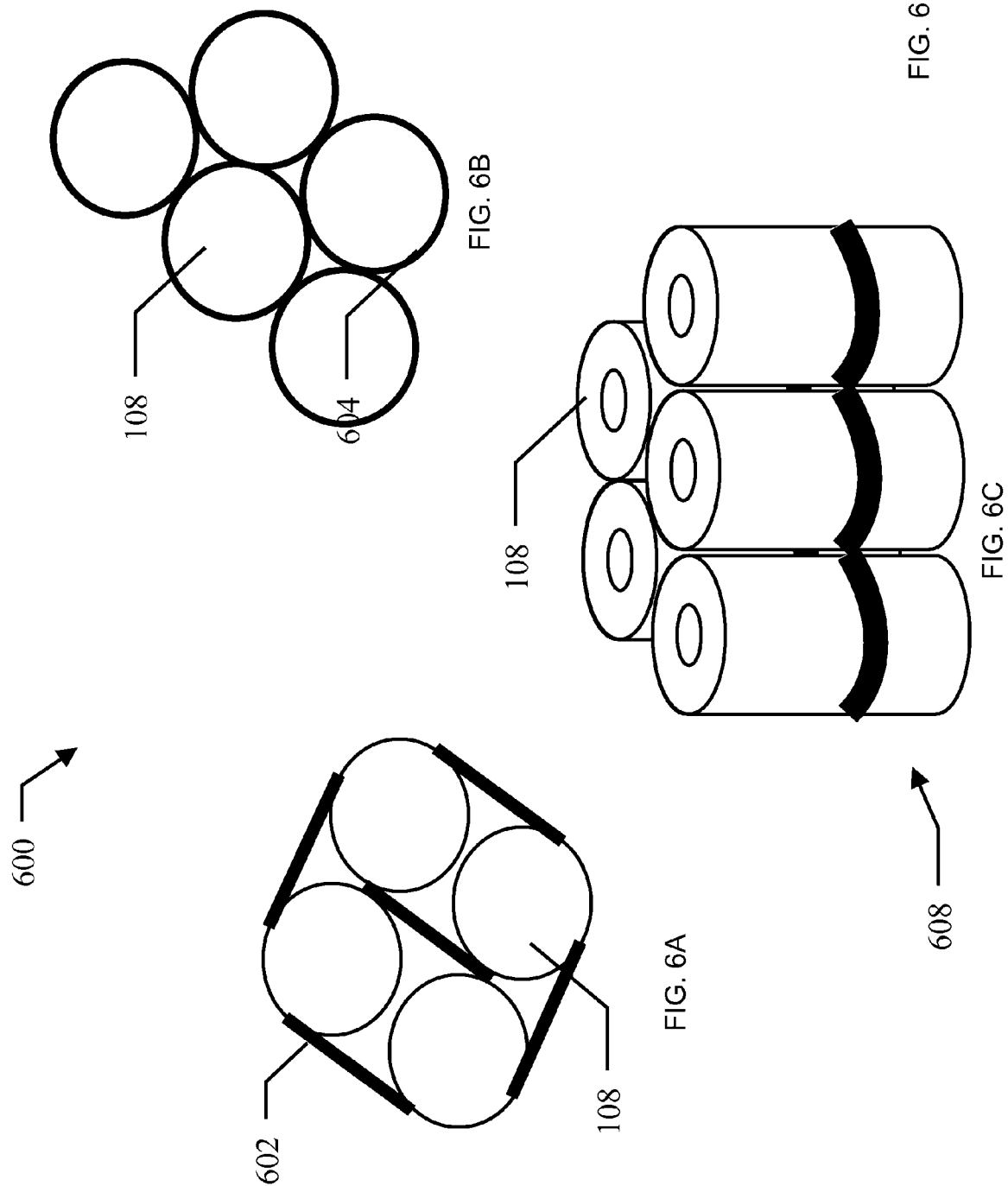
FIGS. 6A-6C show embodiments of foam springs combined with an attachment facility.
Figure 7:
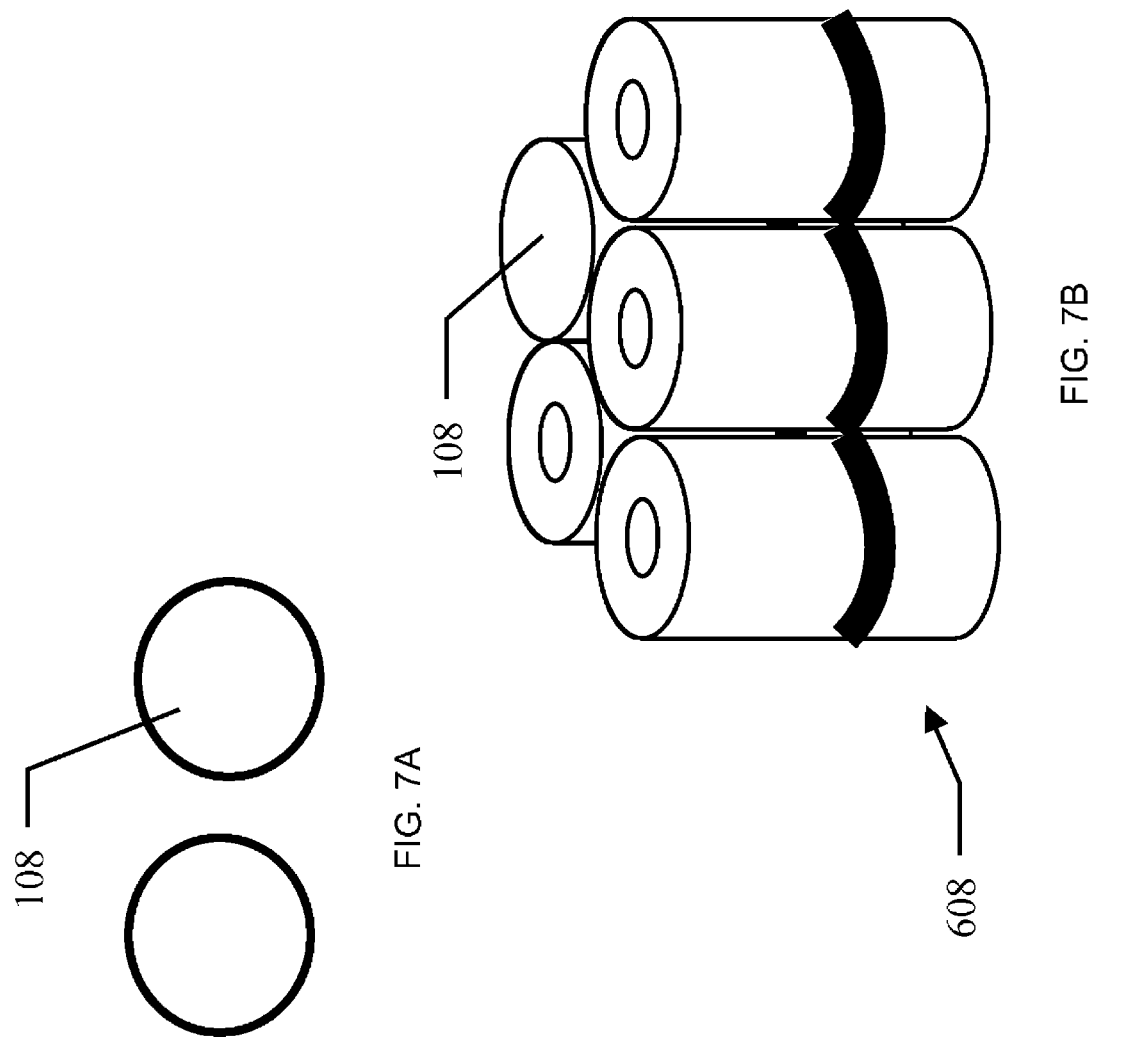
FIGS. 7A-7B show embodiments of foam springs combined with an attachment facility.

In an embodiment, the containment facility 104 may be made from materials, non-rigid materials, a combination of rigid and non-rigid materials, and the like. In an embodiment, a rigid containment facility 104 may be made of metal, plastic, or the like. In an embodiment, a flexible containment facility 104 may be a cable, a rope, a strap, a web, an elastic material, foam, or the like. In an embodiment, the containment facility 104 may include both rigid and non-rigid materials. For example, the containment facility 104 may be rigid but may contain non-rigid materials to connect to the foam springs 108. One example of a possible embodiment of the present invention is shown in FIGS. 4A and 4B. The density of the latex foam is varied in different cylinder-shaped components that may be referred to as "barrel coils." The barrel coils may vary in density and therefore in their ILD (softness/firmness rating) because the density of latex foam has a direct correlation with ILD. Individually molded latex barrels/cylinders are connected to each other by a fabric webbing. Such fabric webbing is then pulled through the foam encasement on the sides of the mattress to hold the barrels in place. This is only one possible embodiment of the present invention, and it should be understood that many different configurations and materials may be used.

In another embodiment of the containment facility 104 may be a layer of foam with a pattern of holes for placing the foam springs 108; the layer of foam may have substantially the same shape as the bed facility 102. The foam springs 108 may be attached to the layer of foam using Velcro, tape, double stick tape, glue, elastic, matching geometric patters in the layer of foam and foam spring 108, or the like. In an embodiment, there may be more than one layer of foam used to contain the foam springs 108. In an embodiment, the layer of foam may connect to the foam springs 108 in predetermined locations on the foam springs 108. For example, a single layer of foam may contact the foam springs 108 at the center of the foam springs 108. In another example, if two layers of foam are used, the contact may be at the top and bottom of the foam spring 108.

In another embodiment, the containment facility 104 may be a side foam rail, a foam bottom layer, a foam top layer, or the like that include indentations in which the foam spring may fit. As an example, the side foam rails may have an indentation shape to hold the same shaped foam spring and the foam springs may fit into the side rail indentations to hold the foam springs in the correct orientation. Separately from or in combination with the indented side rails, the top foam layer and/or the bottom foam layer may have indentations in the shape of the foam spring ends to hold the foam springs in the correct orientation. In an embodiment, the indentations in the top and/or bottom foam layers may provide a nesting location for the foam spring to provide orientation positioning.

In another embodiment, the containment facility 104 may hold a combination of foam springs 108 and metal inner springs. In an embodiment, the metal inner springs may be used side by side with the foam springs, the metal inner springs may be under the foam springs 108, the metal inner springs may be above the foam springs 108 or the like. The metal inner springs may be used to provide added support to the user, localized support to the user, or the like.

In an embodiment, it may not be required that each patterned containment facility opening have a foam spring 108.

In an embodiment, the containment facility 104 may have pattern openings that provide locations for the various foam springs 108 firmness patterns that may be required by the user. In an embodiment, the foam spring 108 firmness pattern may be determined using certain containment facilities 104. For example, before proceeding with the determination of the foam spring 108 requirements, the type of containment facility 104 may be determined that may provide the patterned opens to support the foam spring 108 firmness patterns. In considering the users comfort needs, a certain containment facility 104 may be selected that may provide for the proper targeting of foam springs 108 in the area required. For example, a user may select a containment facility 104 the has a pattern that provides proper general support to his or her back but may also have foam spring 108 openings that may be used to target a particular firmness to the users shoulders.

A person knowledgeable in the art may understand that the containment facility 104 and foam spring 108 combinations may take many different configurations to provide the user comfort required.

In an embodiment, using the containment facility 104, the foam spring 108 pattern may be installed into the mattress outer case by a bed facility 102 manufacturer, by a bed facility 102 enterprise, by a bed facility 102 setup enterprise, by a user, or the like. In an embodiment, after the initial foam spring 108 pattern is set, the foam spring 108 pattern may be altered by the bed facility 102 manufacturer, the bed facility 102 enterprise, the bed facility 102 setup enterprise, the user, or the like. In an embodiment, the altering of the foam spring 108 pattern may be a result of changing user comfort conditions, changing user requirements, or the like.

In an embodiment, the user may contact a bed facility 102 enterprise for the determination of the foam spring 108 pattern that may provide the user with his or her desired bed facility 102 comfort. In an embodiment, the foam spring 108 pattern may include foam spring 108 firmness, foam spring 108 firmness location, or the like. In an embodiment, the foam spring 108 pattern may be determined by an iterative trial, an interview of the user by the bed facility 102 enterprise, by questionnaire, by software application determination, or the like.

In an embodiment, the iterative trial may be the trial and error method of physically trying a first foam spring 108 pattern with the user trying the foam spring 108 pattern configuration and, based on the users input, making changes to the first pattern to create a second pattern.

In an embodiment, the interview process may involve the user and the bed facility 102 enterprise discussing the needs of the user to determine how the foam spring pattern may be configured to best fit the user. In an embodiment, the bed facility 102 enterprise may use the information from the interview to establish a foam spring 108 pattern based on previous patterns, a set of patterns, experience, or the like. In an embodiment, after the initial pattern is determined, a trial process may be used to find the final foam spring 108 pattern.

In an embodiment, the user may fill out a questionnaire that may request information on the comfort requirements the user may require. Using the answers to the questionnaire the bed facility 102 enterprise may determine the foam spring 108 pattern. In an embodiment, the questionnaire answers may provide a guided method and system to the foam spring 108 pattern determination, may provide at least one complete foam spring 108 pattern, may provide a first foam spring 108 pattern for trial, or the like.

In an embodiment, the software application may be a questionnaire that may request information on the comfort requirements the user may require. Using the answers to the questionnaire, the software application may determine the foam spring 108 pattern. In an embodiment, the questionnaire answers may provide a guided method and system to the foam spring 108 pattern determination, may provide at least one complete foam spring 108 pattern, may provide a first foam spring 108 pattern for trial, or the like. The software application will be discussed in more detail below.

In an embodiment, once the foam spring 108 pattern is determined, the final foam spring 108 pattern may be place into the containment facility 104 and bed facility 102 for the user. The final foam spring 108 pattern may be created by the manufacturer, the bed facility 102 enterprise, the bed facility 102 setup organization, the user, or the like.

In an embodiment, the bed facility 102 manufacturer may have an inventory of various foam springs 108 to select from to build the user foam spring 108 pattern. In an embodiment, the bed facility 102 manufacturer may use the foam spring 108 pattern information received from the user/bed facility 102 enterprise to build the foam spring 108 pattern to the users requirements. After the bed facility 102 is complete, including the foam spring 108 pattern, the bed facility 102 may be transported to the bed facility 102 enterprise, the bed facility 102 setup enterprise, the user, or the like.

In an embodiment, the bed facility 102 enterprise may have an inventory of various foam springs 108 to select from to build the user foam spring 108 pattern. In an embodiment, the bed facility 102 enterprise may use the foam spring 108 pattern information determined with the user to build the foam spring 108 pattern to the users requirements. In an embodiment, the bed facility 102 enterprise may select foam springs 108 from inventory to build the bed facility 102 that includes the user determined foam spring 108 pattern.

In an embodiment, the bed facility 102 setup enterprise may have an inventory of various foam springs 108 to select from to build the user foam spring 108 pattern. In an embodiment, the bed facility 102 setup enterprise may use the foam spring 108 pattern information determined by the user/foam spring 108 enterprise to build the foam spring 108 pattern to the users requirements. In an embodiment, the bed facility 102 setup enterprise may select foam springs 108 from its inventory to build the bed facility 102 at the user's location; the bed facility 102 includes the user determined foam spring 108 pattern.

In an embodiment, the user may purchase at least one set of foam springs 108 that match the foam spring 108 pattern developed with the bed facility 102 enterprise. In an embodiment, at the user's location, the user may assemble the bed facility 102 with the predetermined foam spring 108 pattern.

As previously discussed, over time the users comfort requirements may change and the change may require the firmness of the foam springs 108, the foam spring 108 pattern, or the like to be changed to match the user's needs. In an embodiment, once the bed facility 102 with the user required foam spring 108 pattern has been initially assembled, the configuration may altered by the bed facility 102 manufacturer, the bed facility 102 enterprise, the bed facility 102 setup enterprise, the user, or the like. In an embodiment, the bed facility reconfiguration may be enabled at a retail store, at a home of a user, or the like. In an embodiment, the bed facility may be provided with a zipper or other attachment device to allow access to the foam springs 108. The foam springs 108 may be contained in a webbing that allows hand removal and replacement of the foam springs 108. In an embodiment, the bed facility reconfiguration may be enabled at a retail store, at a home of a user, or the like. In an embodiment, the bed facility may be provided with a zipper or other attachment device to allow access to the foam springs 108. The foam springs 108 may be contained in a webbing that allows hand removal and replacement of the foam springs 108. Using methods previously discussed, the foam spring 108 pattern, foam spring 108 firmness, or the like may be revised by trial process, questionnaire, interview, software application, or the like. In an embodiment, once a new foam spring 108 pattern has been determined, the existing foam springs 108 may be removed from the mattress outer case and the newly determined foam spring 108 pattern may be assembled into the mattress outer case. In an embodiment, the foam spring 108 pattern may be altered as often as required by the user.

In an embodiment, the bed facility 102 enterprise, bed facility 102 setup enterprise, the bed facility 102 manufacturer, or the like may offer predetermined foam spring 108 patterned bed facilities 102. There may be a number of standard foam spring 108 pattern bed facilities 102 that may be historically preferred, provide standard relief for particular user discomfort, or the like. In an embodiment, the standard bed facility 102 may have a certain number of areas or zones that have foam spring 108 firmnesses that may provide comfort to users with common comfort requirements. For example, a predetermined foam spring 108 pattern may be a medium firmness foam spring 108 under the head/shoulders, a firmer foam spring 108 under the back, and a less firm foam spring 108 under the legs. In another example, there may be predetermined foam spring 108 patterns for hip, shoulder, neck, leg, or the like comfort. In an embodiment, a user may purchase a standard bed facility 102 with a predetermined foam spring 108 pattern that may meet the user's requirements and may make firmness adjustments to the foam spring 108 pattern with purchased replacement foam springs 108.

In an embodiment, the bed facility 102 may have a uniform (or substantially uniform) firmness by using foam springs 108 of all (or substantially all) the same firmness.

A foam spring orientation application software 118 may be used to determine the placement of the plurality of foam springs 108 within the mattress outer case. In an embodiment, the foam spring orientation application software 118 may be a stand-alone application, a server application, a web application, or the like. In an embodiment, the plurality of foam springs 108 may be of differing firmnesses and the foam spring orientation application software 118 may be used to determine the proper placement of the different foam spring 108 firmnesses to meet the users comfort requirements. For example, the user may require certain locations of the mattress to be less firm, more firm, or the like to help provide the proper support for a part of his or her body that may be experiencing discomfort such as a hip, shoulder, back, neck, knee, or the like. The user may have had an accident, surgery, suffer from arthritis, or the like and different firmnesses within the bed facility 102 may be required to provide the proper comfort for these areas of discomfort.

In an embodiment, the foam spring orientation application software 118 may present questions to a user to determine the comfort requirements of the user's bed facility 102. The questions may be presented to the user as a paper questionnaire, a computer questionnaire, indicating on a chart of the body the areas needing comfort consideration, or the like. In an embodiment, the user may interact with the foam spring orientation application 118 at the user's location, at the bed facility 102 enterprise, at the bed facility 102 setup enterprise, at the bed facility 102 manufacturer, or the like.

In an embodiment, the questionnaire may contain preset questions that may be input to a computer device from a completed paper questionnaire, interactively on the computer device, or the like. In an embodiment, the computer device may be a desktop computer, a laptop computer, a tablet computer, a kiosk, a PDA, a smart phone, or the like. In an embodiment, the computer device may work with a network that may be a LAN, WAN, Internet, intranet, wireless, wired, or the like. In an embodiment, the computer device interactive questionnaire may present additional questions to the user based on the answer to a previous question. For example, a first question may ask if the user suffers from discomfort in his or her back. If, for example, the user answers yes, the questionnaire may continue to ask questions that are particular to back discomfort such as location of pain, pain levels, if the pain is sharp, if the pain is dull, if the pain increases with time, and the like.

In an embodiment, the user may indicate on a body chart the areas of discomfort that may require various foam spring 108 firmnesses. In an embodiment, the body chart may be in paper form, on a computer device, or the like. In an embodiment, the body chart operated on a computer device may incorporate a touch screen to enable the user to touch the locations on the computer screen that may require addition comfort control. In an embodiment, the user may indicate the location, the type of discomfort, the intensity of discomfort, and the like that the form spring orientation application software 118 may be able to interpret into bed facility 102 firmness requirements. In an embodiment, the body chart may be divided into a grid, sections, zones, or the like to allow the user to define the location of discomfort.

In an embodiment, after the questionnaire is complete, the application software 118 may determine at least one configuration of foam springs 108 for the bed facility 102. The configuration my include foam springs 108 of varying firmness to provide a firmness configuration that may match the firmness requirements of the user. For example, if the user indicated in the questionnaire that he or she suffered from back pain in the lower back area, the foam spring orientation application software 118 may configure less firm or firmer foam springs in the area of the lower back. The remainder of the bed facility 102 may be configured to have a standard firmness to properly support the remainder of the user's body. This configuration of varying firmness across the bed facility 102 may provide the user with a comfortable position to rest, sleep, or the like.

In an embodiment, after the foam spring orentation application software 118 has determined the foam spring 108 configuration for the user, a test configuration may be setup in the bed facility 102 enterprise for the user to try the form spring 108 configuration. Based on the user trying the foam spring 108 configuration at the bed facility 102 enterprise, the foam spring 108 configuration may be modified to improve the bed facility 102 comfort.

In an embodiment, the foam spring 108 configuration may be manually modified by the user or the bed facility enterprise by interchanging form springs 108 and retrying the comfort of the bed facility 102 until a desired comfort has been reached. In another embodiment, the answers to the foam spring orientation application software 118 may be revised and the foam spring orientation application software 118 may provide a new foam spring 108 configuration for the user to try. In another embodiment, the foam spring orientation application software 118 may have provided more than one foam spring 108 configurations and the user may try at least one of the additional configurations to determine if one of the additional configurations provides the desired comfort.

In an embodiment, the foam spring orientation application software 118 may be a web application; the web application may store the final foam spring 108 pattern configuration. In an embodiment, if the foam spring 108 pattern requires modification, the bed facility 102 enterprise, bed facility 102 manufacturer, bed facility 102 setup enterprise, user, or the like may use the stored foam spring 108 pattern information to revise the foam spring 108 pattern using the web accessed foam spring orientation application software 118. In an embodiment, the web-based application may have the same questionnaire that was used to determine the original foam spring 108 pattern. In an embodiment, the web-based foam spring orientation application software 118 may be accessed, with the user's stored information, and the information revised to match the most recent user information. In an embodiment, the web-based foam spring orientation application software may determine at least one revised foam spring 108 pattern.

In an embodiment, after the revised foam spring 108 pattern is determined, the new foam springs 108 that may be required by the revised foam spring 108 pattern may be order by the web-based foam spring orientation application software. In an embodiment, the revised foam spring 108 pattern may be assembled by the bed facility 102 manufacturer, the bed facility 102 enterprise, the bed facility 102 setup enterprise, user, or the like.

In another embodiment, the user may use the foam spring orientation application software 118 to reconfigure the foam spring 108 configuration. In an embodiment, the user may have been provided a copy of the foam spring orientation application software 118 that the user may operation on the users own computer device. The user may input revised answers to the questionnaire; the new questionnaire answers may be used to determine a new foam spring 108 configuration.

A bed facility 102 may be any type of bed that provides a comfortable position to a user for resting, sleeping, sitting, convalescing, or the like. The bed facility 102 may be a standard non-adjustable bed, an adjustable bed, and the like. In an embodiment, the bed facility 102 may include a mattress, box spring, support frame, and the like. In an embodiment, the mattress may include a material top layer (e.g. foam or material), springs, foam layers, and the like. The bed facility 102 may be used as a supportive facility for resting and sleeping by users of any age and may include infant beds (e.g. cribs), children beds, bunk beds, adult beds, and the like. In an embodiment, beds may be made of various different sizes such as twin, full, queen, king, and the like for different situations and user requirements. The bed sizes may be industry standard sizes but there may also be more than one standard size for a bed type such as a long twin bed verses a standard sized twin bed.

A standard non-adjustable bed may be any bed that maintains a single rigid position that may not be capable of changing shape or position. In an embodiment, the standard non-adjustable bed may typically be used in a bedroom for sleeping, resting, or the like and may provide a flat horizontal surface for the user to lie down on. Additionally, the non-adjustable bed may be a single rigid shape that may have a non-flat configuration. Typically, the standard non-adjustable bed may be rectangular in shape, but may also be in other shapes such as round, square, or the like.

An adjustable bed may be a type of bed that capable of adjusting at least one aspect of the bed shape such as a head section, a foot section, leg section, a torso section, or the like. In an embodiment, there may be a control interface that a user may use to adjust the position of at least one aspect of the bed. In an embodiment, the bed position adjustment may be to provide a more comfortable position to the user for performing a task (e.g. writing at a work station), relief from pain, watching TV, provide a different sleeping position, improved blood circulation (e.g. elevated head or feet), and the like. In an embodiment, the bed structure may be flexible, hinged, or the like to provide locations for the adjustable bed to move into different positions.

In an embodiment, the bed facility 102 may use a mattress that contains foam springs 108 to support the user. In an embodiment, the foam spring 108 may be made of any type of soft foam that may include latex foam, urethane foam, viscoelastic foam, polyurethane foam, or the like. In an embodiment, the foam spring 108 may be contained in a mattress outer casing; the mattress outer casing may be in the shape of the bed. In an embodiment, the foam spring 108 may provide direct support to the user, provide indirect support by supporting an over layer of material, or the like. In an embodiment, the foam spring 108 may typically be of a height to fit between the top and bottom surfaces of the mattress outer casing. In another embodiment, the foam spring 108 may be a portion of the height of the mattress outer casing and more than one foam spring may be placed on top of another to fill the space between the top and bottom of the mattress outer casing.

In an embodiment, the foam spring 108 may have a cross sectional shape that may include round, square, hexagon, octagon, star shaped, oval, or the like. In an embodiment, foam springs 108 may be used in any facility that a user may require soft supportive characteristics such as beds, pillows, chairs, couches, and the like. In an embodiment, there may be a plurality of foam springs 108 used in a mattress outer casing to provide support to a user. The plurality of foam springs that may be used within the volume of the mattress outer casing may be a combination of cross sectional shapes. For example, the mattress outer casing volume may use a combination round and oval shaped foam springs 108 to provide a different foam spring 108 configuration to different parts of the mattress. In an embodiment, the plurality of foam springs 108 may fit together such that there may be spaces between the foam springs 108; the spaces may provide freedom of motion for the plurality of foam springs. In another embodiment, the shape of the foam springs 108 may be selected that provides for the foam springs 108 to fit tightly together; the tight fit may allow each foam spring 108 to provide support to adjacent foam springs 108. In an embodiment, the cross sectional shape of the foam springs 108 selected for placement within a mattress outer casing may provide for differing support characteristics to the user. For example, looser fitting foam springs 108 may provide for a softer support structure to the user while the tighter fitting foam springs 108 may provide a firmer support structure.

In an embodiment, the foam spring 108 may be solid foam, may contain interior openings, may contain exterior openings, may contain a combination of interior and exterior openings, or the like. In an embodiment, the foam spring 108 interior and exterior openings may not influence the spring foam 108 firmness but may be used for manufacturability, to provide space to allow movement of the foam spring 108, or the like. For example, an interior opening of the foam spring 108 may be used during manufacturing to provide for mold shapes, allow additional area for air injection, or the like. In an embodiment, the interior and exterior openings may be used to provide holding area for health benefit materials such as activated carbon, tourmaline, magnets, and the like.

In an embodiment, the foam springs 108 may have differing firmness that may be defined by an indentation load deflection (ILD) value, indentation force deflection (IFD) value, foam density, or the like. IFD, and in a similar manner ILD, is defined as the amount of force, in pounds, required to indent a fifty square inch, round surface into a foam material a certain percentage of the foam material total thickness. IFD may be specified as the number of pounds at a specific deflection percentage for specific height foam. For example, the IFD for a foam may be defined as 25 pounds/50 in$^2$ at a 25% deflection on a four inch thick piece. In an embodiment, the IFD may be influenced by the thickness of the foam material, the size of the material, and the like.

The firmness may also be measured or described by the density of the foam, in pounds per cubic foot, kilograms per cubic meter, or some other relevant standard. Although the density may not be a direct measurement of firmness, it may have a direct relationship to firmness. For example, a 110 kg/m3 density barrel may be firmer than a 95 kg/m3 barrel and the 95 kg/m3 barrel may be firmer than an 80 kg/m3 density barrel, and the like.

In an embodiment, the different IFD foam density, or the like, and therefore foam spring 108 firmness, may be varied or adjusted by using different density foam, different types of foam, or the like. In an embodiment, the foam spring 108 density may be varied by using different percentages of air when manufacturing the foam spring 108; the amount air used during the foam manufacture may provide the amount or size of cells within the foam spring 108. For example, a foam spring 108 with more air, and therefore more foam cells, may provide for lower density foam and therefore may be less firm.

In an embodiment, the foam spring 108 may include an attachment facility 120 to allow more than one foam spring 108 to be associated with other foam springs 108 within a mattress outer casing; the attachment may be used to maintain the orientation of one foam spring 108 to another foam spring 108, the alignment of various firmness foam springs 108, or the like. In an embodiment, the attachment facility 120 may be a feature on the outer surface of the foam spring 108 such as a geometric shaped raised foam area, geometric shaped recessed foam area, attached Velcro material, mechanical snaps, clips, buckles, glue, adhesive, tape, or the like.

A containment facility 104 may be a mechanical device that may be used to contain, orient, and maintain the plurality of foam springs 108 in a pattern within the volume of the mattress outer casing. In an embodiment, the containment facility 104 may be a rigid device, semi-rigid device, flexible device, or the like that may be preset, set by the user, preset and adjusted by the user, or the like. In an embodiment, a rigid containment facility 104 may be made of metal, plastic, or the like. In an embodiment, a flexible containment facility 104 may be a cable, a rope, a strap, a web, or the like. In an embodiment, the rigid and flexible containment facilities 104 may be combined by having a rigid structure such as a plastic patterned containment facility 104 combined with a flexible component such as a strap to attach to the foam spring 108.

In an embodiment, the containment facility 104 may attach to each foam spring 108 attachment facility 120 and may be used to grip the foam spring 108 attachment facility 120, fit into the foam spring 108 attachment facility 120, fit around the foam spring 108 attachment facility 120, connect to the foam spring 108 attachment facility 120, or the like.

In an embodiment, the containment facility 104 pattern may be preset, user set, fixed, adjustable, a combination of preset and adjustable, or the like. For example, the containment facility 104 may be delivered to the user with a preset pattern but the user may be able to adjust the containment facility 104 pattern to position the foam springs 108 in a user desired pattern.

Activated carbon 110 is a material that has an exceptionally high surface area that includes a large amount of micro porosity. Sufficient activation for useful applications may come from the high surface area but further chemical treatment may used to enhance the absorbing properties of the activated carbon. Activated carbon attracts and holds certain chemicals therefore reducing dust, odors, contaminates, and the like from the area around the activated carbon. The contaminants may be attracted to and held (adsorbed) on the surface of the carbon particles. The characteristics of the carbon material (e.g. particle size, pore size, surface area, surface chemistry, density, and hardness) influence the efficiency of adsorption.

In an embodiment, the activated carbon 110 may be mixed with the foam spring 108 material for the removal of contaminants from the bed facility 102 environment. In another embodiment, the activated carbon 110 may be added to the foam spring 108 as a separate filtering device. For example, the foam spring 108 may have an opening where activated carbon 110 may be added to act as a filter to remove contaminates from the air within and around the bed facility 102. The foam spring manufacturer, bed facility 102 enterprise, user, or the like may add the activated carbon 110 to the foam spring 108. In this embodiment, the activated carbon 110 may be replaceable.

In an embodiment, the activated carbon may be a coating on the foam spring, may be inserted into the annulus of the foam spring, may be a ring around the perimeter of the foam spring, or the like.

Tourmaline 112 is a natural material that is a source of negative ions and far infrared rays. Tourmaline 112 is believed to be useful for improved circulation, relieving stress, improved mental alertness, and strengthening immune system function.

In an embodiment, the tourmaline 112 may be mixed with the foam spring 108 material during the foam spring 108 manufacture. In another embodiment, the tourmaline 112 may be added to the foam spring 108 as a separate device. For example, the foam spring 108 may have an opening where tourmaline 112 may be added to add the health benefits of tourmaline to the bed facility 102. The foam spring manufacturer, bed facility 102 enterprise, user, or the like may add the tourmaline 112 to the foam spring 108. In this embodiment, the tourmaline 112 may be replaceable.

In an embodiment, the tourmaline may be a coating on the foam spring, may be inserted into the annulus of the foam spring, may be a ring around the perimeter of the foam spring, or the like.

Magnets 114 are believed to be useful for increased circulation, reduced inflammation, increased recovery speed from injuries, and the like. In an embodiment, the magnets 114 may be mixed with the foam spring 108 material during the foam spring 108 manufacture, placed in specific locations in the foam spring 108 during manufacture, or the like. In another embodiment, the magnets 112 may be added to the foam spring 108 as a separate device. For example, the foam spring 108 may have an opening where magnets 112 may be added to add the health benefits of magnets 112 to the bed facility 102. The foam spring manufacturer, bed facility 102 enterprise, user, or the like may add the magnets 112 to the foam spring 108. In this embodiment, the magnets 114 may be replaceable.

In an embodiment, the magnets may be a coating on the foam spring, may be inserted into the annulus of the foam spring, may be a ring around the perimeter of the foam spring, or the like.

In an embodiment, the pattern of magnet placement within the foam spring 108 and within the bed facility 102 may be important to the magnet health benefits. In an embodiment, a magnet orientation application may be used to determine the placement of the magnets within the foam spring 108, bed facility 102, and the like. In an embodiment, the magnets may be placed to provide an increased magnet influence to provide health benefits in certain locations. In an embodiment, the magnet orientation application may determine the location of magnets within each individual foam spring 108.

A foam spring orientation application software 118 may be used to determine the placement of the plurality of foam springs 108 within the mattress outer case volume. In an embodiment, the plurality of foam springs 108 may be of differing firmnesses and the foam spring orientation application software 118 may be used to determine the proper placement of the different foam spring 108 firmnesses to meet the users comfort requirements. For example, the user may require certain locations of the mattress to be less firm, more firm, or the like to help provide the proper support for a part of his or her body that may be experiencing discomfort such as a hip, shoulder, back, neck, knee, or the like. The user may have had an accident, surgery, suffer from arthritis, have a neck condition, have a knee condition, have a sleep disorder, a disease or the like and different firmnesses within the bed facility 102 may be required to provide the proper comfort for these areas of discomfort.

In an embodiment, the foam spring orientation application software 118 may present questions to a user to determine the comfort requirements of the user's bed facility 102. The questions may be presented to the user as a paper questionnaire, a computer questionnaire, indicating on a chart of the body the areas needing comfort consideration, or the like.

In an embodiment, the questionnaire may contain preset questions that may be input to a computer device from a completed paper questionnaire, interactively on the computer device, or the like. In an embodiment, the computer device interactive questionnaire may present additional questions to the user based on the answer to a previous question. For example, a first question may ask if the user suffers from discomfort in his or her back. If, for example, the user answers yes, the questionnaire may continue to ask questions that are particular to back discomfort such as location of pain, pain levels, if the pain is sharp, if the pain is dull, if the pain increases with time, and the like.

In an embodiment, the user may indicate on a body chart the areas of discomfort that may require various foam spring 108 firmnesses. In an embodiment, the user may indicate the location, the type of discomfort, the intensity of discomfort, and the like that the form spring orientation application software 118 may be able to interpret into bed facility 102 firmness requirements. In an embodiment, the body chart may be divided into a grid, sections, zones, or the like to allow the user to define the location of discomfort.

In an embodiment, after the questionnaire is complete, the application software 118 may determine at least one configuration of foam springs 108 for the bed facility 102. The configuration my include foam springs 108 of varying firmness to provide a firmness configuration that may match the firmness requirements of the user. For example, if the user indicated in the questionnaire that he or she suffered from back pain in the lower back area, the foam spring orientation application software 118 may configure less firm or firmer foam springs in the area of the lower back. The remainder of the bed facility 102 may be configured to have a standard firmness to properly support the remainder of the user's body. This configuration of varying firmness across the bed facility 102 may provide the user with a comfortable position to rest, sleep, or the like.

In an embodiment, after the foam spring orientation application software 118 has determined the foam spring 108 configuration for the user, a test configuration may be setup in the bed facility 102 enterprise for the user to try the form spring 108 configuration. Based on the user trying the foam spring 108 configuration at the bed facility 102 enterprise, the foam spring 108 configuration may be modified to improve the bed facility 102 comfort.

In an embodiment, the foam spring 108 configuration may be manually modified by the user or the bed facility enterprise by interchanging form springs 108 and retrying the comfort of the bed facility 102 until a desired comfort has been reached. In another embodiment, the answers to the foam spring orientation application software 118 may be revised and the foam spring orientation application software 118 may provide a new foam spring 108 configuration for the user to try. In another embodiment, the foam spring orientation application software 118 may have provided more than one foam spring 108 configurations and the user may try at least one of the additional configurations to determine if one of the additional configurations provides the desired comfort.

In an embodiment, the bed facility 102 foam spring 108 configuration may be iterated at the bed facility 102 enterprise until a foam spring 108 configuration is determined that provides the desired comfort. In an embodiment, once the final foam spring configuration has been determined, the order for the bed facility 102 with the user's desired foam spring 108 configuration may be placed with a manufacturer for delivery to the user, the configuration may be set in the bed facility 102 enterprise and delivered to the user, or the like.

In an embodiment, after the user has received the bed facility 102 with the user defined foam spring 108 configuration the user may be able to adjust the foam spring 108 configuration, change foam spring 108 firmnesses, or the like. The user may adjust the configuration or firmness of the bed facility 102 because of changing conditions (e.g. the discomfort improves or worsens), to provide a better comfort configuration, or the like. In an embodiment, the user may adjust the foam spring 108 configuration manually by changing the location of the foam springs 108, changing the firmness of the foam springs 108 in certain locations, or the like.

In another embodiment, the user may use the foam spring orientation application software 118 to reconfigure the foam spring 108 configuration. In an embodiment, the user may have been provided a copy of the foam spring orientation application software 118 that the user may operation on the users own computer device. The user may input revised answers to the questionnaire; the new questionnaire answers may be used to determine a new foam spring 108 configuration.

In another embodiment, the user may use a web based foam spring orientation application software 118 to revise answers to the questionnaire to determine a new foam spring 108 configuration. In an embodiment, the user's previous answers to the questionnaire may be stored in the web based foam spring orientation application software 118 and the user may be able to recall his or her answers and modify the answers. Using the modified answers, the web based foam spring orientation application software 118 may provide a new foam spring 108 configuration to the user.

In an embodiment, similar to the iterative method of determining the user's desired foam spring configuration at the bed facility 102 enterprise, the user may iterate into a new foam spring 108 configuration that matches the users comfort requirements.

Pending U.S. patent application Ser. No. 11/239,404 entitled "Combination Mattress" incorporated here by reference, describes a mattress using individual foam springs. The patent application describes a combination mattress comprising a plurality of independent barrels of foam material. Each individual foam barrel may be combined together by the outer diameter surfaces abutting and a user may adjust the position of the barrels to change the firmness of the combination mattress.

The independent barrels are described as having two resting surfaces that contact the upper and lower surfaces of the mattress, a center opening, and a recess on the outer diameter surface. The recess on the outer diameter surface is used as a connection to a belt and a fixing member to maintain the orientation of the independent barrels. The independent barrels may be placed in the fixing member to orient the independent barrels into a firmness configuration to meet the user's requirements. The user, as needed, may adjust the independent barrel orientation.

The independent barrels are described as having different shape inner openings that provide for the varying firmness of the independent barrels.

U.S. Pat. No. 6,704,962 entitled "Elastic Body, Method for Manufacturing the Same and Mattress Including the Same" incorporated here by reference, describes an elastic body having a substantially cylindrical pillar-like shape having at least one concave portion at the center thereof and at least two convex portions adjacent to the concave portion; the convex portion has a spherical shape.

The elastic body is manufactured by mixing poly alcohol with polyether in a ratio of 3-5 to 5-7 to prepare a polyether polyol compound. Methyl alcohol is used as a solvent. A polyol mixture is obtained by mixing 30-50 parts by weight of the obtained polyether polyol compound, 2-2-parts by weight of polystyrene, a trace amount of a catalyst, and water. A preferred viscosity of the obtained polyol mixture is about 1100±300 cps at 40° C.

There may be two different types of elastic body, air permeable forms and non-air permeable forms. The firmness of a mattress is adjusted by the ratio of air permeable and non-air permeable forms and the location of the same within the mattress. A soft material supporter having holes at predetermined intervals hold the elastic bodies at the concave portion.

The various previously described embodiments of the invention may be further understood by reference to FIG. 2 through 32.

FIGS. 2A through 2C depict an embodiment of the foam spring 108. In one embodiment, as shown in FIG. 2A, the foam spring 108 may be a solid resilient material that does not contain any additional features. In another embodiment, FIG. 2B depicts a foam spring with a center hole 202 and an outer covering 208. As previously described, the center hole may be used for different resilient material, activated carbon 110, tourmaline 112, magnets 114, and the like. The center opening 202 shown is round, but it should be understood that the opening 202 may shape. In an embodiment, the outer covering 208 may be an encasing cloth that may be used to contain the foam spring 108, may be used to connect to other foam springs 108, or the like. FIG. 2C shows an embodiment of the outer covering 212 only covering a portion of the foam spring 108. In this embodiment, the outer coverings 212 may be combined together to form regions 122, zones, the entire bed facility 102, or the like and the foam springs 108 may be inserted into the combined outer coverings 212.

Figure 3:
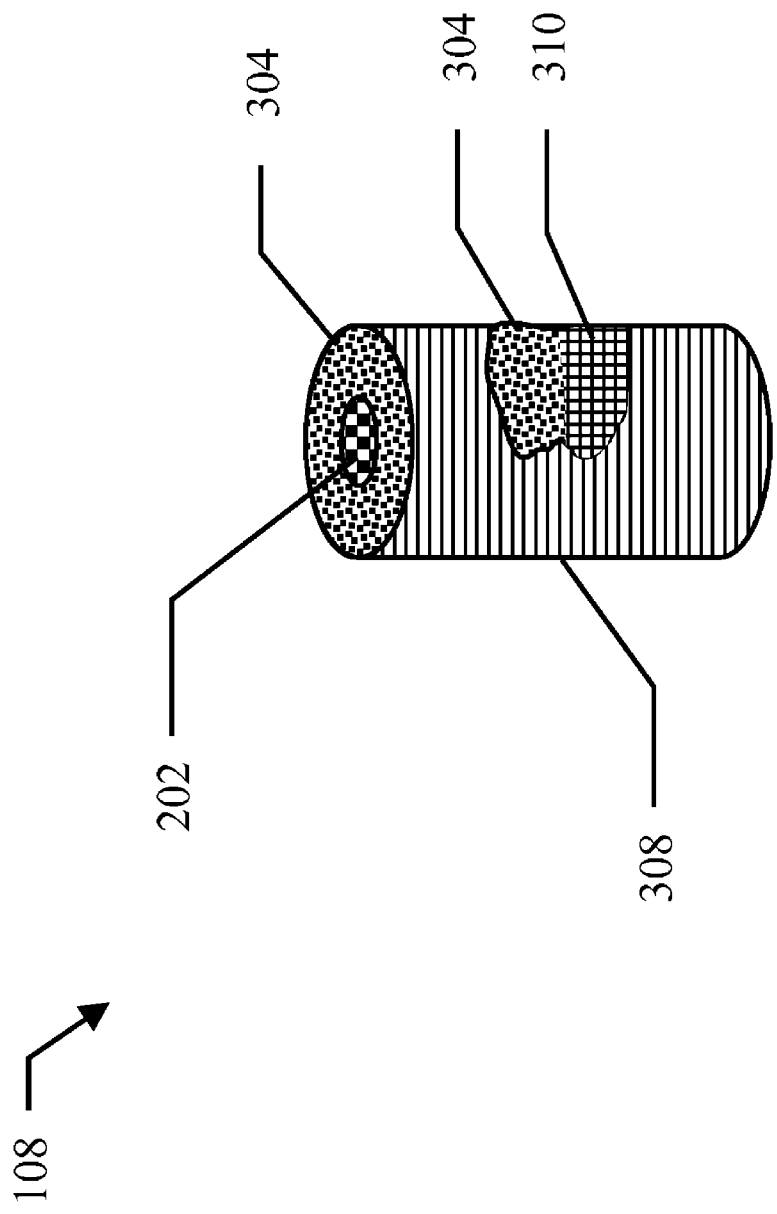
FIG. 3 shows another embodiment of a foam spring configuration.

FIG. 3 depicts an embodiment of a foam spring 108 that may include center openings 202, a combination of different resilient materials (304, 310), outer coverings 308, and the like. In embodiments, the previously described health benefit materials (e.g. activated carbon 110, tourmaline 112, and magnets 114) may be placed within the openings 202, may be part of the resilient material 304, may be a combination of placed within the opening 202 and mixed with the resilient material 304, or the like. As shown, the health benefit materials may be incorporated into only a portion of the resilient material 304 while the other portion of resilient material 310 may not contain health benefit materials. It should be understood that the health benefit materials may be in any combination within the foam spring 108.

As previously described, the foam spring 108 may have many different shapes; these shapes may be used individually or in combination. FIGS. 4A through 4E depict perspective views of various foam spring 108 shapes that may be used. It should be understood that these shapes are examples and is not intended to be a complete list of all the possible shapes for the foam spring 108 and that there may be many additional shapes that may be used. Additionally, it should be understood that the different foam spring 108 shapes may be used individually or in combination within the bed facility 102.

FIGS. 4F through 4H and FIG. 4J through FIG. 4M depict top views of various foam spring 108 shapes that may be used. It should be understood that theses are examples and is not intended to be a complete list of all the possible shapes for the foam spring 108 and that there may be many additional shapes that may be used. Additionally, it should be understood that different foam spring 108 shapes may be used individually or in combination within the bed facility 102.

As previously described, the foam spring 108 may have exterior and interior openings. FIGS. 5A through 5D depict exterior and interior openings and shapes that may be used on the foam spring 108 such as horizontal ribs 502, vertical ribs 504, spiral ribs 508, and through holes 510. It should be understood that these different exterior and interior openings may be used individually or in combination on a single foam spring 108 or in a plurality of foam springs 108 within a bed facility 102.

FIGS. 6A through 6C depict various configurations of foam spring 108 within an attachment facility 120 webbing. As shown in FIG. 6A, the foam springs 108 may be oriented with webbing 602 to provide spaces between the foam springs 108. In FIG. 6B, the foam springs 108 are shown oriented with webbing 604 to provide a reduced amount of spacing between the foam springs 108. FIG. 6C depicts a perspective view 608 of the foam spring 108 with reduced spaces and with the attachment facility 120 webbing around the center of the foam spring 108. It should be understood that the attachment facility 120 may be any of the previously described attachment facilities 120 and the attachment facilities may be associated to the foam springs 108 at any position (e.g. top, middle, or bottom).

FIGS. 7A and 7B depict the attachment facility 120 webbing attached to the foam spring 108. In FIG. 7A, the attachment faculty 120 webbing is shown individually attached to the foam spring 108. As previously described, the individual foam springs may then be attached to form regions 122, zones, used within the entire bed facility 102, or the like. FIG. 7B shows the foam springs 108 connected together in a region 122. It should be understood that the foam springs 108 may be connected with individual attachments or may be connected with webbing.

Figure 8:
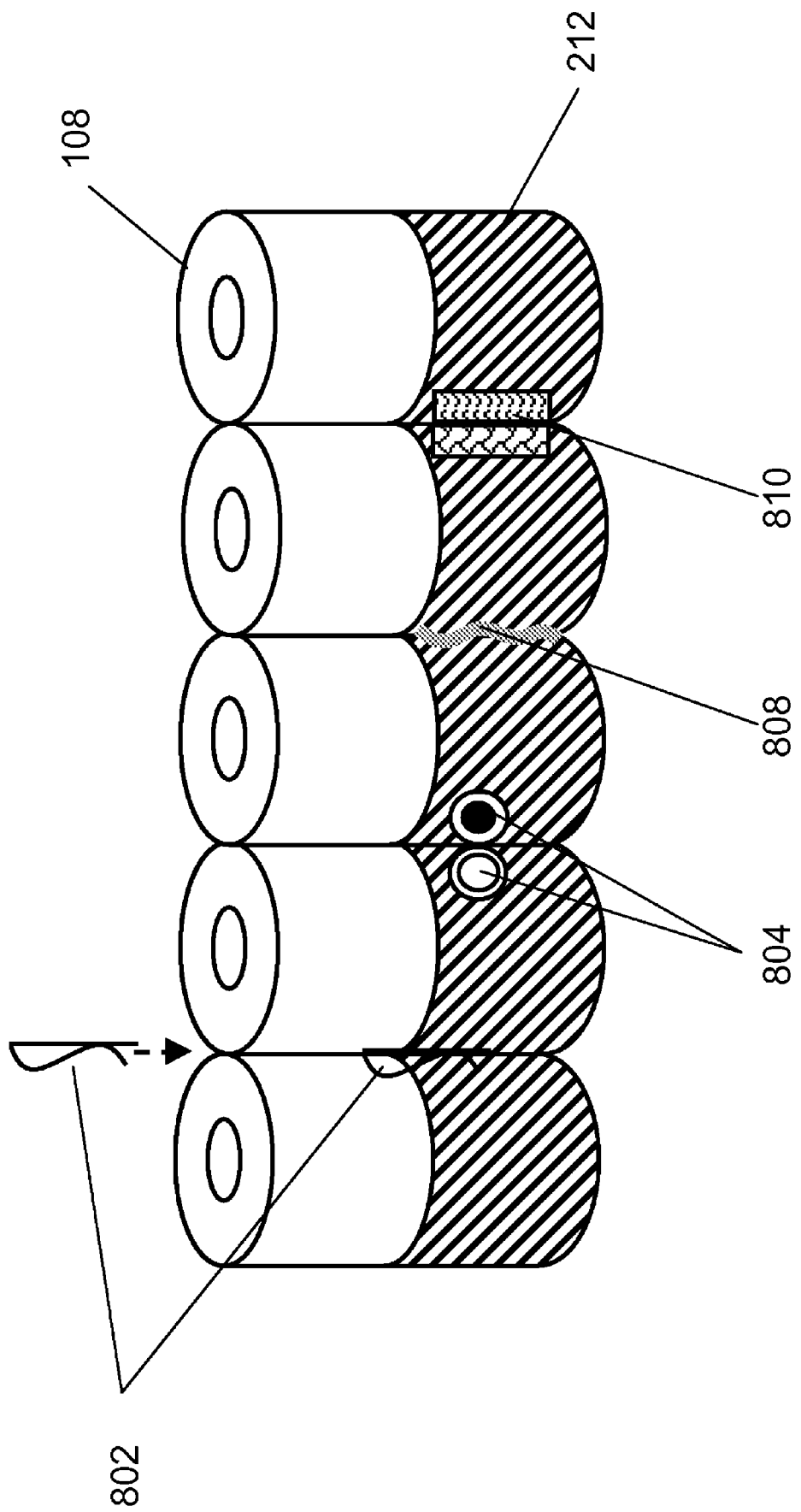
FIG. 8 shows an embodiment of different attachment facilities for individual foam springs.

FIG. 8 depicts a number of embodiments of attaching individual foam springs 108 together. The depicted embodiments show the foam springs 108 within individual outer covers 212, but it should be understood that these attachment embodiments may be used with full outer covers or with no outer covers.

In a first embodiment, clips 802 may be used to hold the individual foam springs 108 together. In an embodiment, the clips may be in any shape that is able to hold two foam springs 108 together. In a second embodiment, snaps 804 may be used to hold the individual foam springs 108 together. In a third embodiment, glue 808 is used to hold the individual foam springs 108 together. In a forth fourth embodiment, a hook and loop (e.g. VELCRO) may be used to hold the individual foam springs 108 together. It is shown that attachments are near the center of the foam spring 108, but it should be understood that the attachments may be on any location on the foam spring 108. Additionally, it should be understood that there may be more than one attachment for each foam spring 108. In an embodiment, the various attachments may be used individually or in combination.

Figure 9:
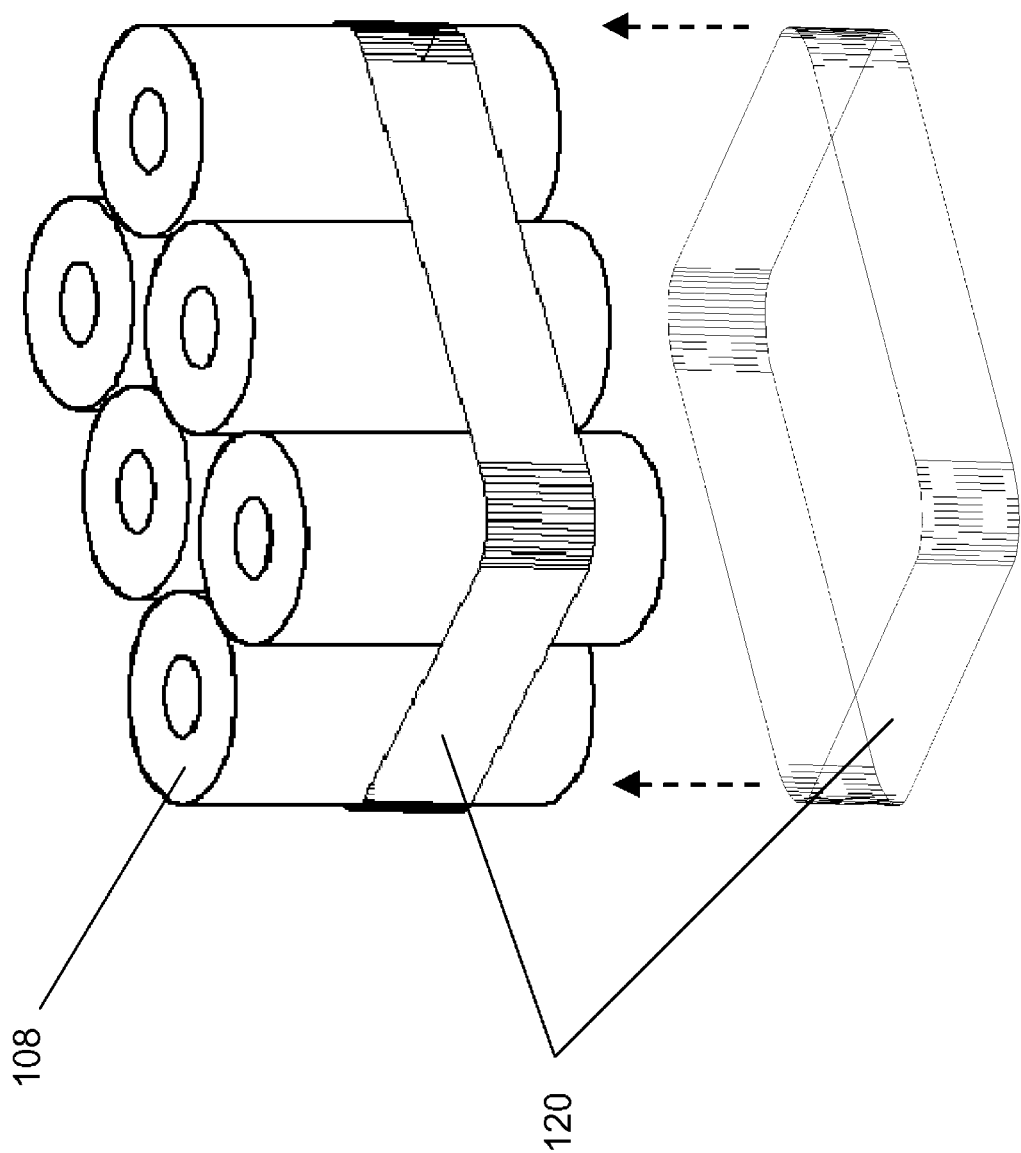
FIG. 9 shows an embodiment of foam springs being grouped into regions with a containment facility.

FIG. 9 depicts one type of attachment facility 120 attaching a plurality of foam springs 108. In embodiments, the attachment facility 120 may attach any number of foam springs 108 in any type of configuration. For example, as shown, the foam springs may be contained into a rectangular shape, but the foam springs may also be configured into a square, round, hexagonal, octagonal, or any other shape. As previously described, the attachment facility 120 may be of a set shape, may be elastic, may be fabric, may be a solid shape, or may be an other configuration to hold the foam springs 108 within the containment facility 104.

Figure 10:
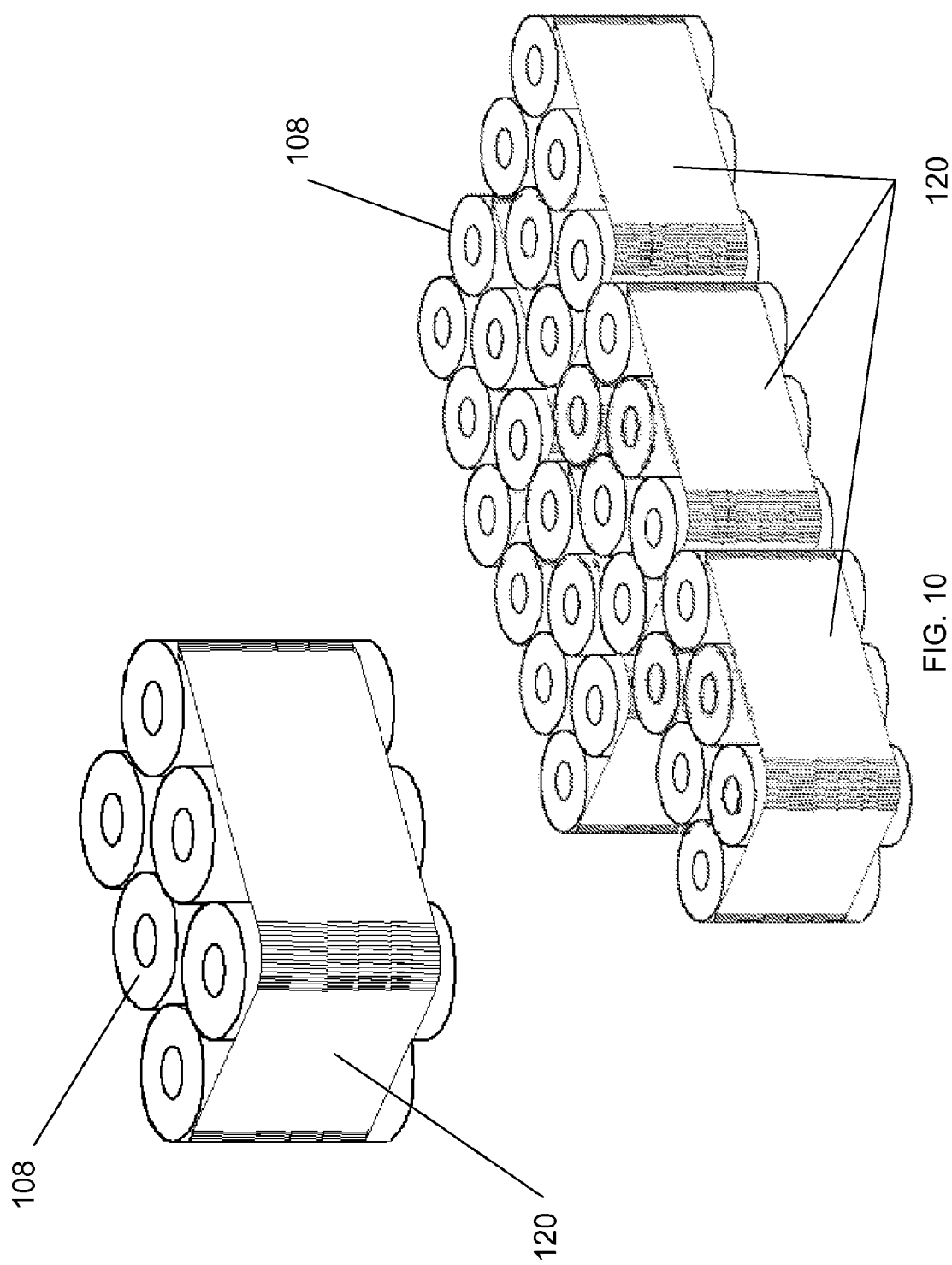
FIG. 10 shows an embodiment of a set of foam spring regions.

FIG. 10 shows the contained foam springs 108 from FIG. 9 associated into regions 122. As may be seen, the contained foam springs 108 may be oriented as organized regions 122 of foam springs 108.

FIGS. 11A through 11D depict different methods of orienting individual foam springs 108 into positions in a foam panel 1102. It should be understood that the foam panel 1102 may be a top, bottom, or side foam panel within the containment facility.

Figure 11A:
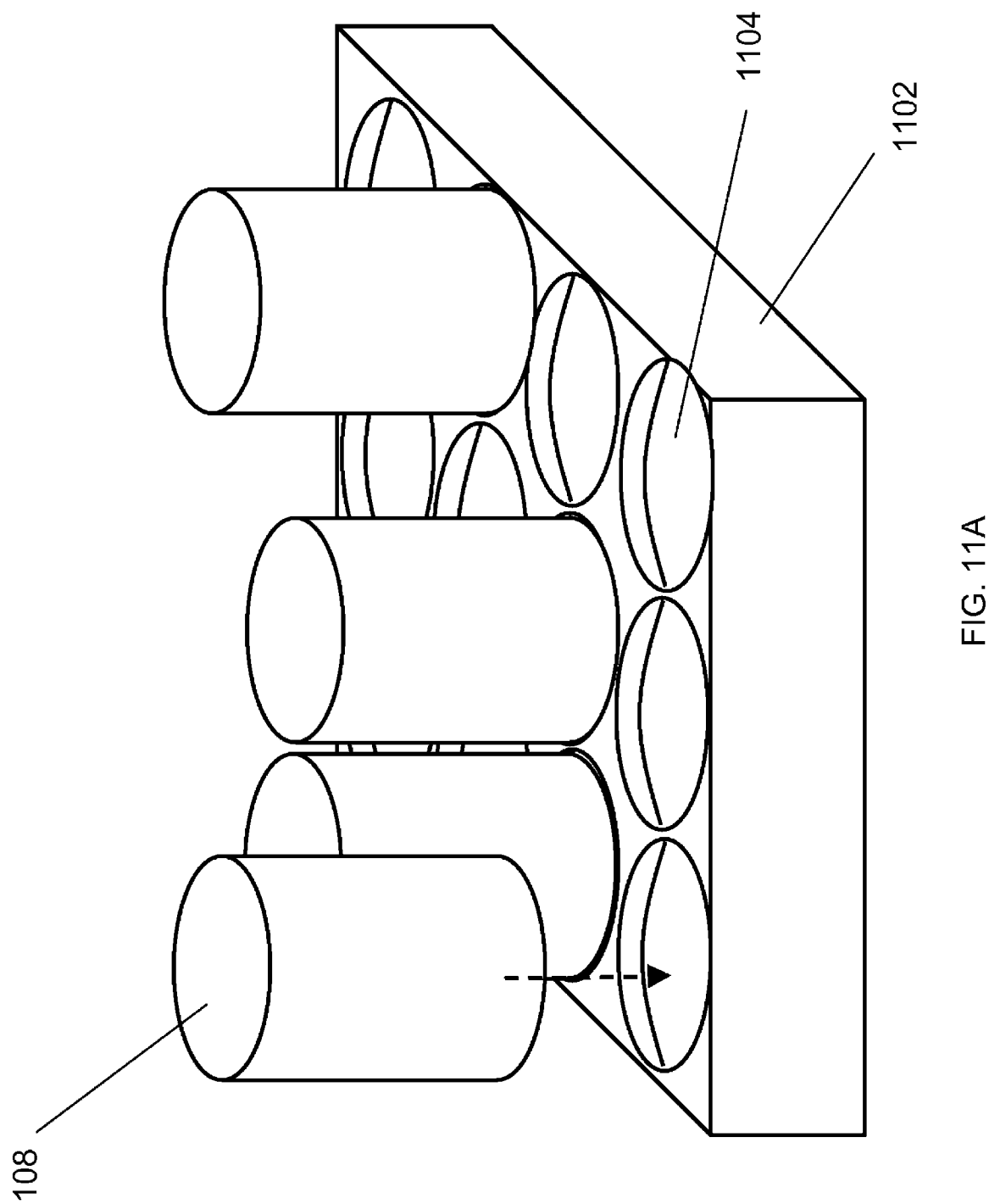
FIG. 11A shows an embodiment of foam springs associated with a bottom foam panel.

As shown in FIG. 11A, a bottom foam panel 1102 may have openings 1104 where the individual foam springs 108 may fit to provide orientation for the foam spring 108 within the containment facility 104. In embodiments, the foam panel 1102 openings 1104 may be all the way through the foam panel 1102, partially through the foam panel 1102, or the like. In an embodiment, the openings 1104 may be in any pattern within the foam panel 1102.

Figure 11B:
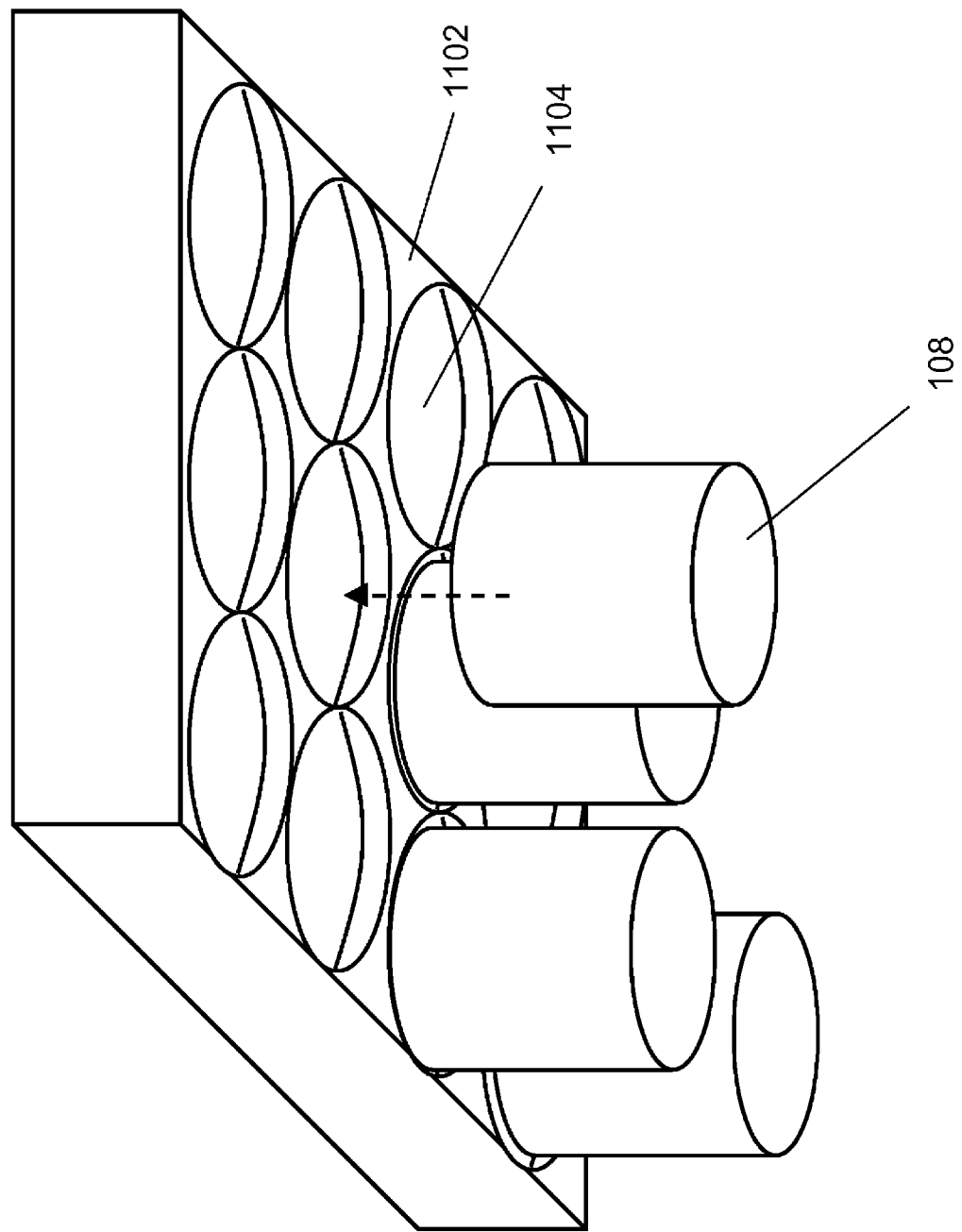
FIG. 11B shows an embodiment of foam springs associated with a top foam panel.

As shown in FIG. 11B, a top foam panel 1102 may have openings 1104 where the individual foam springs 108 may fit to provide orientation for the foam spring 108 within the containment facility 104. In embodiments, the foam panel 1102 openings 1104 may be all the way through the foam panel 1102, partially through the foam panel 1102, or the like. In an embodiment, the openings 1104 may be in any pattern within the foam panel 1102.

Figure 11C:
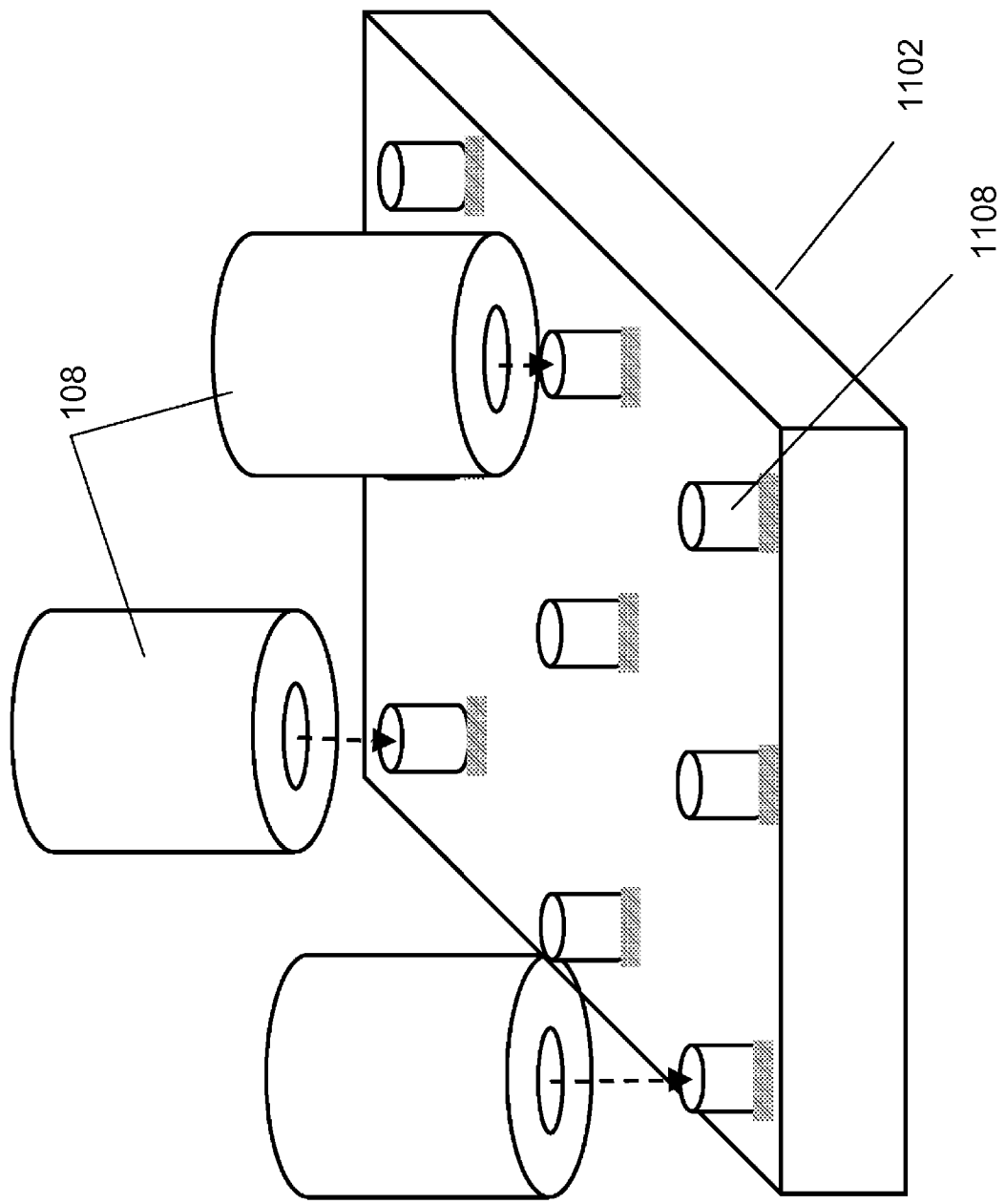
FIG. 11C shows an embodiment of foam springs associated with a foam panel including vertical locators.

FIG. 11C depicts a foam spring 108 orientation embodiment where the foam springs 108 have an internal opening that fits onto a foam panel 1102 that includes vertical locators 1108. In this embodiment, the foam springs 108 fit onto the vertical locators 1108 to be positioned within the containment facility. The foam spring 108 openings and the vertical locators are shown as round objects, but it should be understood that the openings and the vertical locators 1108 may be any shape.

Figure 11D:
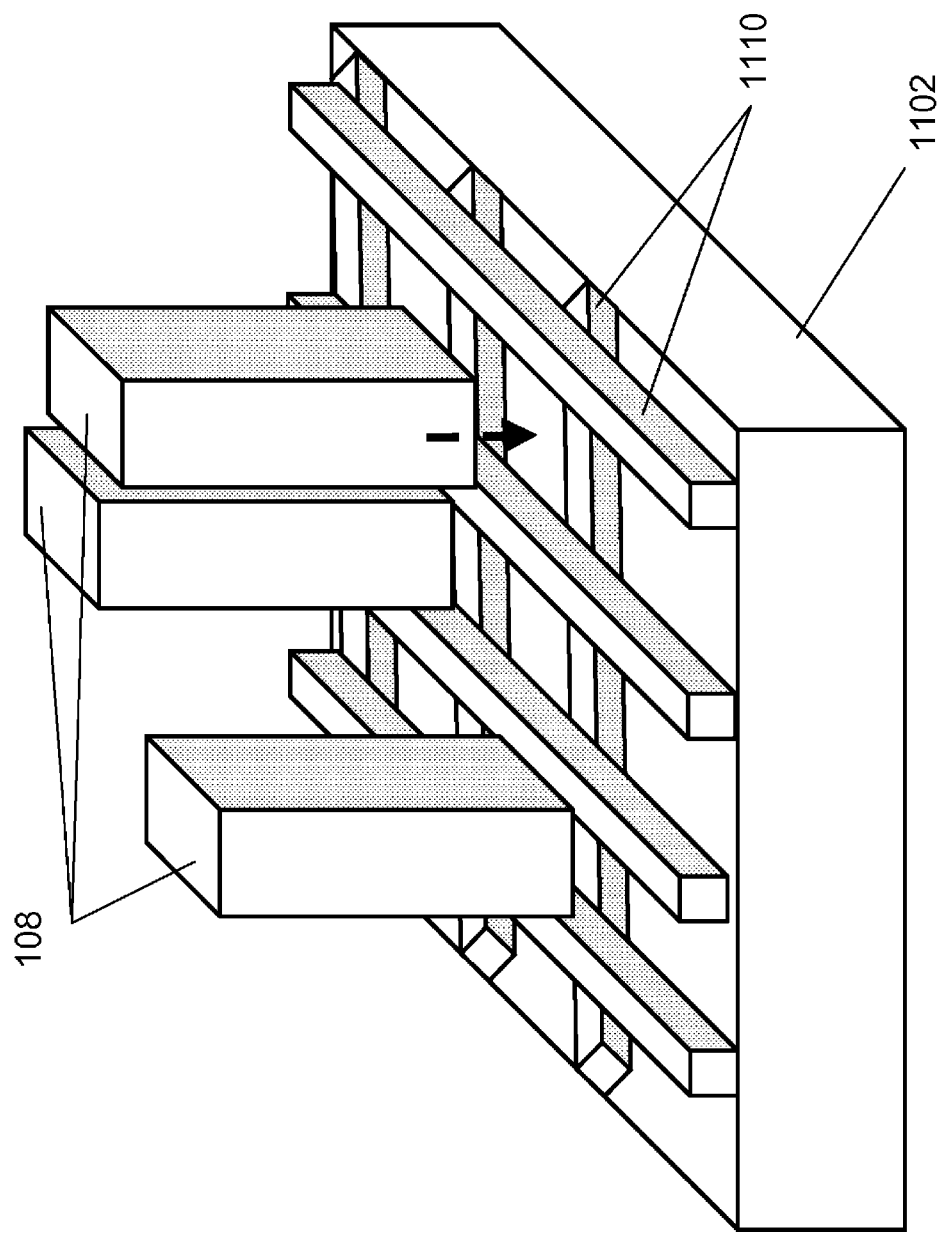
FIG. 11D shows an embodiment of foam springs associated with a foam panel including horizontal and vertical locators.

FIG. 11D depicts a foam spring 108 orientation embodiment where the foam springs 108 fit into shapes created by vertical and horizontal locators 1110. In this embodiment, the horizontal and vertical locators 1110 are placed onto the foam panel 1102 in a configuration to create a square or rectangular openings. In this case, the foam springs 108 are shown as rectangular shapes to fit into the configuration created by the horizontal an vertical locators 1110. It should be understood that the locators 1110 may be placed in any orientation to create openings to contain the foam springs 108.

Figure 12:
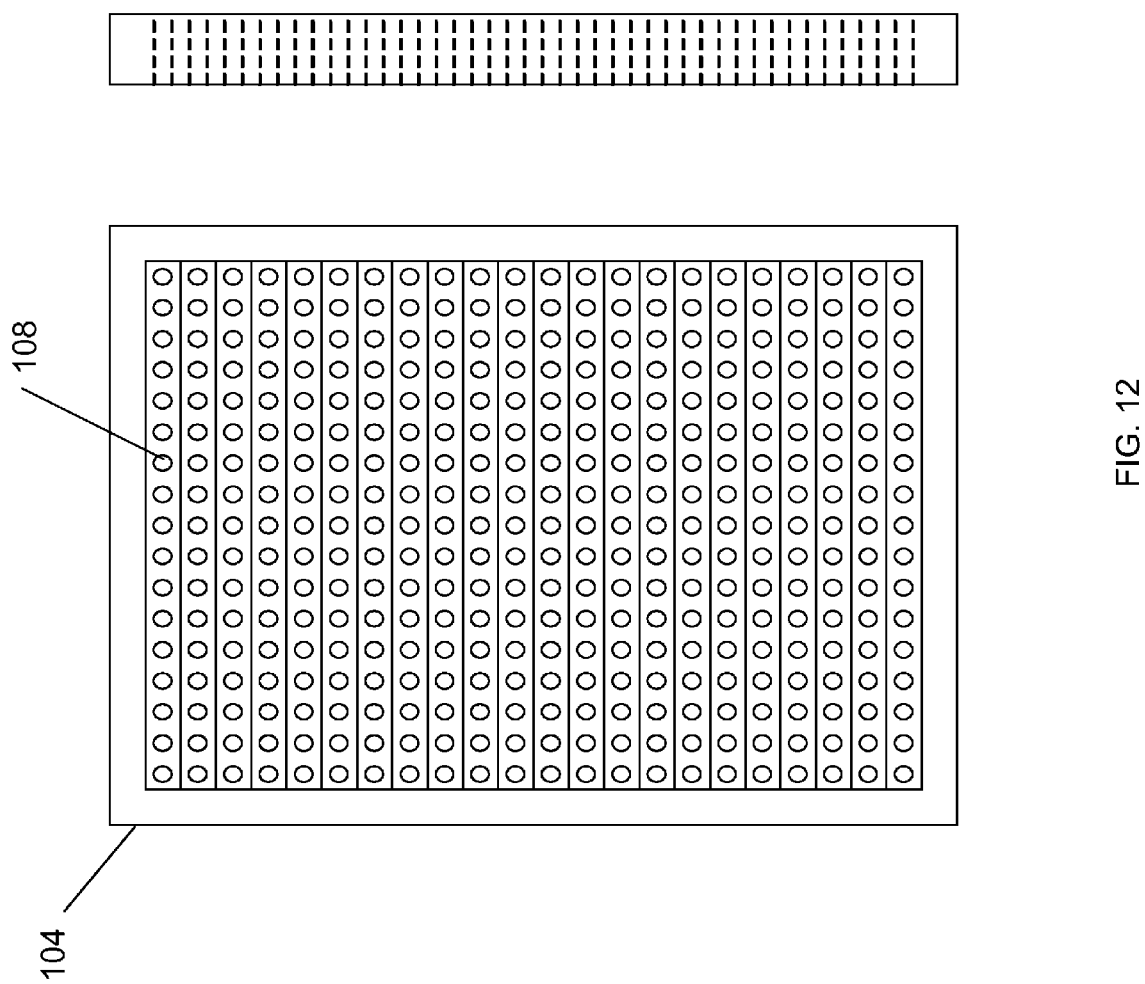
FIG. 12 shows an embodiment of a general foam spring configuration in a containment facility.

FIG. 12 depicts an embodiment of an overall foam spring 108 orientation where the foam springs 108 are oriented in a regular rectangular configuration within the containment facility 104. As previously described, the foam spring 108 orientation may be maintained using the attachment facility 120. This view is provided as an example of a foam spring 108 orientation within the containment facility 104, but as previously described, the foam spring 108 orientation may be in any configuration within the containment facility 120.

Figure 13:
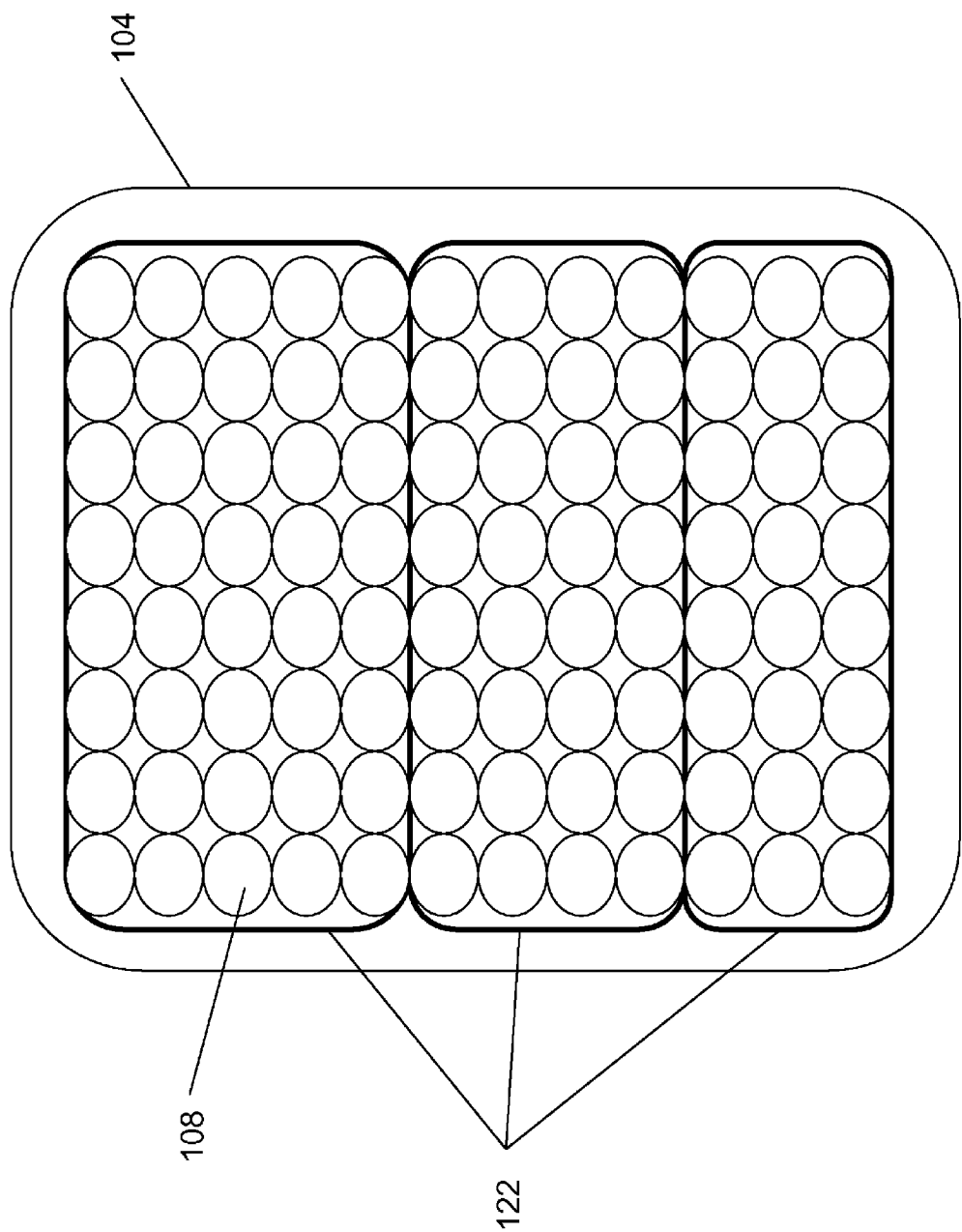
FIG. 13 shows an embodiment of foam springs in regions within a containment facility.

FIG. 13 depicts an embodiment of a plurality of foam springs 108 orientated into regions 122 within the containment facility 104. In this embodiment there are three regions 122 that may be for the users head, body, and leg areas within the bed facility 102. In an embodiment, the regions 122 may be created by the foam springs 108 contained using one of the attachment facilities 120. This embodiment depicts three regions within the containment facility 104, but it should be understood that there may be any number of regions 122. As previously described, each of these regions 122 may have different firmnesses to meet the users firmness requirements. For example, the head region 122 may be of a medium firmness while the body region 122 may be firmer.

Figure 14:
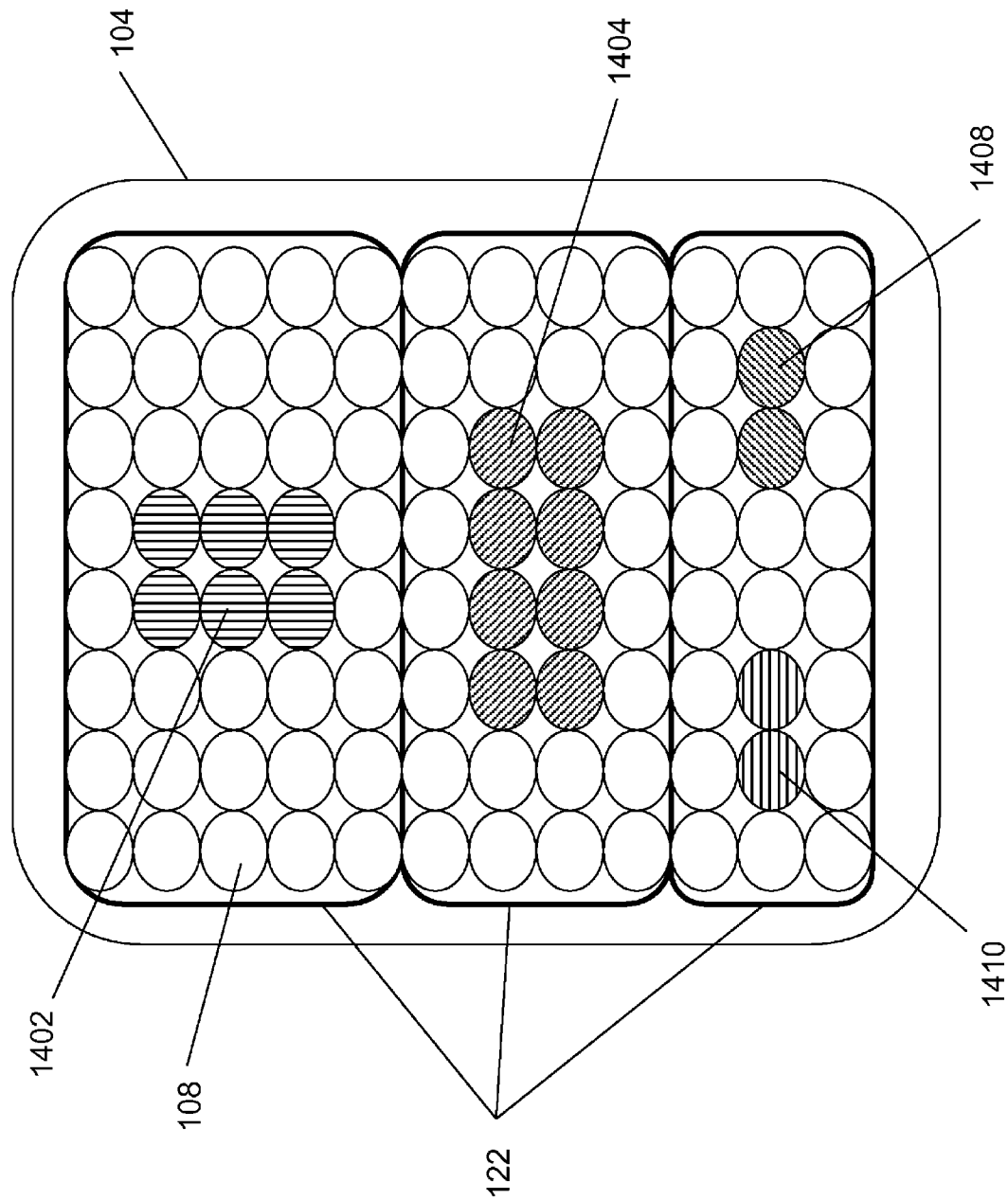
FIG. 14 shows an embodiment of different firmness foam springs in a containment facility.

FIG. 14 depicts an embodiment where different foam spring 108 firmness may be mixed within the regions 122. For example, the head region may have less firm foam springs 1402 to allow the users head to be supported by the surrounding firmer foam springs 108 and the back region may have firmer foam springs 1404 in the lower back area to provide firmer support to the user's back. Additionally, there may be different firmness areas within a region 122. For example, it is shown that there are two different firmnesses (1408 and 1410) in the leg region. The different firmness areas within a region may allow a user's comfort requirements to be met in particular locations of the bed facility 102. It should be understood that the foam spring 108 firmness may be distributed in any configuration within the containment facility 104 to meet the user's firmness requirements.

Figure 15:
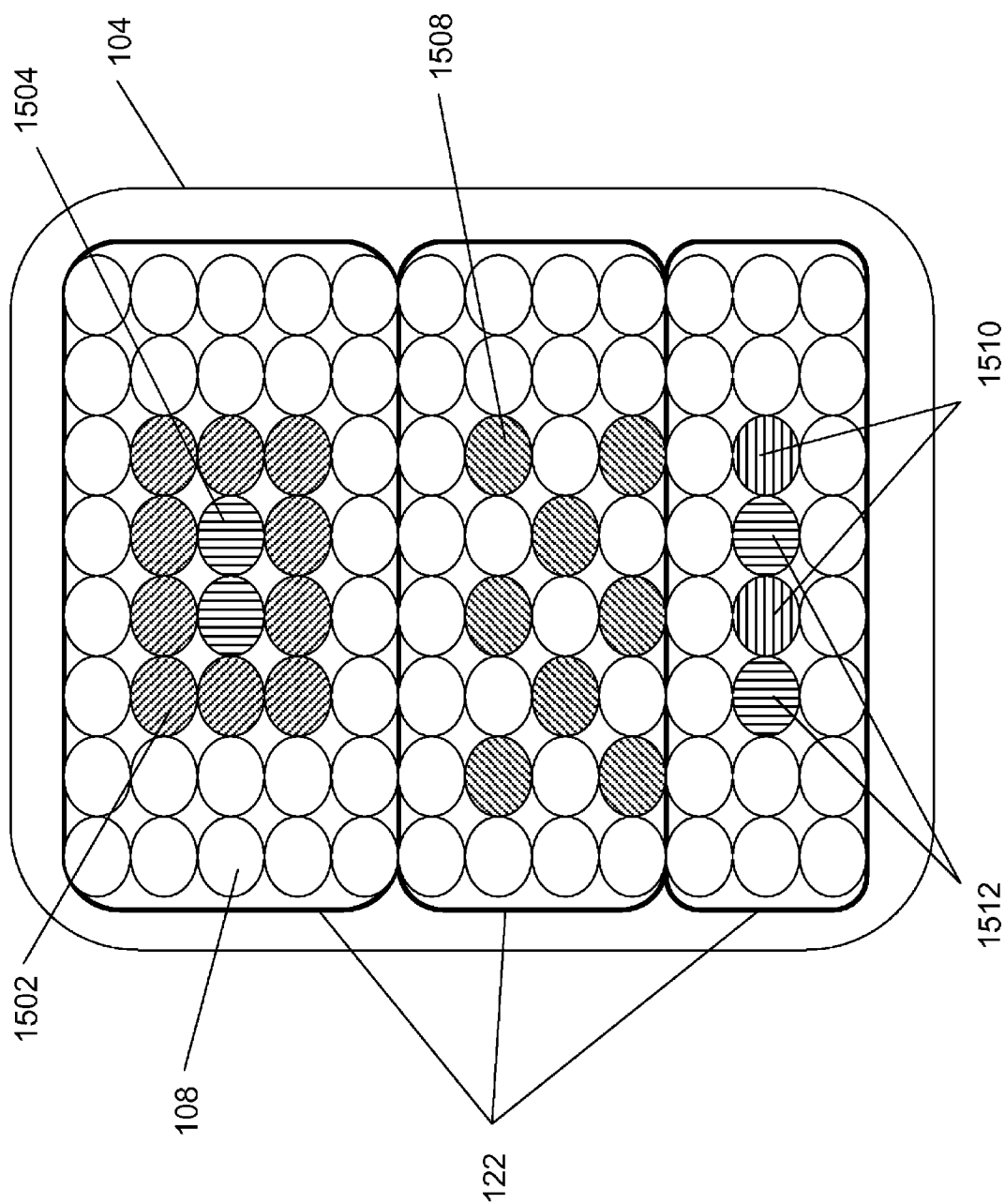
FIG. 15 shows an embodiment of different firmness foam springs in a containment facility.

FIG. 15 depicts an embodiment where the foam spring 108 firmnesses may be mixed within an area of a region 122. For example, it is shown in the head region that a first firmness 1502 surrounds a second firmness 1504 foam spring 108. In another embodiment, the firmness of an area may be created by mixing different foam spring 108 firmness together within a region. In the body region 122, it is shown that the different firmness 1508 foam springs 108 are alternated to provide an overall firmness for this region 122. In a different alternating sequence, the foot region is shown with a first firmness 1510 directly alternating with a second firmness 1512. It should be understood that the mixing of the different firmnesses of foam springs 108 may be provided in any configuration to meet the use's comfort requirements. For example, there may be a different configuration for each shoulder area to provide for the comfort of each of the user's shoulders.

Figure 16:
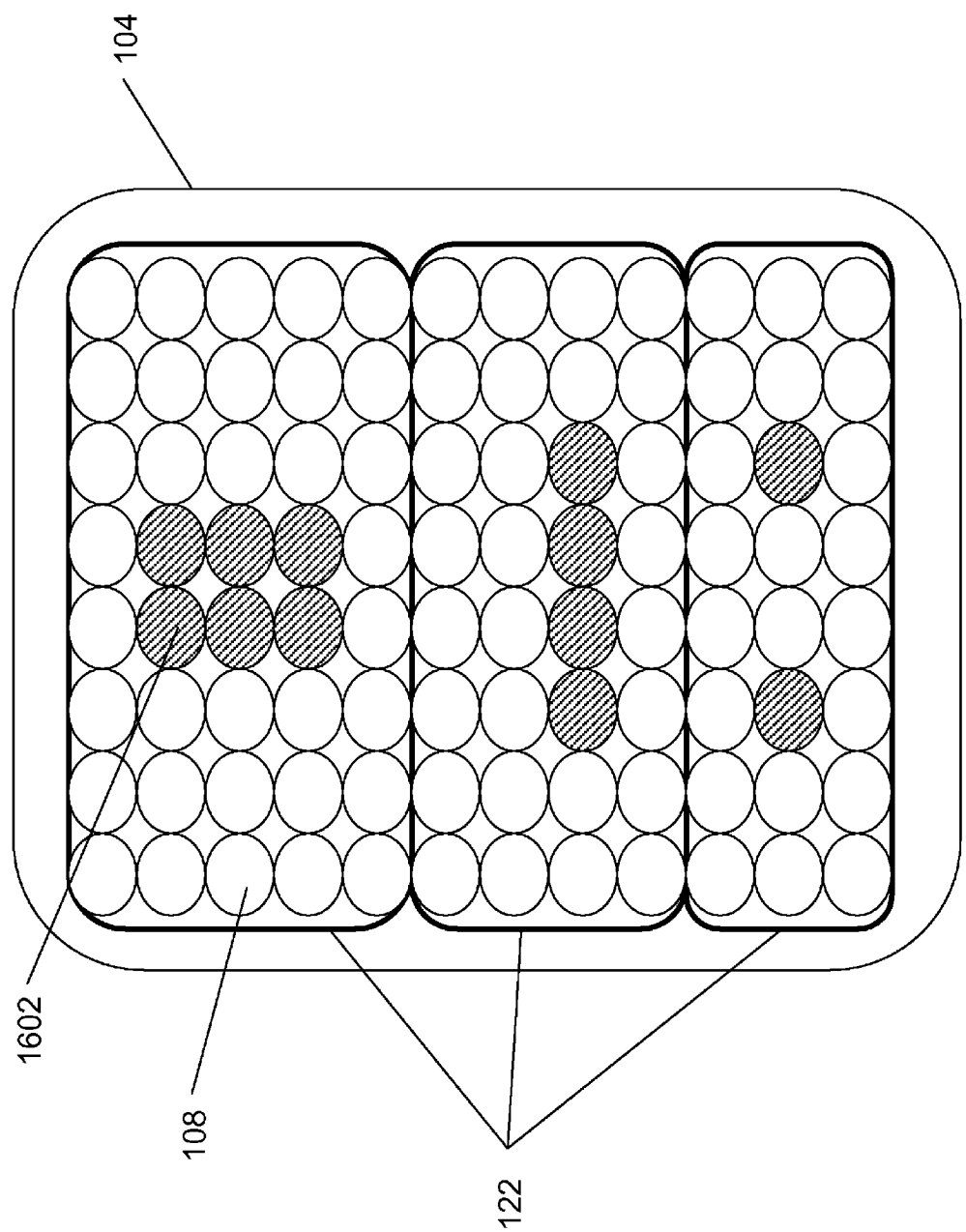
FIG. 16 shows an embodiment of foam springs including magnets in a containment facility.

As previously described, magnets may be included with the foam springs 108 to provide health benefits to the user. FIG. 16 shows an embodiment where foam springs with magnets 1602 are configured within the containment facility 104. It should be understood that the form springs 108 containing magnets 1602 may be in any configuration within the containment facility 104.

Figure 17:
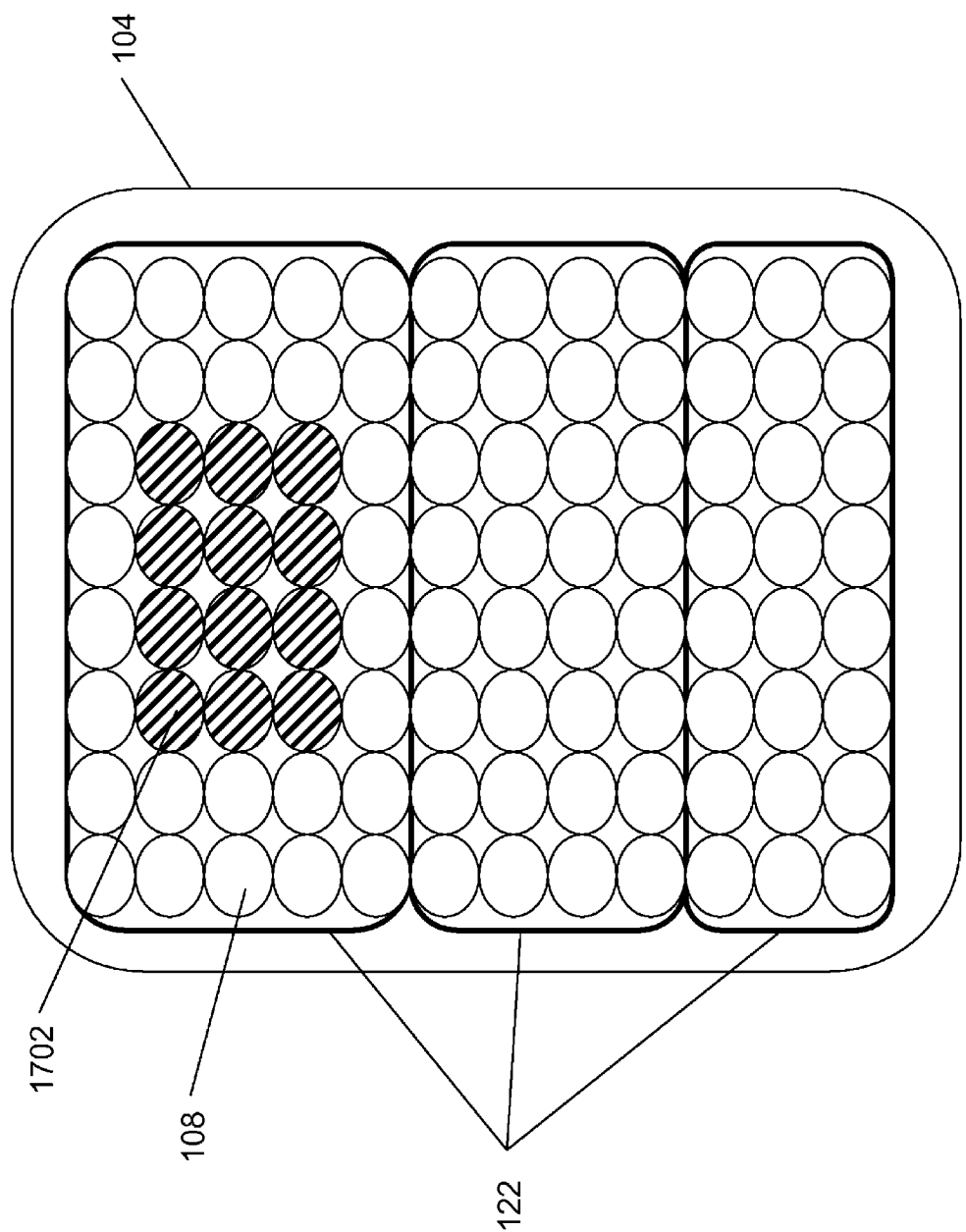
FIG. 17 shows an embodiment of foam springs including activated carbon in a containment facility.

As previously described, activated carbon may be included with the foam springs 108 to provide health benefits to the user. FIG. 17 shows an embodiment where foam springs with activated carbon 1702 are configured within the containment facility 104. In this case the activated carbon foam springs 1702 may be placed by the users head to provide air filtering. It should be understood that the form springs 108 containing activated carbon 1702 may be in any configuration within the containment facility 104.

Figure 18:
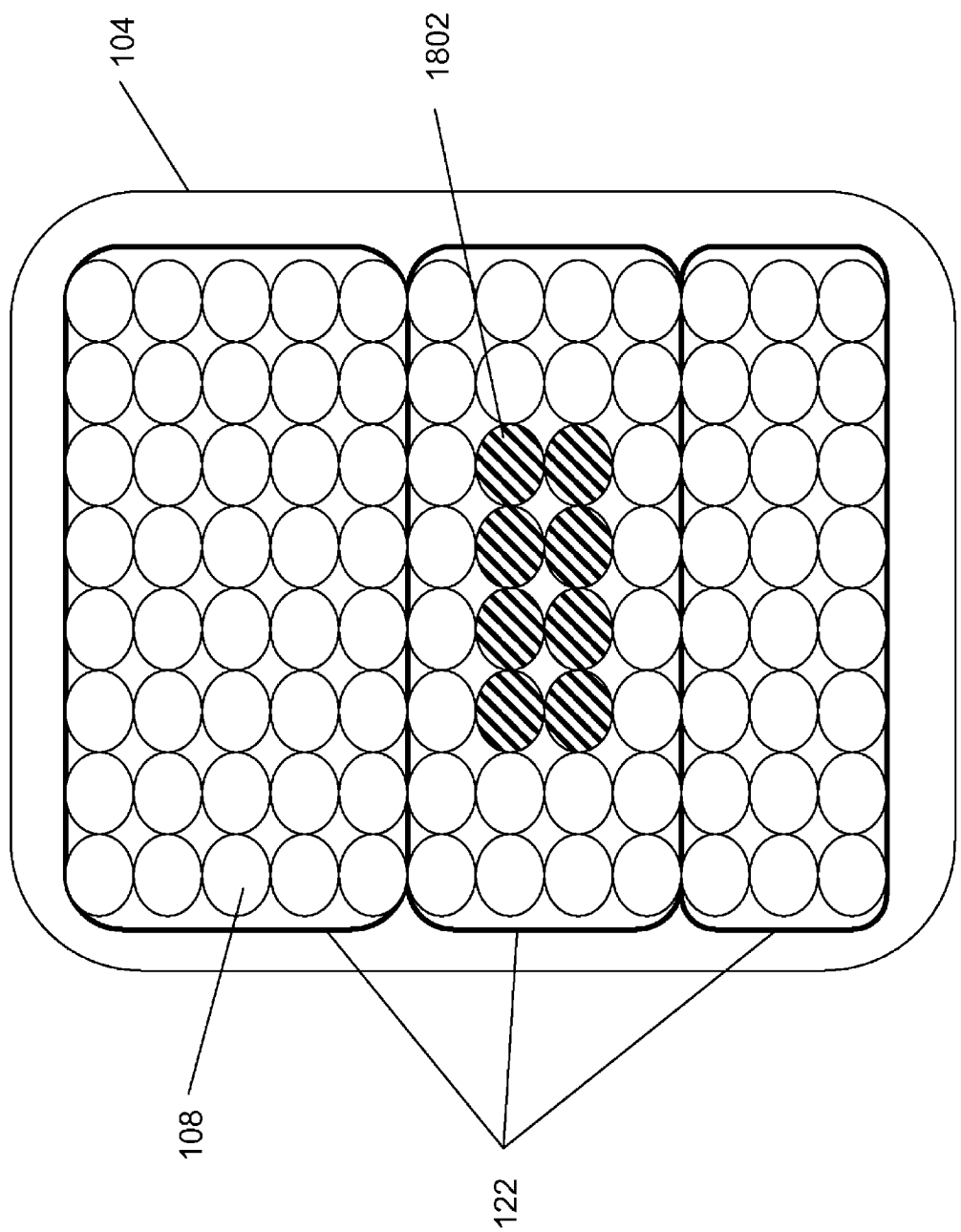
FIG. 18 shows an embodiment of foam springs including tourmaline in a containment facility.

As previously described, tourmaline may be included with the foam springs 108 to provide health benefits to the user. FIG. 18 shows an embodiment where foam springs with tourmaline 1802 are configured within the containment facility 104. In this case the tourmaline foam springs 1802 may be placed by the users back to provide increased blood circulation. It should be understood that the form springs 108 containing tourmaline 1802 may be in any configuration within the containment facility 104.

Figure 19:
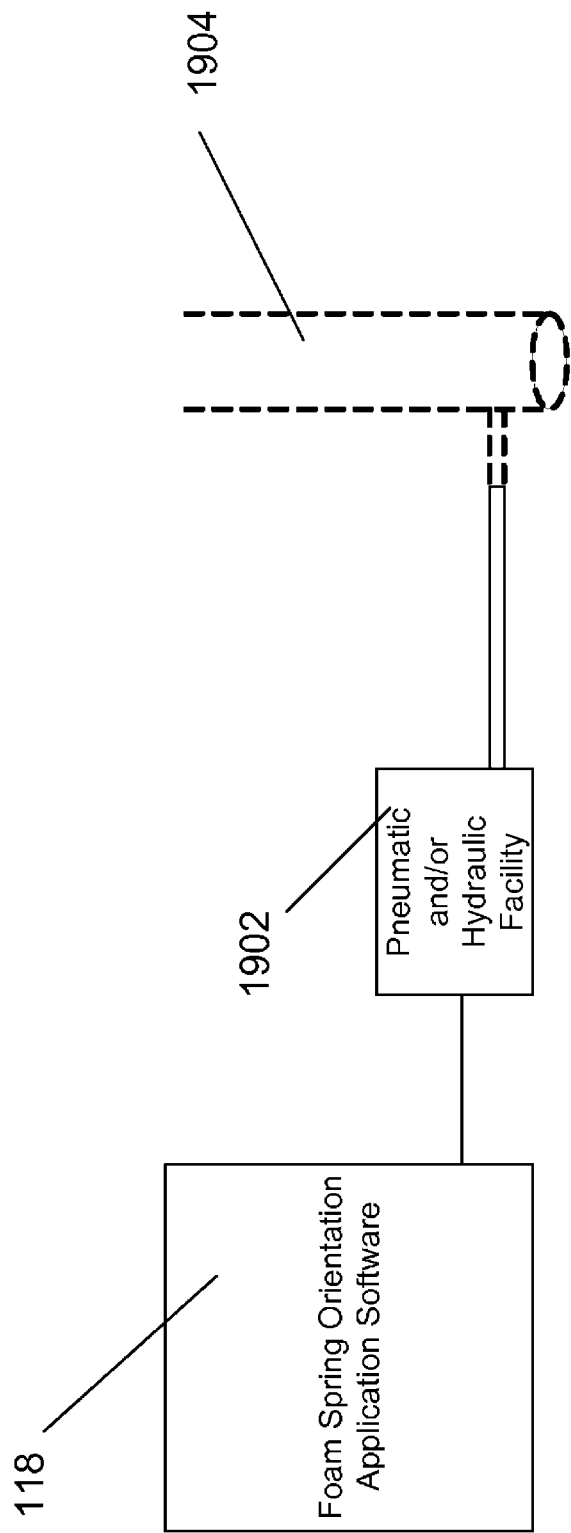
FIG. 19 shows an embodiment of a pneumatic and/or hydraulic facility coupled with a chamber.

FIG. 19 depicts the use of hydraulic or pneumatic chambers 1904 to be used in conjunction with foam springs 108. In this embodiment, the foam spring orientation application facility 118 may be used to determine the firmness requirements of the user. The firmness information may be provided to a hydraulic or pneumatic facility 1902 that may provide the proper firmness to the chambers 1904. As previously described, the hydraulic or pneumatic chambers 1904 may be used individually or in combination with the foam springs 108.

Figure 20:
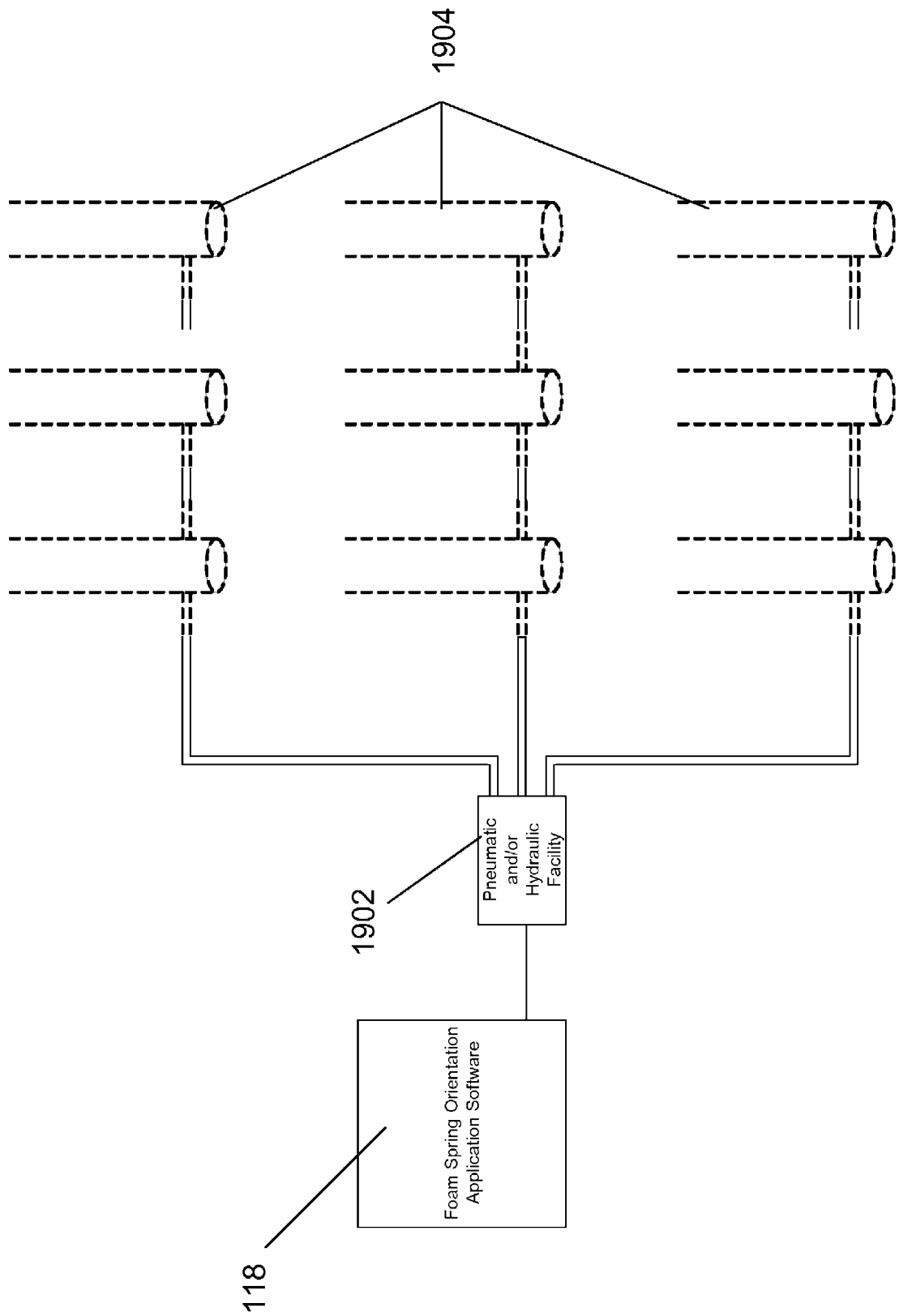
FIG. 20 shows an embodiment of a pneumatic and/or hydraulic facility coupled with sets of chambers.
Figure 21:
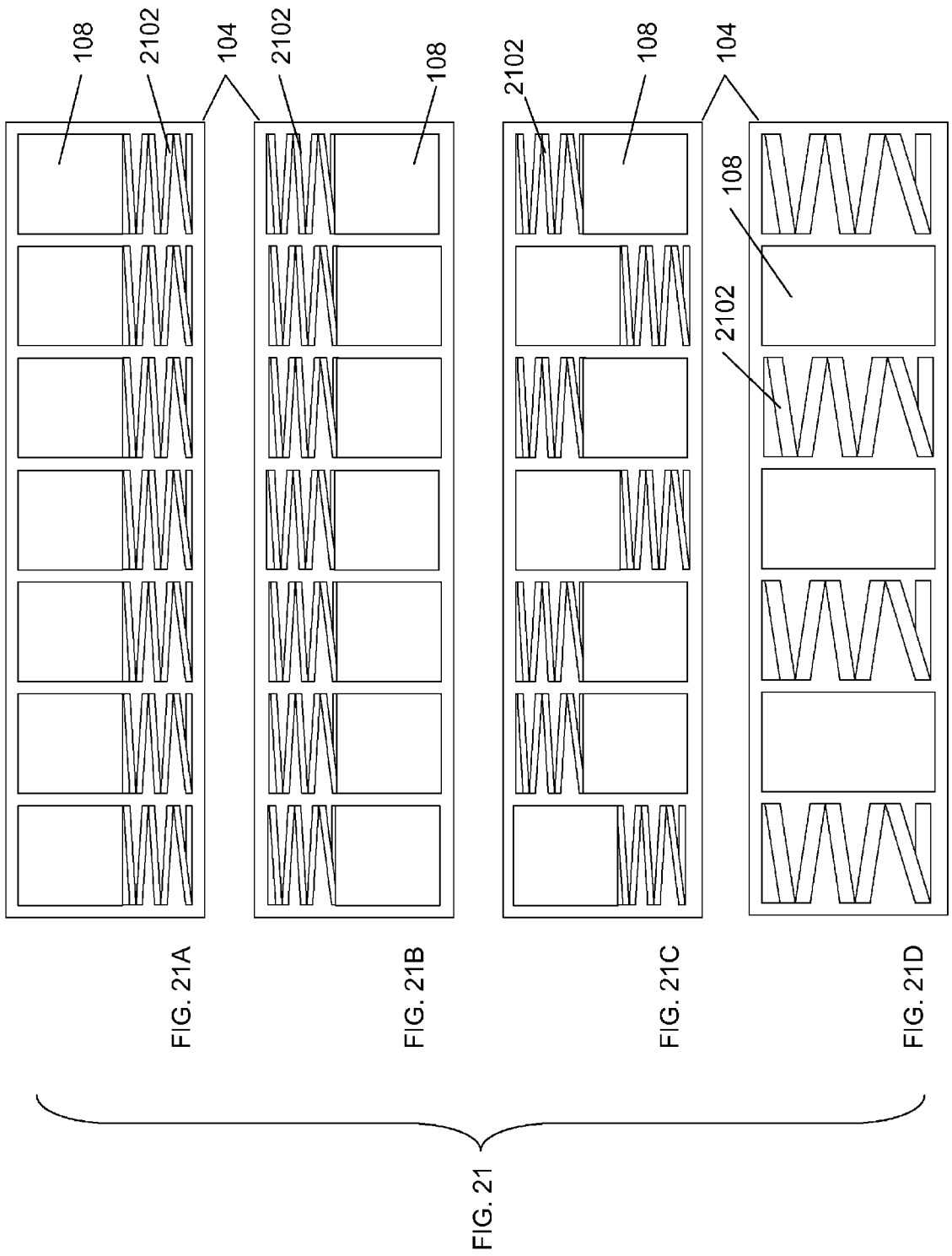
FIGS. 21A-21D shows an embodiment of using foam springs with metal springs in a containment facility.

FIG. 20 shows another embodiment of the hydraulic or pneumatic chambers 1904 where there may be a region 122 or individual control of the chambers 1904. In this embodiment, the individual chambers or regions 122 of chambers may have controlled firmnesses. As in FIG. 19, the hydraulic or pneumatic facility 1902 may provide the proper firmness control the individual chambers 1904 or the region 122 of chambers 1904.

FIGS. 21A through 21D depict embodiments of foam springs 108 being combined with metal springs 2102. As previously described, foam springs 108 may be combined with metal springs 2102 to provide the user with the desired firmness.

FIG. 21A shows a configuration of the foam spring 108 on top of the metal spring 2102.

FIG. 21B shows a configuration of the foam spring 108 below the metal spring 2102.

FIG. 21C shows a combination of foam springs 108 above and below the metal springs 2102. It should be understood that the combination of foam spring 108 and metal springs 2102 may be in any orientation within the containment facility 104.

FIG. 21D shows an embodiment of the foam springs 108 alternated with the metal springs 2102. It should be understood that the foam springs 108 and metal springs 2102 may be in any configuration within the containment facility 104.

Figure 22:
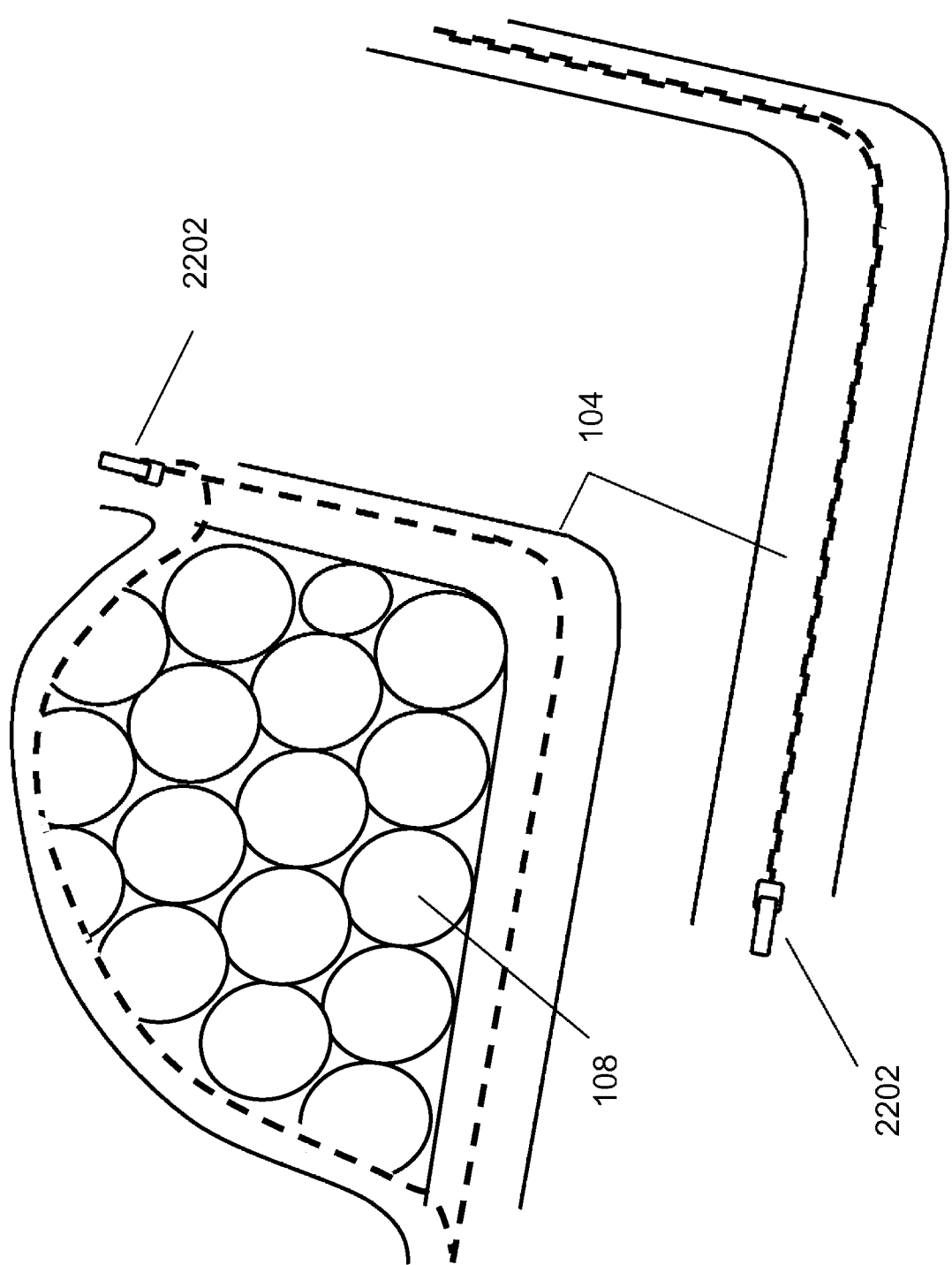
FIG. 22 shows an embodiment of accessing foam springs installed within a containment facility.

FIG. 22 shows an embodiment of accessing the foam springs 108 after the foam springs 108 have been installed into the containment facility 104. As previously described, over time the user's comfort requirements may change and the foam spring 108 configuration may need to be revised. In this embodiment, a zipper 2202 may be used to open up the containment facility 104 to provide access to the foam springs. It should be understood that there may be a number of devices that may be used instead of a zipper to gain access to the foam springs 108 such as Velcro, snaps, buttons, or the like.

Figure 23:
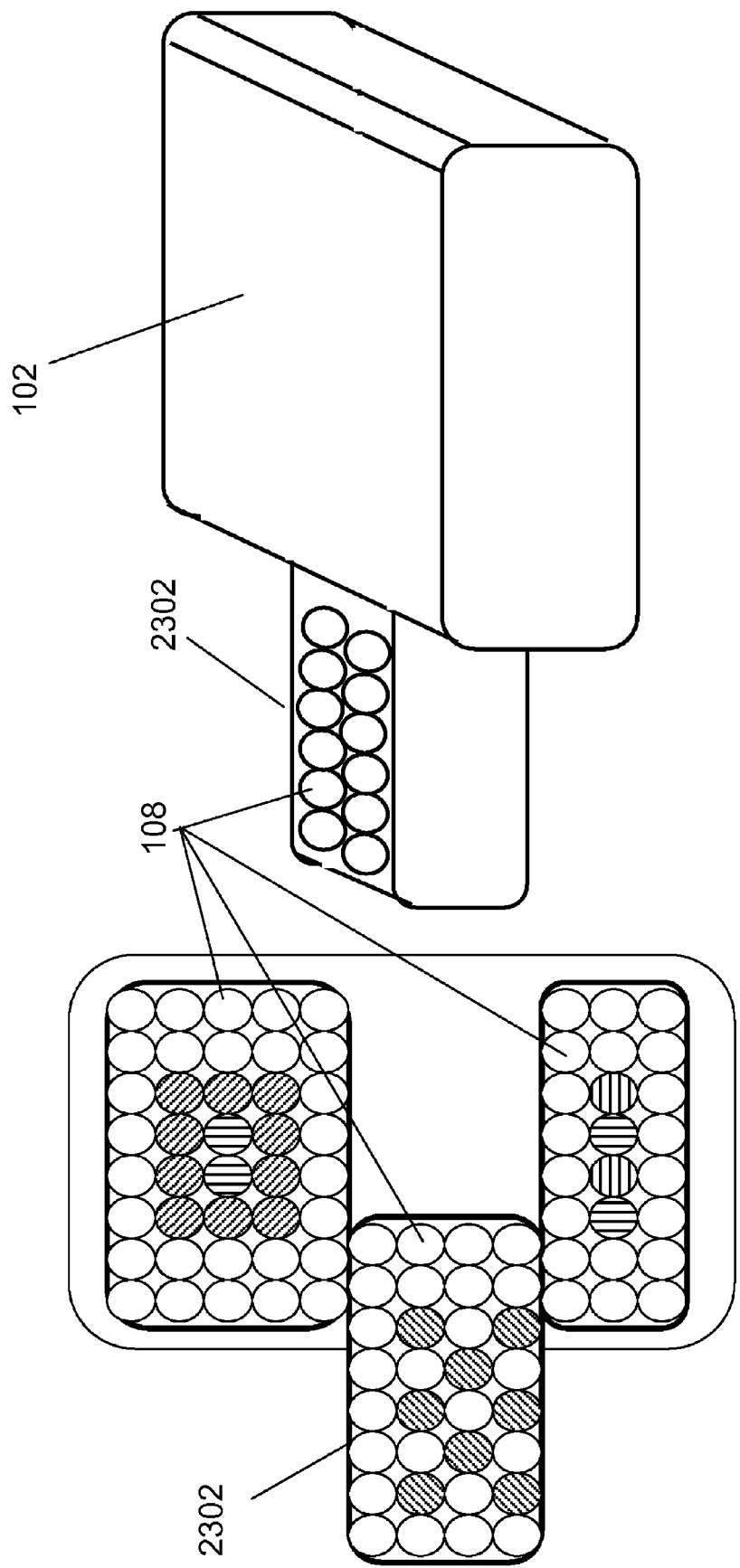
FIG. 23 shows an embodiment of accessing foam springs installed within a containment facility.

FIG. 23 depicts another embodiment for accessing the foam springs 108 within the bed facility 102. In this embodiment, sections or regions 122 of the bed facility 102 may slide out the side of the bed facility 102 to access the foam springs 108.

Figure 24:
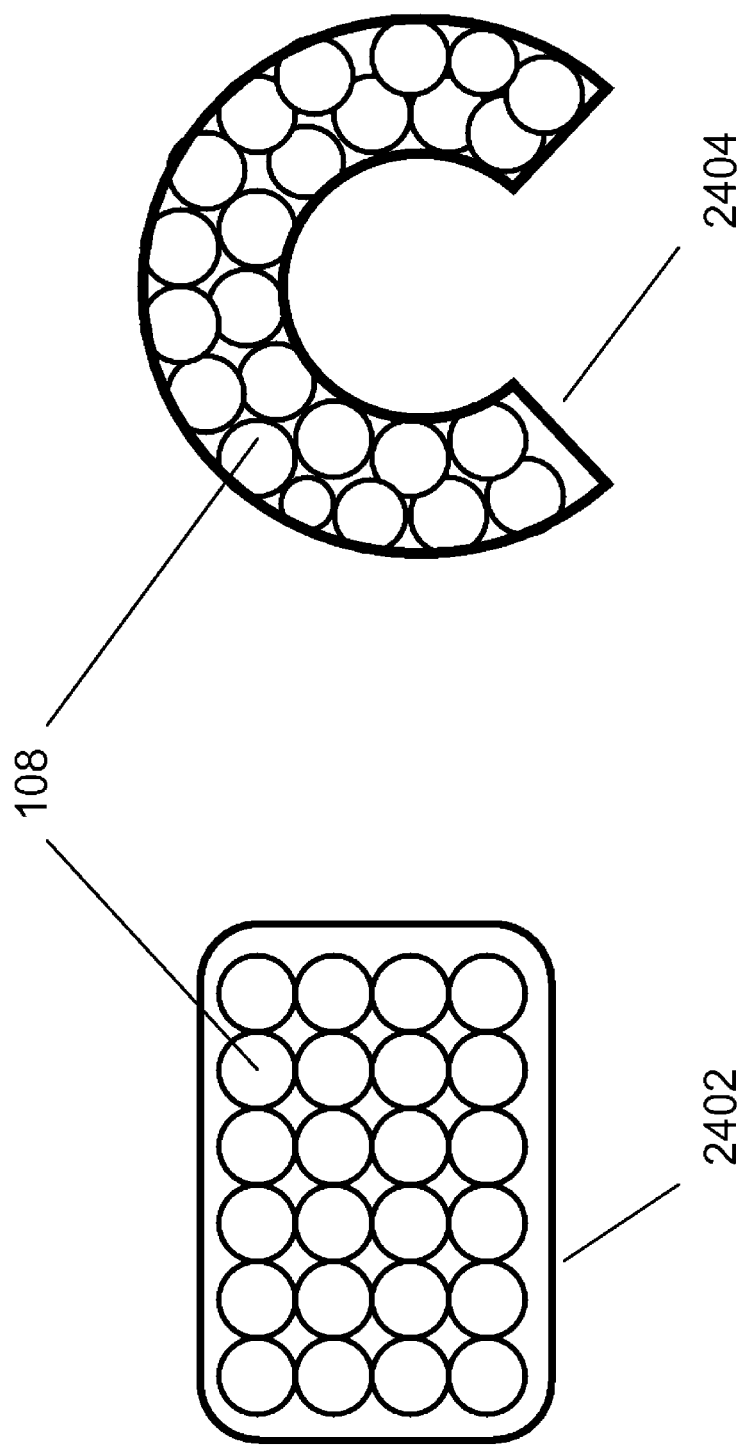
FIG. 24 shows an embodiment of foam springs within pillows.

FIG. 24 shows an embodiment of a pillow 2402 and a neck pillow 2404 using foam springs 108. As may be understood, different sizes and heights of foam springs 108 may used in the pillows (2402 and 2404)

Figure 25:
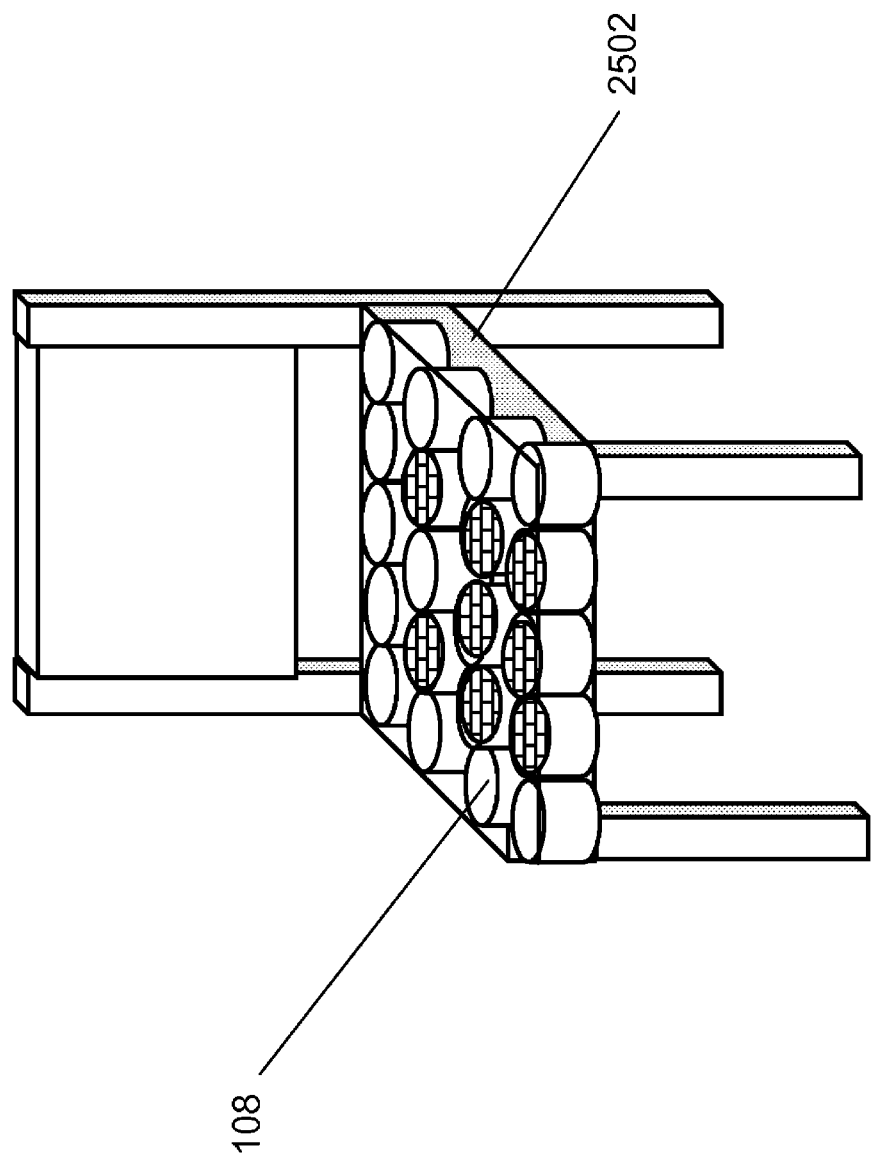
FIG. 25 shows an embodiment of foam springs within a chair cushion.

FIG. 25 shows an embodiment of a chair cushion 2502 using foam springs 108.

Figure 26:
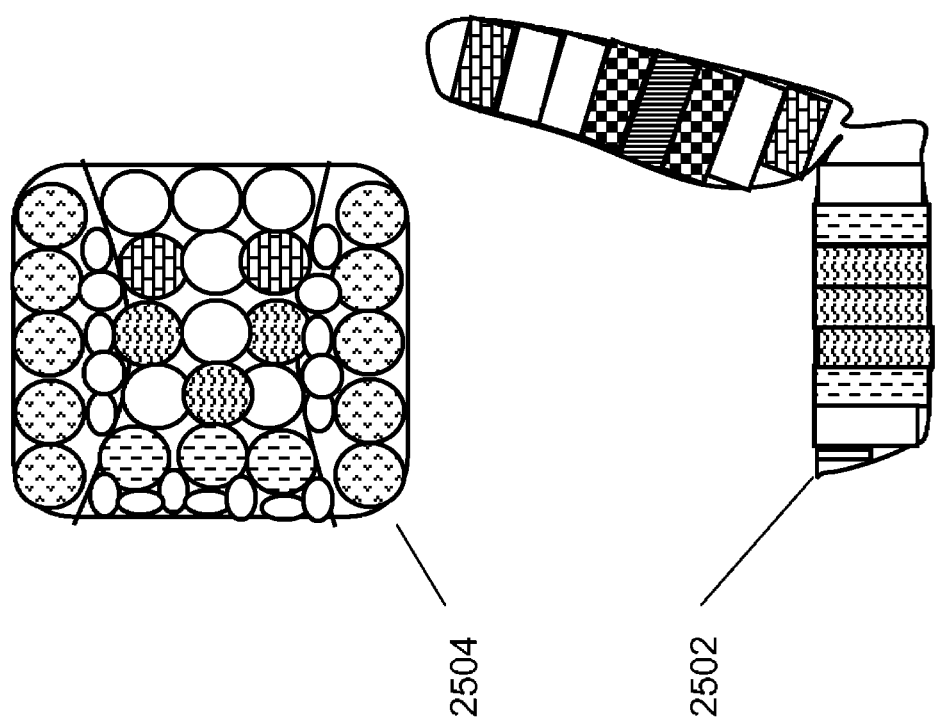
FIG. 26 shows an embodiment of foam springs within an automobile seat.

FIG. 26 shows an embodiment of an automobile seat using foam springs 108. FIG. 26 shows a side view of an automobile seat 2502 and a top view of the automobile seat 2504. As may be seen in the figure, there may be many different foam springs 108 used in the automobile seat 2502 to maintain the proper user positioning and comfort.

FIGS. 27 through 32 depicts various steps and methods of determining the configuration orientation for the foam springs 108 within the containment facility 104. While the embodiment described is for a software application, user information for the bed facility 102 configuration may also be collected using a questionnaire.

Figure 27:
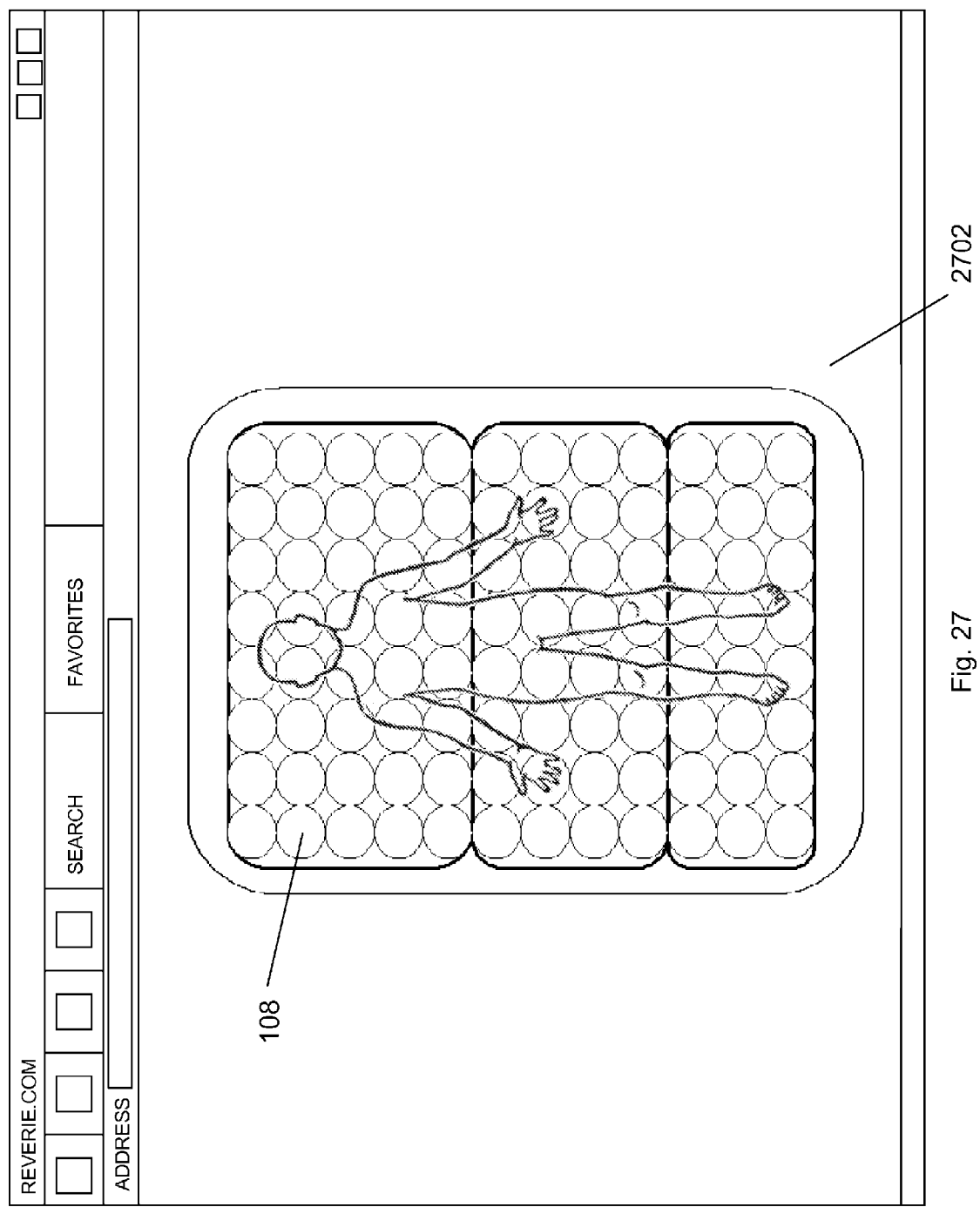
FIG. 27 shows a display screen for a foam spring orientation software application.

FIG. 27 depicts an embodiment of the starting screen 2702 for the foam spring orienting software application 118. In this embodiment, there may be a virtual image 2704 of a user superimposed on a bed facility 102 containing a plurality of foam springs 108. In an embodiment, the starting configuration of the foam springs 108 for the bed facility 102 may not contain any special configuration of different foam spring 108 firmnesses.

Figure 28:
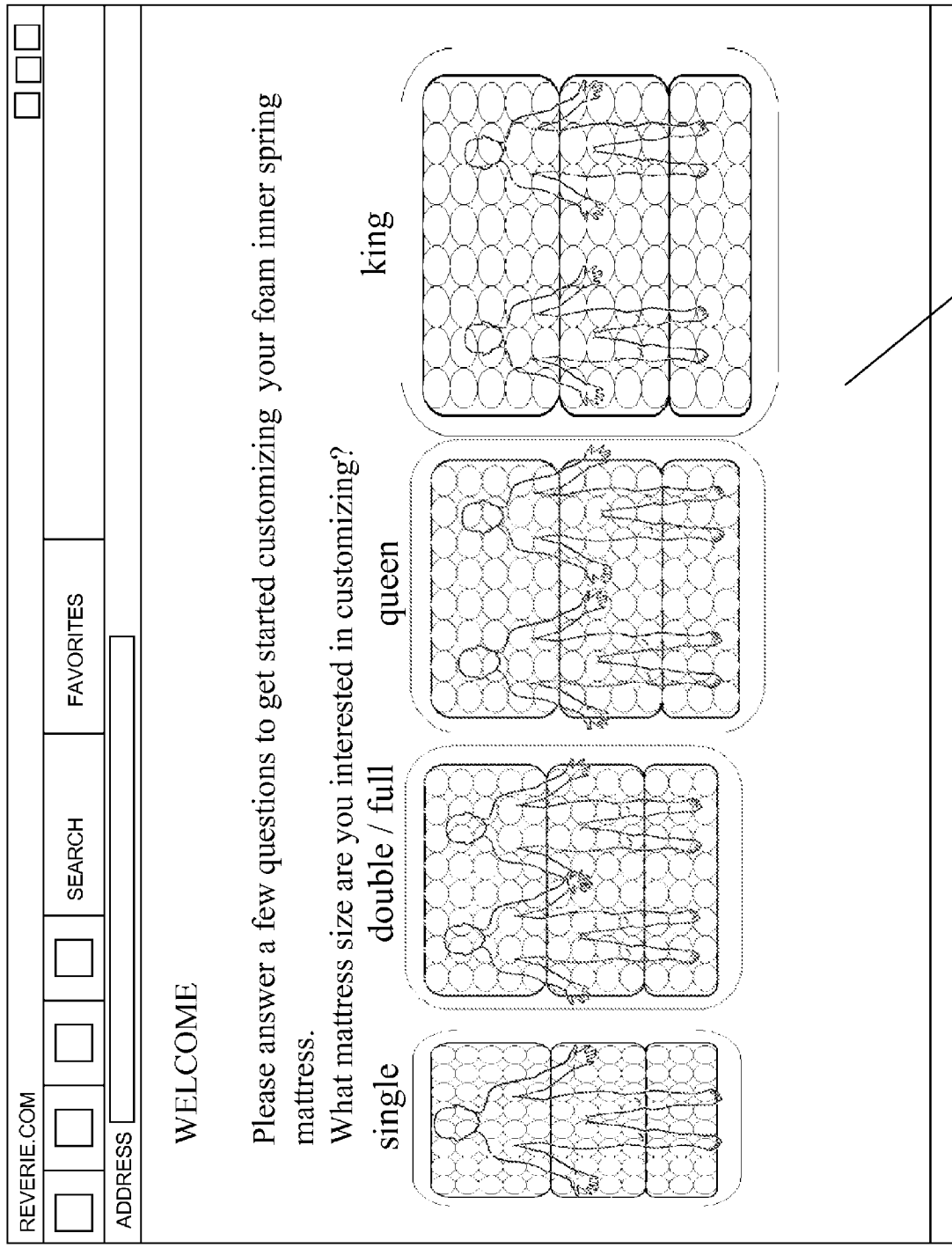
FIG. 28 shows an input screen for a foam spring orientation software application.

FIG. 28 depicts an embodiment of a foam spring orienting software application 118 screen requesting information from the user on the type of bed facility 102 to be configured. In this embodiment, the user, possibly with the aid of an enterprise or manufacturer, may input the type of bed facility 102 to be customized for the user's comfort requirements.

Figure 29:
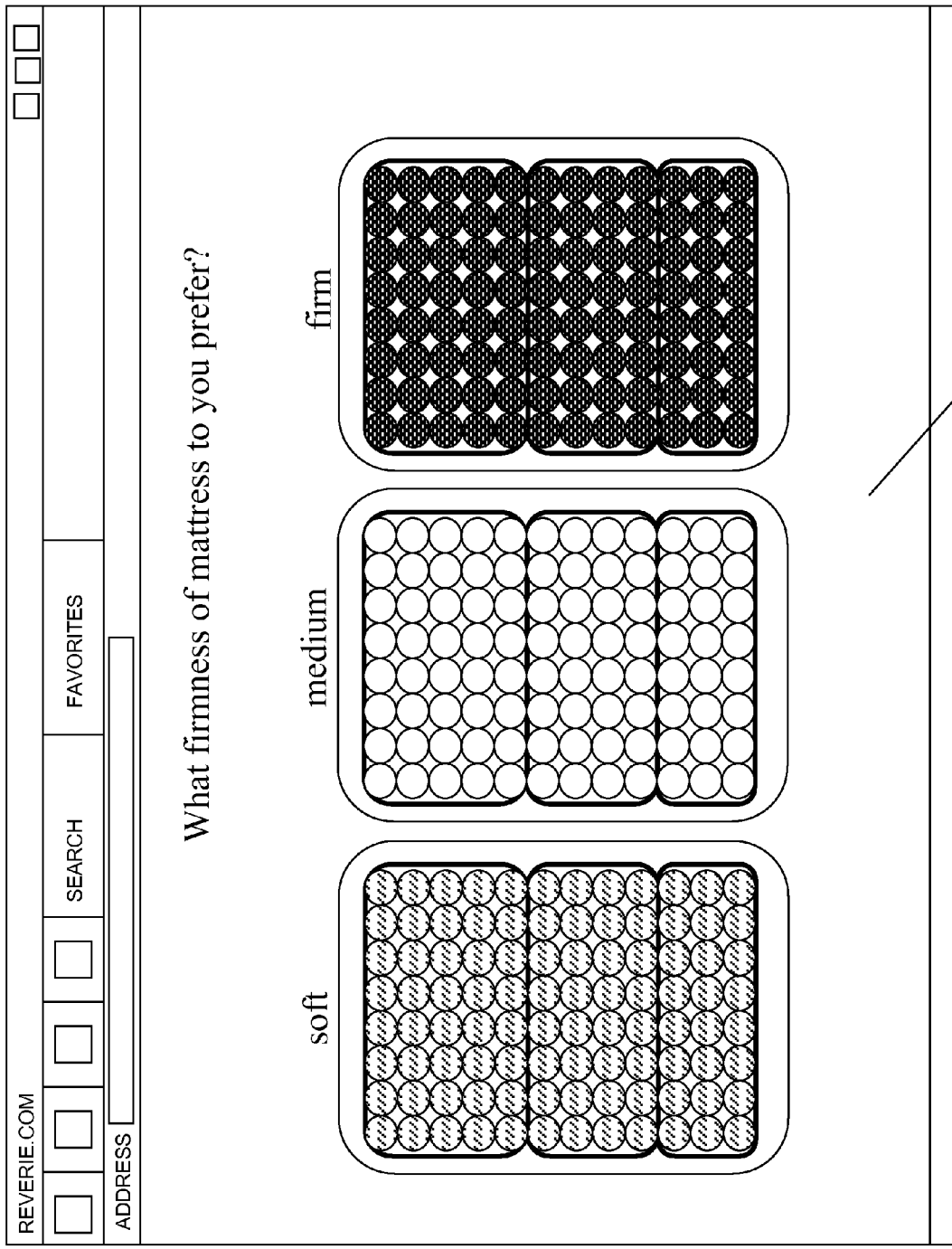
FIG. 29 shows an input screen for a foam spring orientation software application.

FIG. 29 depicts an embodiment of a foam spring orienting software application 118 screen requesting information from the user on the preferred firmness of bed facility 102 to be configured. In this embodiment, the user may be asked to select the overall firmness of the bed facility or the user may be able to indicate the firmness of the various regions 122 of the bed facility 102.

FIG. 30 depicts an embodiment of a foam spring orienting software application 118 screen requesting user specific information that may be used to make specific calculations of the bed facility 102 configuration of bed facility 102. As previously described, after the user answers any of the questions, additional questions may be presented to the user to gather additional information. For example, depending on the answer the user provides to "What parts of your body feel best when you wake?", additional questions may be presented to the user to gather additional detail. It should be understood that many different types of information may be asked of the user, and this questions on FIG. 30 are presented as examples only.

Figure 31:
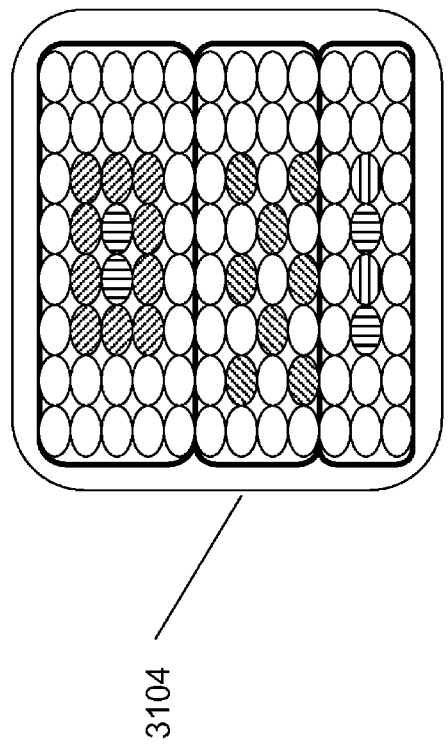
FIG. 31 shows an output screen for a foam spring orientation software application.

FIG. 31 depicts an embodiment of a feedback screen from the foam spring orientation software application 118 where an inventory of the foam spring 108 type and firmness that may be required to meet the users comfort requirements are shown. In this embodiment, the foam spring 108 listing 3102 is presented with a matching indicator and a schematic 3104 showing the placement of the foam springs 108 from the inventory listing 3102 may be displayed.

FIG. 32 depicts an embodiment of an ending screen 2702 for the foam spring orienting software application 118 showing the final configuration of foam springs 108 within the bed facility 102. In this embodiment, the virtual user 2704 may be superimposed over the final configuration of foam springs 108 that are configured for firmness to meet the users comfort requirements. It should be understood that these are example screens and the screens may present and request information to the user in many different screen embodiments. Additionally, it should also be understood that at any time during the information gathering or presenting of information to the user, the application software may be able to go back to previous screens or forward to next screens to review or change information.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A mattress, comprising:
   a first plurality of foam springs substantially vertically oriented within the mattress and contained in contact with one another by a first strap on an interior portion of the mattress, the first strap is oriented substantially horizontally within the mattress and configured to hold the first plurality of foam springs in a substantially secure position;

and a second plurality of foam springs substantially vertically oriented within the mattress and contained in contact with one another by a second strap on the interior portion of the mattress, the second strap separate from the first strap, the second strap oriented substantially horizontally within the mattress, and the second strap configured to hold the second plurality of foam springs in a second substantially secure position.

2. The mattress of claim 1, further comprising a clip that connects one of the first plurality of foam springs to one of the second plurality of foam springs.

3. The mattress of claim 1, further comprising an adhesive that connects one of the first plurality of foam springs to one of the second plurality of foam springs.

4. The mattress of claim 1, further comprising a hook and loop device that connects one of the first plurality of foam springs to one of the second plurality of foam springs.

5. The mattress of claim 1, wherein the first plurality of foam springs includes at least two different foam springs each constructed of a combination of different resilient materials and each having a different firmness.

6. The mattress of claim 1, further comprising an elastic that connects one of the first plurality of foam springs to one of the second plurality of foam springs.

7. The mattress of claim 1, wherein at least one of the pluralities of foam springs includes a foam spring partially encased in a fabric wrapping.

8. The mattress of claim 7, wherein the foam spring partially encased in the fabric wrapping is 30% to 40% encased in the fabric wrapping.

9. The mattress of claim 3, wherein the adhesive includes double-stick tape.

10. The mattress of claim 1, further comprising an outer case that encases the first plurality of foam springs, the second plurality of foam springs, the first strap, and the second strap.

11. The mattress of claim 10, further comprising a direct attachment device that attaches the first plurality of foam springs and the second plurality of foam springs to the outer case.

* * * * *